United States Patent
Hawkins et al.

(10) Patent No.: US 11,465,477 B2
(45) Date of Patent: Oct. 11, 2022

(54) TONNEAU COVER

(71) Applicant: ABC TECHNOLOGIES INC., Toronto (CA)

(72) Inventors: Stephen John Hawkins, South Lyon, MI (US); Bruce Bober, Farmington Hills, MI (US)

(73) Assignee: ABC TECHNOLOGIES INC., Toronto (CA)

( * ) Notice: Subject to any disclaimer, the term of this patent is extended or adjusted under 35 U.S.C. 154(b) by 0 days.

(21) Appl. No.: 17/089,886

(22) Filed: Nov. 5, 2020

(65) Prior Publication Data

US 2021/0046812 A1 Feb. 18, 2021

Related U.S. Application Data

(63) Continuation-in-part of application No. 17/051,868, filed as application No. PCT/US2019/030272 on May 1, 2019.

(Continued)

(51) Int. Cl.
*B60J 7/14* (2006.01)
*B60J 10/84* (2016.01)
(Continued)

(52) U.S. Cl.
CPC .............. *B60J 7/141* (2013.01); *B32B 3/12* (2013.01); *B32B 15/14* (2013.01); *B32B 15/20* (2013.01);
(Continued)

(58) Field of Classification Search
CPC ....... B60J 7/14; B60J 7/141; B60J 7/16; B60J 7/1607; B60P 7/02
(Continued)

(56) References Cited

U.S. PATENT DOCUMENTS

| 4,861,092 A | * | 8/1989 | Bogard | B60J 7/141 296/100.09 |
| 5,636,893 A | * | 6/1997 | Wheatley | B60J 7/141 16/354 |

(Continued)

FOREIGN PATENT DOCUMENTS

| CA | 2291941 A1 | 10/2000 |
| CA | 2407092 A1 | 2/2002 |

OTHER PUBLICATIONS

International Search Report dated Jul. 3, 2019 in corresponding International Patent Application No. PCT/US2019/030272.

(Continued)

*Primary Examiner* — Jason S Daniels
(74) *Attorney, Agent, or Firm* — Medler Ferro Woodhouse & Mills PLLC

(57) ABSTRACT

A tonneau cover for covering the opening of a cargo bed of a pickup truck. The tonneau cover includes a sandwich panel including a structural core, a first layered section, and a second layered section. The structural core has a top surface and a bottom surface. The first layered section is coupled to the top surface of the structural core, and a second layered section is coupled to the bottom surface of the structural core. Each of the first and second layered sections includes a reinforcement layer, and at least one of the reinforcement layers of the first and second layered sections is a carbon fiber mat. The tonneau cover may have a single panel configuration or a tri-panel configuration.

17 Claims, 35 Drawing Sheets

Related U.S. Application Data

(60) Provisional application No. 62/790,218, filed on Jan. 9, 2019, provisional application No. 62/665,943, filed on May 2, 2018.

(51) Int. Cl.

| | | |
|---|---|---|
| *B60J 7/16* | (2006.01) | |
| *B60J 10/24* | (2016.01) | |
| *B32B 3/12* | (2006.01) | |
| *B32B 15/14* | (2006.01) | |
| *B32B 15/20* | (2006.01) | |
| *B60J 10/86* | (2016.01) | |

(52) U.S. Cl.
CPC .............. *B60J 7/1607* (2013.01); *B60J 10/24* (2016.02); *B60J 10/84* (2016.02); *B60J 10/86* (2016.02); *B32B 2605/00* (2013.01)

(58) Field of Classification Search
USPC ............. 296/100.01, 100.02, 100.06, 100.09
See application file for complete search history.

(56) References Cited

U.S. PATENT DOCUMENTS

| | | | |
|---|---|---|---|
| 6,042,173 A | 3/2000 | Nett | |
| 6,076,881 A * | 6/2000 | Tucker | B60J 7/141 |
| | | | 296/100.07 |
| 6,196,507 B1 | 3/2001 | Morin et al. | |
| 6,273,491 B1 | 8/2001 | Bath et al. | |
| 6,293,608 B1 | 9/2001 | Dicke et al. | |
| 6,299,232 B1 | 10/2001 | Davis | |
| 6,302,468 B1 | 10/2001 | Steadman | |
| 6,309,006 B1 | 10/2001 | Rippberger | |
| 6,322,128 B1 | 11/2001 | Karrer | |
| 6,331,028 B1 | 12/2001 | O'Neill et al. | |
| 6,340,194 B1 | 1/2002 | Muirhead et al. | |
| 6,343,828 B1 | 2/2002 | Young et al. | |
| 6,352,296 B1 | 3/2002 | Kooiker | |
| 6,354,650 B2 | 3/2002 | Terhaar et al. | |
| 6,361,086 B1 | 3/2002 | Robbins et al. | |
| 6,382,698 B1 | 5/2002 | Harrell | |
| 6,382,699 B1 | 5/2002 | Hanson | |
| 6,386,616 B1 | 5/2002 | Wheatley | |
| 6,394,532 B1 | 5/2002 | Dence | |
| 6,422,635 B1 | 7/2002 | Steffens et al. | |
| 6,422,642 B1 | 7/2002 | Grimm et al. | |
| 6,427,500 B1 | 8/2002 | Weinerman et al. | |
| 6,431,633 B1 | 8/2002 | Young et al. | |
| 6,439,640 B1 | 8/2002 | Wheatley | |
| 6,447,045 B1 | 9/2002 | Dickson et al. | |
| 6,497,445 B1 | 12/2002 | Combs, II | |
| 6,499,791 B2 | 12/2002 | Wheatley | |
| 6,520,558 B1 | 2/2003 | Katterloher et al. | |
| 6,543,834 B2 | 4/2003 | Sisson | |
| 6,543,835 B2 | 4/2003 | Schmeichel et al. | |
| 6,572,174 B2 | 6/2003 | Hernandez et al. | |
| 6,588,826 B1 | 7/2003 | Muirhead | |
| 6,641,200 B2 | 11/2003 | Rusu | |
| 6,676,174 B2 | 1/2004 | Reynolds et al. | |
| 6,702,358 B2 | 3/2004 | Comstock | |
| 6,702,359 B2 | 3/2004 | Armstrong et al. | |
| 6,702,360 B1 | 3/2004 | Santos et al. | |
| 6,749,248 B1 | 6/2004 | Votruba et al. | |
| 6,755,456 B2 | 6/2004 | Addicott | |
| 6,814,388 B2 | 11/2004 | Wheatley | |
| 6,880,878 B2 | 4/2005 | Nykiel et al. | |
| 6,948,758 B2 | 9/2005 | Henderson | |
| 6,948,761 B2 | 9/2005 | Haack et al. | |
| 7,040,675 B1 | 5/2006 | Ott et al. | |
| 7,052,071 B2 | 5/2006 | Mulder et al. | |
| 7,093,881 B2 | 8/2006 | Rusu | |
| 7,163,253 B2 | 1/2007 | Montagna et al. | |
| 7,165,803 B2 | 1/2007 | Malmberg et al. | |
| 7,188,888 B2 | 3/2007 | Wheatley et al. | |
| 7,204,540 B2 | 4/2007 | Wheatley | |
| 7,237,822 B2 | 7/2007 | Queveau et al. | |
| 7,252,322 B2 | 8/2007 | Rusu | |
| 7,258,387 B2 | 8/2007 | Weldy | |
| 7,264,297 B2 | 9/2007 | Boulard et al. | |
| 7,316,444 B2 | 1/2008 | Montagna et al. | |
| 7,316,445 B2 | 1/2008 | Sugimoto | |
| 7,318,618 B1 | 1/2008 | Yue | |
| 7,320,494 B1 | 1/2008 | Wilson | |
| 7,322,633 B2 | 1/2008 | Zajicek et al. | |
| 7,384,089 B1 | 6/2008 | Ablang et al. | |
| 7,407,141 B2 | 8/2008 | Boulard | |
| 7,419,207 B2 | 9/2008 | Klein | |
| 7,427,095 B2 | 9/2008 | Wheatley | |
| 7,452,024 B2 | 11/2008 | Landrith et al. | |
| 7,506,913 B2 | 3/2009 | Sugimoto et al. | |
| 7,530,614 B2 | 5/2009 | Nichols | |
| 7,537,264 B2 | 5/2009 | Maimin et al. | |
| 7,588,283 B2 | 9/2009 | Zajicek et al. | |
| 7,628,442 B1 | 12/2009 | Spencer et al. | |
| 7,735,881 B2 | 6/2010 | Steffens et al. | |
| 7,748,767 B2 | 7/2010 | Terhaar et al. | |
| 7,815,239 B1 | 10/2010 | Schmeichel et al. | |
| 7,828,361 B1 | 11/2010 | Spencer | |
| 7,878,572 B2 | 2/2011 | Hu et al. | |
| 7,905,536 B2 | 3/2011 | Yue | |
| 7,913,965 B2 | 3/2011 | Boulard | |
| 7,946,643 B2 | 5/2011 | Getschel et al. | |
| 7,954,876 B2 | 6/2011 | Kosinski | |
| 7,963,585 B2 | 6/2011 | Jones et al. | |
| 8,011,711 B2 | 9/2011 | Hirayama et al. | |
| 8,033,591 B2 | 10/2011 | Schmeichel et al. | |
| 8,042,424 B2 | 10/2011 | Sawahata et al. | |
| 8,104,821 B2 | 1/2012 | Hu et al. | |
| 8,128,149 B1 | 3/2012 | Wolf et al. | |
| 8,157,229 B2 | 4/2012 | Palermo | |
| 8,167,353 B2 | 5/2012 | Schmeichel et al. | |
| 8,182,021 B2 | 5/2012 | Maimin et al. | |
| 8,205,928 B2 | 6/2012 | Steffens et al. | |
| 8,262,148 B2 | 9/2012 | Rusher et al. | |
| 8,336,946 B2 | 12/2012 | Schrader et al. | |
| 8,366,173 B2 | 2/2013 | Xu | |
| 8,376,446 B2 | 2/2013 | Golden | |
| 8,414,049 B2 | 4/2013 | Parker | |
| 8,424,952 B2 | 4/2013 | Schmitt | |
| 8,439,423 B2 | 5/2013 | Schmeichel et al. | |
| 8,475,096 B2 | 7/2013 | Spencer et al. | |
| 8,480,154 B2 | 7/2013 | Yue | |
| 8,511,736 B2 | 8/2013 | Williamson et al. | |
| 8,523,266 B2 | 9/2013 | Yue | |
| 8,573,678 B2 | 11/2013 | Yue | |
| 8,585,120 B2 | 11/2013 | Rusher et al. | |
| 8,596,708 B2 | 12/2013 | Schmeichel | |
| 8,632,114 B2 | 1/2014 | Yue | |
| 8,690,224 B2 | 4/2014 | Maimin et al. | |
| 8,714,622 B2 | 5/2014 | Spencer et al. | |
| 8,807,625 B2 | 8/2014 | Garska | |
| 8,814,249 B2 | 8/2014 | Rossi | |
| 8,857,887 B1 | 10/2014 | Schmeichel | |
| 8,870,190 B1 | 10/2014 | Newhouse | |
| 8,939,494 B2 * | 1/2015 | Maimin | B60P 7/02 |
| | | | 296/100.07 |
| 8,960,764 B2 | 2/2015 | Spencer | |
| 9,056,542 B2 | 6/2015 | Schmeichel | |
| 9,061,572 B2 | 6/2015 | Potter | |
| 9,067,481 B2 | 6/2015 | Xu | |
| 9,073,417 B1 | 7/2015 | Smith | |
| 9,221,380 B2 | 12/2015 | Spencer et al. | |
| 9,254,735 B2 | 2/2016 | Spencer | |
| 9,260,139 B2 | 2/2016 | Schmeichel | |
| 9,266,416 B1 | 2/2016 | Nania | |
| 9,290,122 B2 | 3/2016 | Spencer | |
| 9,346,344 B2 | 5/2016 | Smith et al. | |
| 9,352,641 B2 | 5/2016 | Chapman et al. | |
| 9,421,851 B2 | 8/2016 | Kerr, III | |
| 9,469,181 B2 | 10/2016 | Jeffries et al. | |
| 9,487,070 B2 | 11/2016 | Xu | |
| 9,487,071 B1 | 11/2016 | Yue | |
| 9,527,373 B2 | 12/2016 | Yue | |

(56) References Cited

U.S. PATENT DOCUMENTS

| | | |
|---|---|---|
| 9,533,555 B2 | 1/2017 | Facchinello et al. |
| 9,545,835 B2 | 1/2017 | Facchinello et al. |
| 9,610,831 B2 | 4/2017 | Shi et al. |
| 9,623,737 B2 | 4/2017 | Facchinello et al. |
| 9,630,479 B2 | 4/2017 | Facchinello et al. |
| 9,669,689 B2 | 6/2017 | Steffens et al. |
| 9,694,657 B2 | 7/2017 | Carlson |
| 9,764,628 B2 | 9/2017 | Facchinello et al. |
| 9,815,357 B2 | 11/2017 | Hall |
| 9,827,839 B2 | 11/2017 | Williamson et al. |
| 9,840,136 B2 | 12/2017 | Smith et al. |
| 9,849,765 B2 | 12/2017 | Carlson |
| 9,862,257 B1 | 1/2018 | Kozlowski et al. |
| 9,868,342 B2 | 1/2018 | Xu |
| 9,924,765 B1 | 3/2018 | Coronel |
| 9,969,249 B2 | 5/2018 | Spencer et al. |
| 9,981,537 B2 | 5/2018 | Xu |
| 10,000,113 B2 | 6/2018 | Schmeichel et al. |
| 10,023,034 B2 | 7/2018 | Facchinello et al. |
| 10,023,035 B2 | 7/2018 | Facchinello |
| 10,046,632 B2 | 8/2018 | Dylewski, II et al. |
| 10,059,182 B2 | 8/2018 | Facchinello et al. |
| 10,071,618 B2 | 9/2018 | Miyamae et al. |
| 10,093,159 B1 | 10/2018 | Zichettello et al. |
| 10,106,022 B2 | 10/2018 | Xu |
| 10,131,215 B2 | 11/2018 | Zichettello et al. |
| 10,144,276 B2 | 12/2018 | Facchinello et al. |
| 10,166,849 B2 | 1/2019 | Facchinello et al. |
| 10,189,340 B2 | 1/2019 | Schmeichel et al. |
| 10,232,691 B1 | 3/2019 | Weng et al. |
| 10,239,394 B2 | 3/2019 | Lutzka et al. |
| 10,239,395 B2 | 3/2019 | Lees et al. |
| 10,286,765 B2 | 5/2019 | Williamson et al. |
| 10,300,775 B2 | 5/2019 | Spencer |
| 10,315,498 B2 | 6/2019 | Parkey |
| 10,322,624 B2 | 6/2019 | Facchinello et al. |
| 10,328,780 B2 | 6/2019 | DeLong |
| 10,337,221 B2 | 7/2019 | Jeffries et al. |
| 10,363,801 B2 | 7/2019 | Lutzka |
| 10,384,522 B2 | 8/2019 | Yilma et al. |
| 10,399,420 B2 | 9/2019 | Rossi |
| 10,399,421 B2 | 9/2019 | Smith et al. |
| 10,406,897 B2 | 9/2019 | Spencer et al. |
| 10,406,898 B2 | 9/2019 | O'Reilly |
| 10,406,899 B2 | 9/2019 | Carter et al. |
| 10,406,900 B2 | 9/2019 | Facchinello et al. |
| 10,414,254 B2 | 9/2019 | Zheng et al. |
| 10,414,256 B2 | 9/2019 | Frederick et al. |
| 10,414,258 B2 | 9/2019 | Singer |
| 10,434,855 B1 | 10/2019 | Ma |
| 10,442,280 B2 | 10/2019 | Lees et al. |
| 2007/0108079 A1 | 5/2007 | Zajicek et al. |
| 2007/0210609 A1* | 9/2007 | Maimin .................. B60P 7/02 296/100.09 |
| 2007/0284907 A1 | 12/2007 | Yue |
| 2013/0337219 A1 | 12/2013 | Shields et al. |
| 2015/0061315 A1 | 3/2015 | Facohinello et al. |
| 2015/0123421 A1* | 5/2015 | Combs, II ................ B60J 7/198 296/100.02 |
| 2016/0176448 A1 | 6/2016 | Germano et al. |
| 2017/0259655 A1 | 9/2017 | Dylewski, II et al. |
| 2017/0361692 A1 | 12/2017 | Corder et al. |
| 2018/0111355 A1 | 4/2018 | Manz et al. |
| 2018/0126833 A1 | 5/2018 | Hannan et al. |
| 2018/0281572 A1 | 10/2018 | Zichettello et al. |
| 2018/0297457 A1 | 10/2018 | Spencer |
| 2018/0312049 A1 | 11/2018 | Slinger et al. |
| 2018/0339581 A1 | 11/2018 | Rossi et al. |
| 2018/0361840 A1 | 12/2018 | Causemann et al. |
| 2019/0061499 A1 | 2/2019 | McDonald et al. |
| 2019/0092151 A1 | 3/2019 | Ramaswamy |
| 2019/0126734 A1 | 5/2019 | Dylewski, II et al. |
| 2019/0126994 A1 | 5/2019 | Brown |
| 2019/0193537 A1 | 6/2019 | Lutzka et al. |
| 2019/0193538 A1 | 6/2019 | Carter et al. |
| 2019/0225064 A1 | 7/2019 | Schmeichel et al. |
| 2019/0232768 A1 | 8/2019 | Spencer |
| 2019/0275869 A1 | 9/2019 | Facchinello et al. |
| 2020/0384838 A1* | 12/2020 | Facchinello .............. B60P 7/02 |

OTHER PUBLICATIONS

Written Opinion of the International Searching Authority dated Jul. 3, 2019 in International Patent Application No. PCT/US2019/030272.

* cited by examiner

TONNEAU COVER

FIELD OF THE INVENTION

The present invention pertains to a tonneau cover for a pickup truck, and in particular to a tonneau cover based on a honeycomb-core composite panel including recycled carbon fiber.

BACKGROUND OF THE INVENTION

Pickup trucks have functional attributes that permit them to be used for a range of applications. This is evident in the market, as pickup trucks are immensely popular for both recreational and work-related transport. Pickup trucks are now available in a range of configurations, but are generally regarded as providing an enclosed cab, for the driver and passengers, and an open rear cargo bed. Although the cargo bed is bordered by two sidewall sections, and a rear tailgate, the top side of the cargo bed is open, therein presenting certain issues relating to security, privacy and general securement of items contained therein.

To ensure items placed within the cargo area are protected from being stolen and/or vandalized, and to prevent inadvertent loss due to items falling out of the cargo bed during transport, a variety of cargo bed enclosure systems have been proposed, including tonneau covers. Where an enclosure is provided for a cargo bed, ease of access remains of paramount importance, to ensure the user is not obstructed and/or prevented from using the available cargo space as needed. As the ability of the user to open the tonneau cover is a primary consideration in selecting a suitable enclosure, the weight profile of the tonneau cover is important. It is therefore desirable to provide a tonneau cover that is of reduced weight, while still providing the desired structural performance and aesthetic qualities sought after in today's pickup truck market.

BRIEF SUMMARY OF THE INVENTION

Embodiments hereof relate to a tonneau cover for covering the opening of a cargo bed of a pickup truck. The tonneau cover includes a sandwich panel including a structural core, a first layered section, and a second layered section. The structural core has a top surface and a bottom surface. The first layered section is coupled to the top surface of the structural core, and a second layered section is coupled to the bottom surface of the structural core. Each of the first and second layered sections includes a reinforcement layer, and at least one of the reinforcement layers of the first and second layered sections is a carbon fiber mat.

Embodiments hereof also relate to a tonneau cover assembly that includes a tri-fold tonneau cover having a first panel, a second panel, and a third panel. Each of the first, second and third panels is formed as a composite sandwich panel. The composite sandwich panel includes a structural core, a first layered component, and a second layered component. The structural core has a core top surface and a core bottom surface. The first layered component is coupled to the core top surface. The second layered component is coupled to the core bottom surface. Each of the first and second layered components include a reinforcement layer, and at least one of the reinforcement layers of the first and second layered components is a carbon fiber mat.

Embodiments hereof also relate to a method of manufacturing a tonneau cover for covering the opening of a cargo bed of a pickup truck. A first reinforcement layer is disposed onto a top surface of a structural core. A second reinforcement layer is disposed onto a bottom surface of the structural core. At least one of the first reinforcement layer and the second reinforcement layer is a carbon fiber mat. A coating layer is applied onto each of the first reinforcement layer and the second reinforcement layer, and application of the coating layer serves to adhere the first reinforcement layer and the second reinforcement layer to the structural core to form a sandwich panel.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 3 is a partial sectional view of a sandwich panel forming the tonneau cover of FIG. 2a.

FIG. 8b shows another view of the alternative embodiment of FIG. 8a.

FIG. 8c shows another view of the alternative embodiment of FIG. 8a.

FIG. 22b is an enlarged view of the lock feature shown in FIG. 22a.

FIG. 22c is another enlarged view of the lock feature shown in FIG. 22a.

FIG. 30 is a partial sectional view of the rail system of FIG. 29, showing a profile through a tailgate rail of the rail system.

DETAILED DESCRIPTION OF EMBODIMENTS OF THE INVENTION

Figure 1:
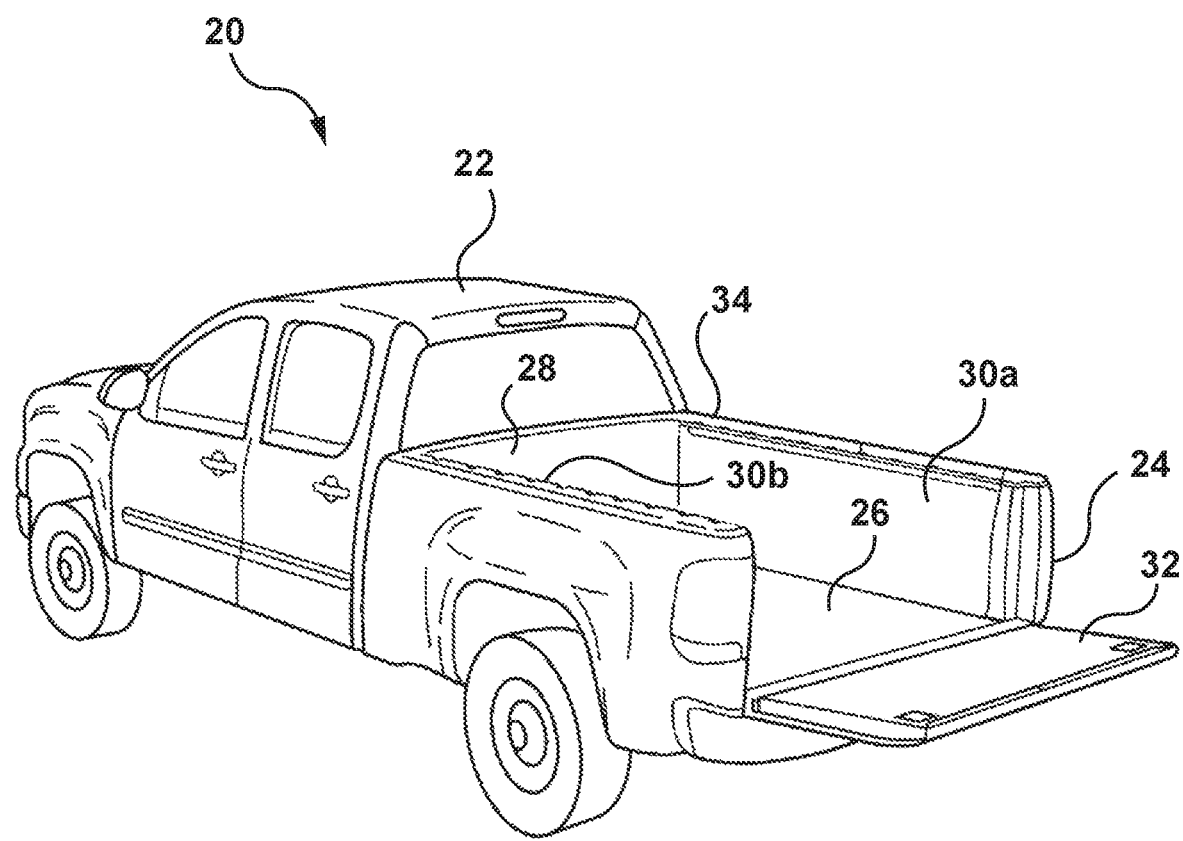
FIG. 1 is a rear perspective view of a pickup truck showing a cargo bed.

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

It should be noted that in the description, terms such as forward, front and derivations of these terms are intended to mean or refer to an orientation directed towards, or a location situated towards, the front of the vehicle or component in question relative to its orientation within a vehicle. Similarly, terms such as rearward, rear and derivations of these terms are intended to mean or refer to an orientation directed towards, or a location situated towards, the back of the vehicle or component in question relative to its orientation within a vehicle. Terms such as up, upper, upward, and derivations of these terms are intended to mean or refer to an orientation that is above or on a top side of the vehicle or component in question relative to its orientation within a vehicle. Terms such as lower, down, downward, and derivations of these terms are intended to mean or refer to an orientation that is below or on a bottom side of the vehicle or component in question relative to its orientation within a vehicle. The term outer, outboard, outside and derivations of these terms is intended to mean or refer to an orientation directed towards, or a location situated outwardly from the side of the vehicle or component in question relative to its orientation within a vehicle. The term inner, inboard, inside and derivations of these terms is intended to mean or refer to an orientation directed towards, or a location situated towards a longitudinal centerline of the vehicle, or component in question relative to its orientation within a vehicle.

In addition, the terms "preferred," "preferably," or "in particular," "for example" or similar terms are used in association with optional features without thereby restricting alternative embodiments. Thus, features which are introduced by these terms are optional features, and there is no intention to restrict the scope of protection of the claims and, in particular, the independent claims by means of these features. Thus, as a person skilled in the art will recognize, the invention can also be implemented using different embodiments. In a similar way, features which are introduced by "in one embodiment of the invention" or by "in one illustrative embodiment of the invention" are understood to be optional features without any intention thereby to restrict alternative embodiments or the scope of protection of the independent claims. Moreover, these introductory expressions are not intended to affect all the ways of combining the features introduced thereby with other features, whether optional or non-optional features.

Pickup Truck Rear Configuration Overview

Referring now to FIG. 1, shown is a vehicle or pickup truck 20 having a cab 22 and a cargo bed 24 situated rearward therefrom. The cargo bed 24 comprises a floor 26, an upstanding forward wall 28 immediately adjacent and rearward of the cab 22, and two upstanding opposing sidewall sections 30a, 30b. Opposite to the forward wall 28 towards the rear of the cargo bed 24 is situated a tailgate 32. The tailgate 32 is provided with a hinge assembly (not shown) permitting the tailgate 32 to pivot from a generally vertical/upright closed position, to a generally horizontal open position as required by the operator. As shown in FIG. 1, the tailgate 32 is in the open position. The forward wall 28 and the two opposing sidewall sections 30a, 30b define an upper wall surface that is generally planar. The upper wall surface is collectively regarded as the bed rail 34.

Tonneau Cover—One Panel

Figure 2A:
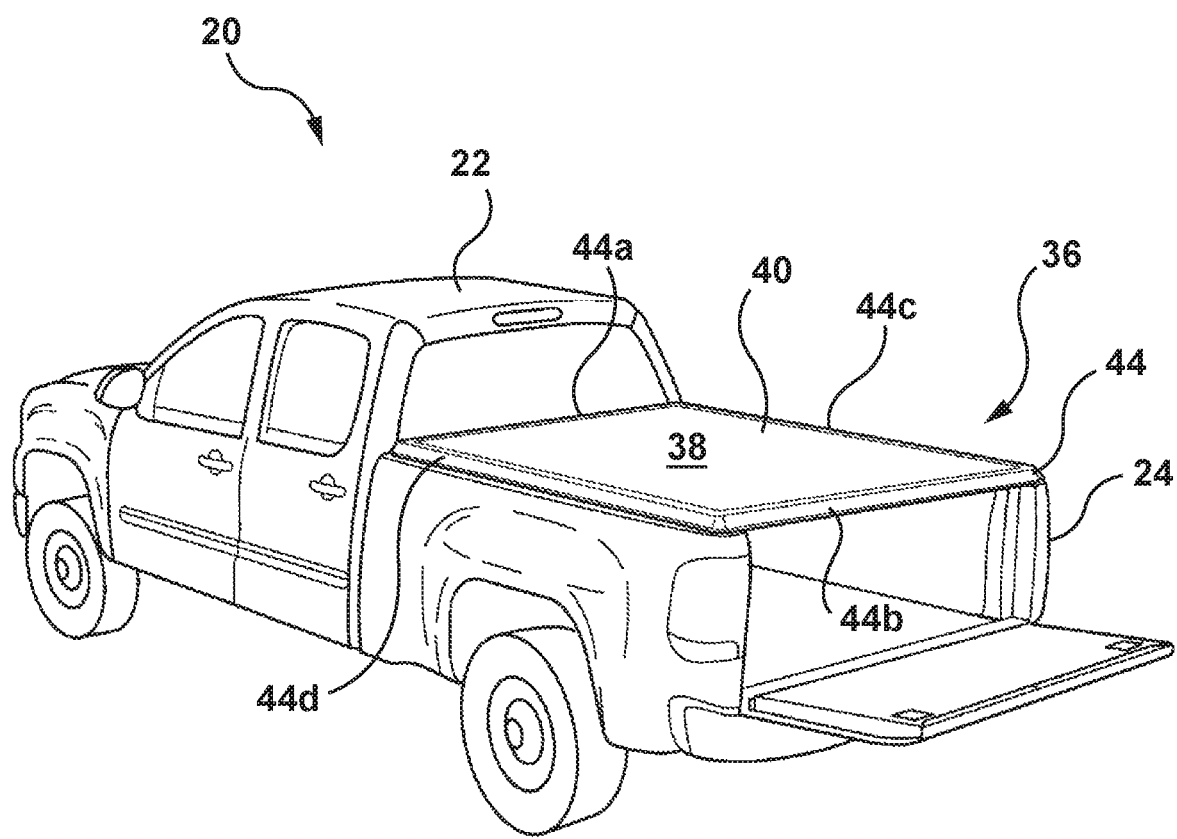
FIG. 2a is a rear perspective view of the pickup truck according to FIG. 1, showing a first embodiment of a tonneau cover installed on the cargo bed, the tonneau cover shown in the closed position.
Figure 2B:
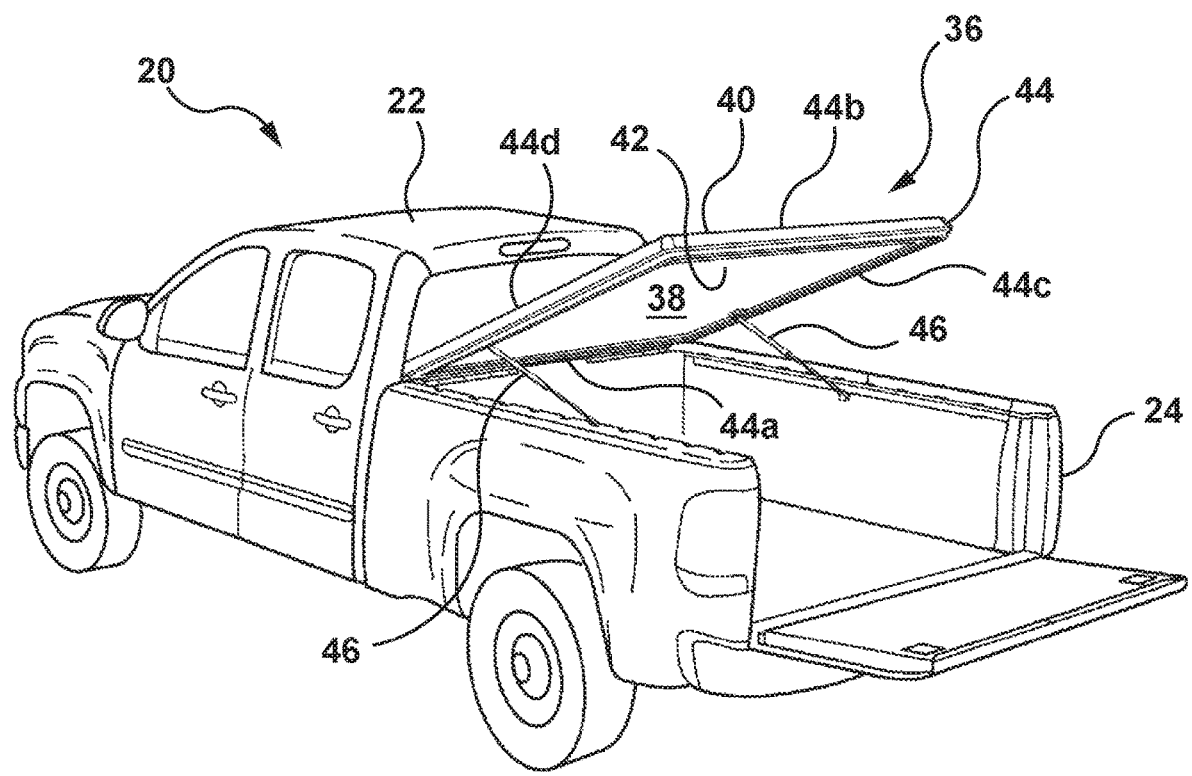
FIG. 2b is a rear perspective view of the pickup truck according to FIG. 1, showing the tonneau cover of FIG. 2a in the open position.

With reference now to FIGS. 2a and 2b, a tonneau cover 36 is shown mounted on the cargo bed 24 of the pickup truck 20. As generally known in the art, the tonneau cover 36 serves to cover the area of the cargo bed 24, while being operable (i.e. openable) to permit for access when necessary. In FIG. 2a, the tonneau cover 36 is shown in a closed position, wherein the tonneau cover 36 fully covers the entirety of the cargo bed 24. In this closed position, the tonneau cover 36 prevents the ingress of water and/or debris into the area of the cargo bed 24, while preventing the accidental loss and/or theft of cargo/materials from the cargo bed 24 during use.

In accordance with embodiments hereof, tonneau covers may have the form of a single panel or as an assembly of two or more operably connected panels. In the embodiment shown in FIG. 2b, the tonneau cover 36 is a single panel configuration, and includes a primary body portion 38 having a top surface 40, an opposing bottom surface 42 and an outer periphery 44. The outer periphery 44 may be further regarded as including a forward periphery 44a, a rearward periphery 44b, and opposing side peripheries 44c, 44d. The tonneau cover 36 is operably coupled to the cargo bed 24 to permit the tonneau cover to be opened and closed as required by the user. In the embodiment shown in FIG. 2b, the tonneau cover 36 is configured for hinged connection between the forward periphery 44a or a surface proximal thereto, and the forward wall 28 of the cargo bed 24. Accordingly, the tonneau cover 36 may be opened to a second position as shown in FIG. 2b. Maintaining the tonneau cover 36 in the open position, or at any intermediate position therebetween may be facilitated through the use of a suitable support mechanism, including but not limited to lid supports, lid stays and gas struts. As shown in FIG. 2b, the single panel tonneau cover 36 incorporates a pair of gas struts 46 to support the tonneau cover 36 in the open position.

Panel Construction

Figure 3:
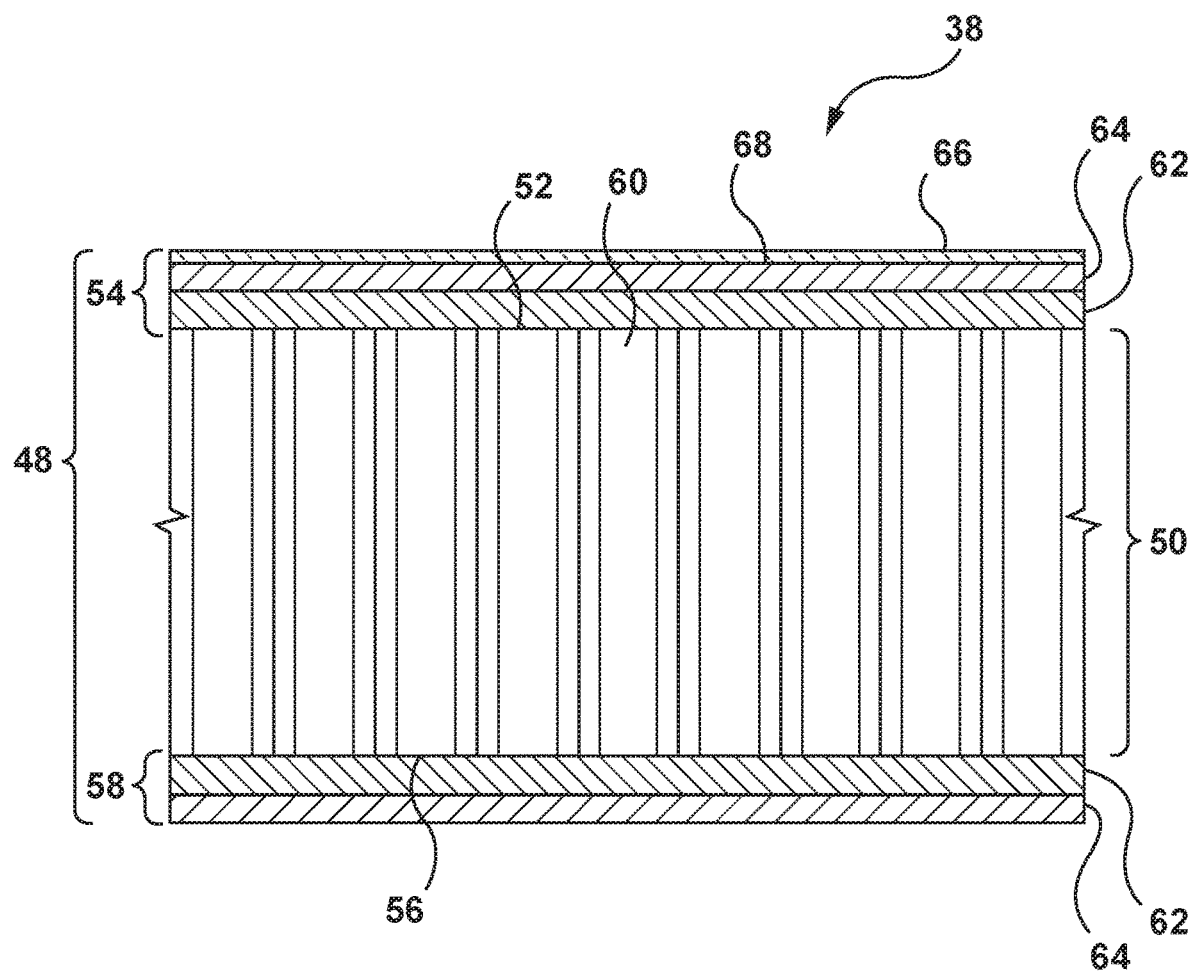

With reference to FIG. 3, shown is a partial sectional view of the primary body portion 38. The primary body portion 38 is an integrated construction formed as a composite layered panel, generally regarded as a sandwich panel 48. The sandwich panel 48 includes a structural core 50 bounded on a top surface 52 by a first layered section 54, and on a bottom surface 56 by a second layered section 58.

Structural Core—Honeycomb

The structural core 50 is a honeycomb structure, having cells 60 that are generally hexagonal in cross-sectional shape. The cells 60 are aligned to extend transversely relative to the sandwich panel 48, that is across the thickness of the structural core 50. In one exemplary embodiment, the honeycomb structure may be formed from Kraft paper such as Axxor Core Honeycomb (Axxion Group, NL). While Kraft paper honeycomb structures may be used uncoated, in certain implementations the paper may be coated/impregnated with a resin material to provide enhanced performance with respect to structural characteristics and/or resistance to the elements (i.e. moisture). Suitable coatings may include, but are not limited to polyimide, polyamide, and phenolic resins.

The cell size, cell wall thickness, core thickness, paper areal density (grammage) and the expanded core areal density of the structural core 50 are chosen to meet the desired mechanical requirements for strength and durability. The cell size of the structural core 50 is typically between about 4 mm to about 12 mm, and preferably between about 6 mm to about 10 mm. In one exemplary construction detailed below (see Example 1), the cell size for the structural core 50 is about 8 mm. The cell wall thickness is typically between about 0.14 mm to about 0.18 mm, and preferably between about 0.15 mm to about 0.17 mm. In the exemplary construction detailed below (see Example 1), the cell wall thickness for the structural core 50 is about 0.16 mm. The core thickness of the structural core 50 is typically between about 10 mm to about 50 mm, and preferably between about 20 mm to about 40 mm. In the exemplary construction detailed below (see Example 1), the core thickness for the structural core 50 is about 30 mm. The paper areal density is typically between about 80 gsm to about 150 gsm, and preferably between about 100 gsm to about 145 gsm. In the exemplary construction detailed below (see Example 1), the paper areal density for the structural core 50 is about 142 gsm. The expanded core areal density is typically between about 700 gsm to about 1800 gsm, and preferably between about 900 to about 1700 gsm. In the exemplary construction detailed below (see Example 1), the expanded core areal density for the structural core 50 is about 1696 gsm.

While the exemplary embodiment described herein incorporates a honeycomb structural core formed of Kraft paper, the structural core 50 may be comprised of other core materials including, but not limited to balsa wood, thermoplastic, open and closed cell thermoplastic structural foams, and syntactic foams. Other types of honeycomb structures may also be suitable, for example honeycomb structures formed from inorganic paper, thermoplastic fiber paper, as well as metals (i.e. aluminum). In addition, while the cells forming the structural core 50 may have a hexagonal cross-sectional shape, the cells may be formed in a variety of other cross-sectional geometric configurations, including but not limited to triangles, squares and diamond-shape.

In some embodiments, particularly where there is a higher risk of water intrusion, the honeycomb structural core is preferably selected from a material less susceptible to water/moisture damage. These materials include, but are not limited to aluminum, foam expanded polypropylene (EPP), expanded polystyrene (EPS), and plastic honeycomb structures. A particularly preferred material for use in high moisture conditions is aluminum. Exemplary thicknesses and corresponding cell dimensions and structural properties for the structural core formed from Aluminum are found in the table below.

| Aluminum Honeycomb | | | | | | | |
|---|---|---|---|---|---|---|---|
| Thickness mm | Foil Thickness mm | Cell length mm | Cell size mm | Density g/m2 | Compressive Strength Mpa | Longitudinal Stress Strength Mpa | Trnasverse Stress Strength Mpa |
| 21 | 0.04 | 4.0 | 6.9 | 966 | 0.66 | 0.19 | 0.37 |
|  |  | 5.0 | 8.7 | 777 | 0.53 | 0.14 | 0.27 |
|  |  | 6.0 | 10.4 | 651 | 0.40 | 0.11 | 0.22 |
|  |  | 7.5 | 13.0 | 525 | 0.32 | 0.08 | 0.13 |
|  | 0.05 | 4.0 | 6.9 | 1197 | 0.82 | 0.19 | 0.37 |
|  |  | 5.0 | 8.7 | 945 | 0.64 | 0.14 | 0.27 |
|  |  | 6.0 | 10.4 | 798 | 0.49 | 0.11 | 0.22 |
|  |  | 7.5 | 13.0 | 630 | 0.38 | 0.08 | 0.13 |
|  | 0.06 | 4.0 | 6.9 | 1365 | 0.93 | 0.19 | 0.37 |
|  |  | 5.0 | 8.7 | 1092 | 0.74 | 0.14 | 0.27 |
|  |  | 6.0 | 10.4 | 924 | 0.57 | 0.11 | 0.22 |
|  |  | 7.5 | 13.0 | 735 | 0.45 | 0.08 | 0.13 |

Layered Section—General

The first and second layered sections 54, 58 cover the structural core 50, to impart strength, i.e. when placed under tension, as well as to prevent exposure to the elements (i.e. moisture, UV, etc.) and/or damage from use. More specifically, the first layered section 54 is coupled to the top surface 52 of the structural core 50, while the second layered section 58 is coupled to the bottom surface 56 of the structural core 50. Each of the first and second layered sections 54, 58 includes a reinforcement layer 62 and a coating layer 64. The reinforcement layer 62 is directly applied to the respective top and bottom surfaces 52, 56 of the structural core 50.

Layered Section—Reinforcement Layer (rCF)

In the exemplary embodiment presented herein, the reinforcement layer 62 is a carbon fiber mat. The carbon fiber mat may be woven, or nonwoven, and may be selected from virgin carbon fiber, recycled (also known as reclaimed) carbon fiber, or a combination of each. The carbon fiber mat may be intermingled with at least one type of thermoplastic or thermoset fiber and may be consolidated (i.e. compressed under elevated temperature). For example, the nonwoven mat may additionally include an acrylic fiber, a polyamide fiber (i.e. a nylon, for example nylon 6), a cellulous fiber, a thermoplastic fiber (i.e. polypropylene), a natural fiber, or a combination thereof. Other additives to the mat may include thermoplastic or thermoset binders (i.e. polyamide binder) or secondary fiber materials. Accordingly, in one embodiment, the consolidated nonwoven mat can contain:

a. 60 to 95 weight percent (wt. %) of recycled carbon fiber, and preferably 70 to 90 wt % of recycled carbon fiber;

b. 5 to 40 wt. % of a thermoplastic or thermoset fiber, and preferably 10 to 30 wt. % of the thermoplastic or thermoset fiber; and c. 0 to 10 wt. % of binder, and preferably 2 to 5 wt. % of binder.

The areal density of the consolidated nonwoven carbon fiber mat is typically between about 80 gsm to about 500 gsm, and preferably between about 100 gsm to about 300 gsm. In one exemplary construction detailed below (see Example 1), the consolidated nonwoven carbon fiber mat exhibits an areal density of about 120 gsm, based on a total mat construction of 82 wt. % recycled carbon fiber (rCF), 15 wt. % polypropylene fiber, and 3 wt. % binder.

The choice of mat construction, composition and density is chosen to meet the desired mechanical requirements for strength and durability. For example, in another exemplary construction intended for high-load applications, an areal density of about 150 gsm for the consolidated nonwoven carbon fiber mat may be selected. For low-load applications, the consolidated nonwoven carbon fiber mat may exhibit an areal density of about 120 gsm but with a reduced carbon fiber content, for example a total mat construction of 61 wt. % rCF, 20 wt. % nylon (i.e. PA6), 16 wt. % acrylic or cellulose-based fiber, and 3 wt. % binder. It will be appreciated that the targeted areal density of the consolidated recycled carbon fiber mat is a combined total of the recycled carbon fiber, the thermoplastic or thermoset fiber and the binder, and that the targeted areal density may be achieved through a range of component ratios. Stated differently, the proportion of the components, in particular the ratio of rCF to thermoplastic or thermoset fiber may be varied depending on the desired mechanical requirements, and the targeted areal density.

Layered Section—Coating Layer (Polyurethane)

The coating layer 64 of the first and second layered sections 54, 58 may be a thermoset resin, or a thermoplastic resin. When the coating layer 64 is a thermoset resin, the resin may be an epoxy, a vinyl ester, a phenolic, a polyester, a polyimide or a polyurethane. When the coating layer 64 is a thermoplastic resin, the resin may be a polycarbonate, a polyetherimide, a polyetherketone, a polysulfone, a polyester, a poly(arylene sulfide), a polyamide or a polyphenylene oxide resin. In the exemplary embodiment presented herein, the coating layer 64 is a thermoset resin, in particular an unfoamed polyurethane. Exemplary polyurethanes suitable for use in this application include, but are not limited to, ELASTOFLEX 28670R Resin/ELASTOFLEX 28670T Isocyanate and ELASTOFLEX 28680R Resin/ELASTOFLEX 28680T Isocyanate (BASF SE, Ludwigshafen, Germany). The application of the polyurethane upon the reinforcement layer 64 is typically between about 200 gsm to about 700 gsm, and preferably between about 300 to about 600 gsm. In one exemplary construction detailed below (see Example 1), the application of the polyurethane upon the reinforcement layer is about 450 gsm.

As polyurethane is applied to the reinforcement layer applied to each side of the structural core 50, the total polyurethane applied is about 900 gsm. It will be appreciated that the areal density selected for application to the reinforcement layer 64 will depend on a variety of targeted performance and/or aesthetic criteria, including but not limited to impact resistance, UV resistance, weathering resistance, texture definition, etc. A reduced amount of polyurethane may be applied, for example less than about 300 gsm where the resultant coating layer 64 is to be covered by a separately formed surface layer (as discussed in greater detail below).

The sandwich panel 48 may additionally comprise a surface layer 66. The surface layer 66 may be a film or may be vacuum formed or thermoformed. The surface layer 66 may be made from a colored or transparent thermoplastic resin material. The surface layer 66 may be formed from materials including, but not limited to polypropylene, thermoplastic polyolefin, acrylonitrile butadiene styrene (ABS) and polycarbonate-ABS. The surface layer 66 may be applied to one or both sides of the sandwich panel 48. For example, in one embodiment, the surface layer 66 is applied to an upper surface of the sandwich panel 48, in particular a top surface 68 of the first layered section 54 (as shown in FIG. 3). In another embodiment, the surface layer 66 is applied to both the upper and lower surfaces of the sandwich panel 48 (as shown in the process illustrations of FIGS. 4a to 4d). The surface layer 66 may be configured to have an A-Class finish and/or may be further finished (i.e. painted) as per any aesthetic requirements established for the tonneau cover 36. In some embodiments, the surface layer 66 is selected to enhance UV resistance, weatherability, and durability. For example, the surface layer 66 may be a typical truck bed spray coating, such as BASF ELASTOCAST. The surface layer 66 may be a single or multi-layer application of spray materials. The application of the spray coating may be between about 200 gsm to about 600 gsm and has a hardness of shore A 70-90. In one exemplary construction detailed below, the application of the spray coating is about 350 gsm.

It will be appreciated that variations and modifications to the exemplary embodiments presented above are possible, in particular where certain applications have specific mechanical requirements for strength and durability. While the reinforcement layer 62 applied to each side of the structural core 50 may be the same (see Example 1), for certain applications the reinforcement layer 26 applied to each side may be different. For example, in an alternative embodiment, the second layered section 58 applied to the bottom surface 56 of the structural core 50 may include a reinforcement layer having a higher areal density compared to the reinforcement layer applied to the top surface 52 of the structural core 50, to impart additional strength for top-side loads. In another alternative embodiment, a sandwich panel may include a first layered section (top-surface) reinforcement layer of about 95 gsm, while the second layered section (bottom-surface) reinforcement layer is about 120 gsm.

In other embodiments, the reinforcement layers 62 applied to the structural core 50 may be of differing composition. The composition selected may be based on a range of criteria, including specific mechanical requirements, and the availability/pricing of materials. For example, the top surface 52 of the structural core 50 may receive a reinforcement layer based on glass fiber, while the bottom surface 56 of the structural core 50 receives a reinforcement layer based on carbon fiber. In one exemplary embodiment, the top surface 52 of the structural core 50 receives a fiberglass-based reinforcement layer of about 450 gsm, while the bottom surface 56 of the structural core 50 receives a carbon fiber-based reinforcement layer of about 100 gsm.

In other variations of the sandwich panel, additional layers may be included on one or both sides. The additional layers may be selected to confer specific performance attributes, such as resistance to UV, or other environmental factors.

In some embodiments, the coating layer 64 being added to each side of the structural core 50 may be formulated differently or applied to a different areal density. For example, the coating layer 64 forming part of the first layered section 54 may contain additive(s) to enhance UV resistance, while the coating layer 64 forming part of the second layered section 58 may contain additives to enhance the strength performance of the panel.

Manufacture of the Sandwich Panel

A process for manufacturing the sandwich panel 48 will now be provided having regard to FIGS. 4a to 4d. In a first step (see FIG. 4a), the method comprises preforming a layup 80 consisting of the structural core 50 and the first and second reinforcement layers 62a, 62b. Preforming refers to the cutting of the structural core 50 and the first and second reinforcement layers 62a, 62b to the required dimensions, in accordance with the design of the desired tonneau cover section. With the structural core 50 and the first and second reinforcement layers 62a, 62b cut to size (which may be over-sized, and later pinch trimmed in a post-mold operation or post-trimmed following removal from the mold), the reinforcement layers 62a, 62b are aligned and placed upon the structural core 50. The coating layer (resin) 64a, 64b is then applied (i.e. sprayed) to the first and second reinforcement layers 62a, 62b based on a selected application amount, or in some embodiments until the reinforcement layers 62a, 62b are sufficiently wetted. The application of the coating layer 64a, 64b serves to adhere the reinforcement layers 62a, 62b to the structural core 50. In some embodiments, an additional spray or film adhesive may be used between the structural core 50 and one or both of the reinforcement layers 62a, 62b.

Figure 4A:
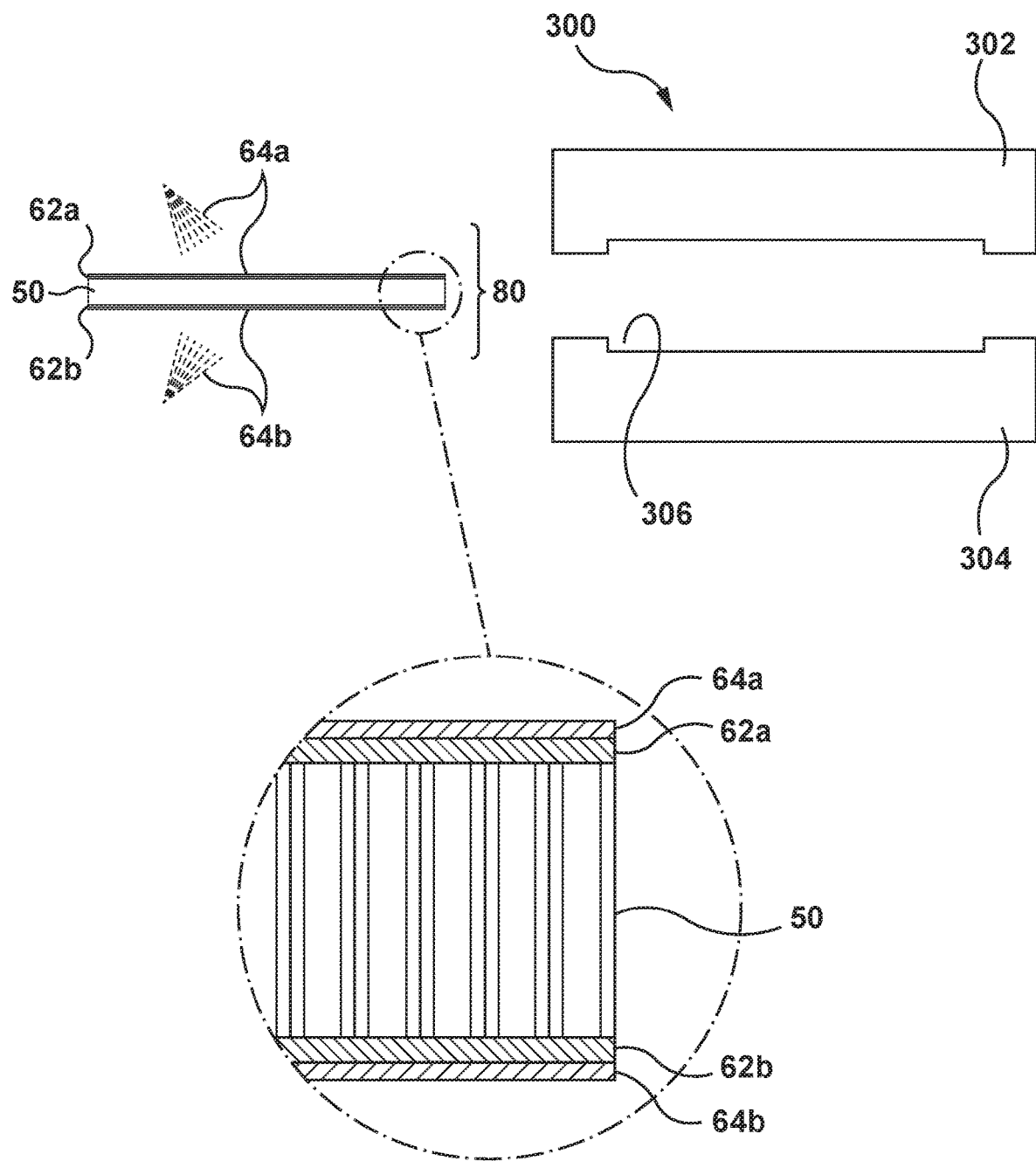
FIG. 4a shows a step involved in manufacturing the sandwich panel of FIG. 3.
Figure 4B:
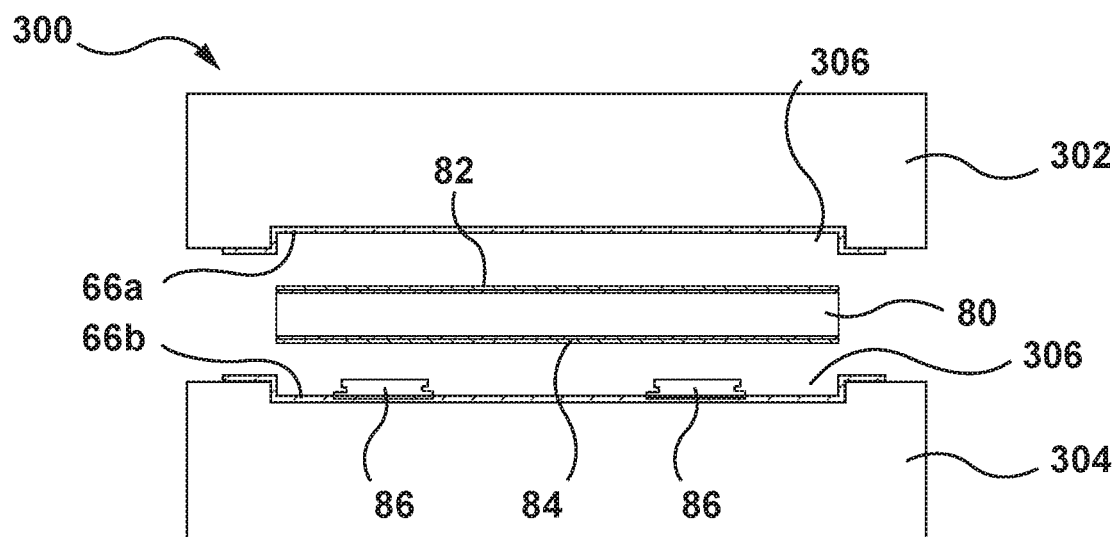
FIG. 4b shows a step involved in manufacturing the sandwich panel of FIG. 3.

Thereafter, the uncured layup 80 is placed in a mold tool 300 (see FIG. 4b). As shown, the mold tool 300 for forming the sandwich panel 48 comprises two mold halves, namely a first mold half 302 and a second mold half 304, which together in closed configuration define a mold cavity 306 for compression molding the sandwich panel 48.

In addition to the layup 80, the mold tool 300 may also receive additional layers to be incorporated into the sandwich panel. In the embodiment shown, the layup 80 receives the first surface layer 66a on a layup top-surface 82, and the second surface layer 66b on a layup bottom-surface 84 thereof. The first and second surface layers 66a, 66b are retained in position on respective mold halves 302, 304 using vacuum, as generally known in the art. At this step, the mold tool 300 may also receive other in-molded features, for example anchor inserts 86 intended to provide secure attachment points for functional hardware, including but not limited to hinges, latches, standoff towers, etc. The anchor inserts 86 are held in position at designated mounting points. To accommodate the anchor inserts 86, the surface layer(s) 66a, 66b may require trimming, in particular where the inserts 86 are at least partially exposed on the exterior of the final compression molded product.

Prior to their placement in the mold tool 300, the first and second surface layers 66a, 66b may be heated to a temperature which is at least above the softening temperature of the thermoplastic material. In some embodiments of the process, the first and second surface layers 66qa, 66b may also be preformed prior to be placed into the mold.

Figure 4C:
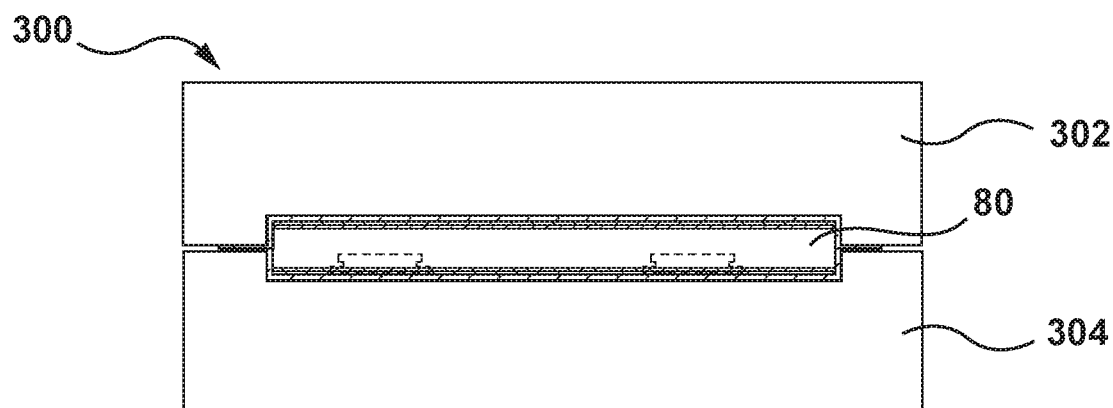
FIG. 4c shows a step involved in manufacturing the sandwich panel of FIG. 3.

With the layup 80, the first and second surface layers 66a, 66b and inserts 86 (if any) situated in the mold tool 300, the mold tool 300 is closed to compression mold and form the sandwich panel 48 (see FIG. 4c). With the reinforcement layers 62a, 62b on both sides of the layup 80 being wetted and yet uncured, upon closure of the mold tool 300, the contact between the uncured resin and the first and second surface layers 66a, 66b serves to effect molding, consolidation and bonding of all layers contained therein into the final sandwich panel 48. In the described embodiment, the molding is done in about 60 seconds and the applied molding pressure is about 15 bar. However, some constructions may have mold closure times of between about 30 seconds to about 90 seconds and applied molding pressures of between about 10 bar to about 20 bar. The mold tool is heated, typically to around 180-250° F.

Figure 4D:
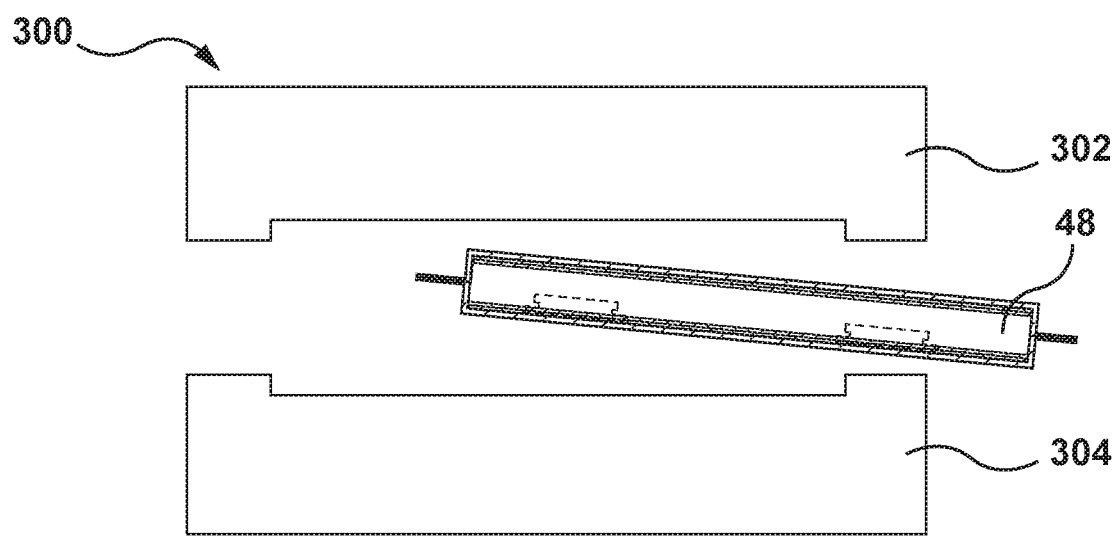
FIG. 4d shows a step involved in manufacturing the sandwich panel of FIG. 3.

When the compression molding has finished, the mold tool 300 is opened, and the sandwich panel 48 is removed from the mold tool 300 (see FIG. 4d). Before the sandwich panel 48 can proceed to further processing into the desired tonneau cover, the outer periphery 44 of the sandwich panel is trimmed, and possible burrs and the like are removed. Alternatively, the mold tool 300 may be constructed to pinch-trim the formed sandwich panel 48, therein reducing the number of post-mold trimming operations.

Exemplary Construction

With reference to FIG. 3 and having regard to the preceding discussion on the composition and construction of the sandwich panel 48, there is no intention to restrict the various components, in particular the stated quantified parameters (i.e. areal density) to the ranges noted. The sandwich panel 48 and tonneau cover 36 incorporating the sandwich panel construction may include reinforcement layers, in particular the carbon fiber mat, and polyurethane resin that exhibit areal densities that are either above or below the exemplary ranges specified.

In addition, any numerical ranges recited herein include all values from the lower value to the upper value in increments of one unit provided that there is a separation of at least two units between any lower value and any higher value. As an example, if it is stated that the concentration or amount of a component or value of a process variable is, for example, typically between about 1 to about 90, and preferably between about 30 to about 70, it is intended that values such as 15 to 85, 22 to 68, 43 to 51, 30 to 32, etc. are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Accordingly, the panel construction noted below is merely exemplary, but has been found to be a useful construction for general use in the tonneau cover 36.

| Composition | EXAMPLE 1 |
| --- | --- |
| Structural Core 50 (kraft paper; Axxor Core honeycomb) | cell size: 8 mm<br>cell wall thickness: 0.16 mm<br>core thickness: 30 mm<br>paper density: 142 gsm<br>expanded core density: 1696 gsm |
| Reinforcement layer 62 (consolidated non-woven recycled carbon fiber; one layer applied per side of structural core) | 82 wt % rCF<br>15 wt % polypropylene fiber<br>3 wt % binder<br>total areal density: 120 gsm |
| Resin 64 | unfoamed polyurethane (i.e. ELASTOFLEX 28670R Resin/ELASTOFLEX 28670T Isocyanate and ELASTOFLEX 28680R Resin/ELASTOFLEX 28680T Isocyanate 450 gsm (per side) |

Referring now to Tables 1, 2 and 3, presented is comparative data for sandwich panels 48 formed of both rCF and glass fiber. Table 1 is directed to constructions based on a structural core 50 having a thickness of 20 mm; Table 2 is directed to constructions based on a structural core 50 having a thickness of 15 mm; and Table 3 is directed to constructions based on a structural core 50 having a thickness of 10 mm. The data is based on a 4-point bend test (ASTM D7249/D7249M) with various construction specimens (600 mm×75 mm; 0.045 m$^2$) and determining maximum load (N) and deflection (mm; at maximum load) performance. Comparisons are made between rCF and GF constructions at approximately equivalent maximum load values, where a % weight savings and % decrease in deflection are noted for the rCF construction.

TABLE 1

Comparative Data - GF-rCF Equivalence for Structural Core Thickness = 20 mm
GF-RCF Equivalents Table - Structural Core Thickness = 20 mm

| Specimen | Structural Core 50 | Reinforcement Layer 62 | Reinforcement Layer 62 Applied (gsm) | Resin 64 [PU] (gsm)] | Total Weight (g/m$^\wedge$2) | Load Max (N) | Max Deflection (mm) | rCF % Weight Savings (at equiv Load Max) | rCF % Decrease in Deflection (at equiv Load Max) |
| --- | --- | --- | --- | --- | --- | --- | --- | --- | --- |
| 20-10-29-300GF | core thickness: 20 mm | GF | 300 | 300 | 1977.8 | 300.15 | 22.8 | | |
| 20-10-29-450GF | cell size: 10 mm | GF | 450 | 450 | 2577.8 | 446.37 | 21.35 | | |
| 20-10-29-600GF | paper density: 142 gsm | GF | 600 | 600 | 3177.8 | 559.24 | 20 | | |
| 20-10-29-300GF_RCF Equ | cell wall thickness: 0.16 mm | rCF | 150 | 340 | 1757.8 | 300.88 | 13.98 | 11.1 | 38.7 |

TABLE 1-continued

Comparative Data - GF-rCF Equivalence for Structural Core Thickness = 20 mm
GF-RCF Equivalents Table - Structural Core Thickness = 20 mm

| Specimen | Structural Core 50 | Reinforcement Layer 62 | Reinforcement Layer 62 Applied (gsm) | Resin 64 [PU] (gsm) | Total Weight (g/m$^2$) | Load Max (N) | Max Deflection (mm) | rCF % Weight Savings (at equiv Load Max) | rCF % Decrease in Deflection (at equiv Load Max) |
|---|---|---|---|---|---|---|---|---|---|
| 20-10-29-450GF_RCF Equ | expanded core density: | rCF | 231 | 340 | 1919.8 | 442.84 | 12.9 | 25.5 | 39.6 |
| 20-10-29-600GF_RCF Equ | 777.8 gsm | rCF | 285 | 340 | 2027.8 | 563.76 | 14.62 | 36.2 | 26.9 |

TABLE 2

Comparative Data - GF-rCF Equivalence for Structural Core Thickness = 15 mm
GF-RCF Equivalents Table - Structural Core Thickness = 15 mm

| Specimen | Structural Core 50 | Reinforcement Layer 62 | Reinforcement Layer 62 Applied (gsm) | Resin 64 [PU] (gsm) | Total Weight (g/m$^2$) | Load Max (N) | Max Deflection (mm) | rCF % Weight Savings (at equiv Load Max) | rCF % Decrease in Deflection (at equiv Load Max) |
|---|---|---|---|---|---|---|---|---|---|
| 15-10-29-300GF | core thickness: 15 mm | GF | 300 | 300 | 1777.8 | 194.32 | 23.36 | | |
| 15-10-29-450GF | cell size: 10 mm | GF | 450 | 450 | 2377.8 | 331.97 | 28.41 | | |
| 15-10-29-600GF | paper density: 142 gsm | GF | 600 | 600 | 2977.8 | 423.26 | 29.89 | | |
| 15-10-29-300GF_RCF Equ | cell wall thickness: 0.16 mm | rCF | 138 | 340 | 1533.8 | 195.06 | 15.83 | 13.7 | 32.2 |
| 15-10-29-450GF_RCF Equ | expanded core density: | rCF | 254 | 340 | 1765.8 | 330.47 | 15.95 | 25.7 | 43.9 |
| 15-10-29-600GF_RCF Equ | 577.8 gsm | rCF | 303 | 340 | 1863.8 | 422.8 | 17.52 | 37.4 | 41.4 |
| 15-8-29-300GF | core thickness: 15 mm | GF | 300 | 300 | 2022.2 | 215.05 | 26.44 | | |
| 15-8-29-450GF | cell size: 8 mm | GF | 450 | 450 | 2622.2 | 367.59 | 29.06 | | |
| 15-8-29-600GF | paper density: 142 gsm | GF | 600 | 600 | 3222.2 | 492.44 | 29.69 | | |
| 15-8-29-300GF_RCF Equ | cell wall thickness: 0.16 mm | rCF | 140 | 340 | 1782.2 | 211.18 | 17.32 | 11.9 | 34.5 |
| 15-8-29-450GF_RCF Equ | expanded core density: | rCF | 233 | 340 | 1968.2 | 370.01 | 18.05 | 24.9 | 37.9 |
| 15-8-29-600GF_RCF Equ | 822.2 gsm | rCF | 299 | 340 | 2100.2 | 492.31 | 20.15 | 34.8 | 32.1 |

TABLE 3

Comparative Data - GF-rCF Equivalence for Structural Core Thickness = 10 mm
GF-RCF Equivalents Table - Structural Core Thickness = 10 mm

| Specimen | Structural Core 50 | Reinforcement Layer 62 | Reinforcement Layer 62 Applied (gsm) | Resin 64 [Pu] (gsm) | Total Weight (g/m$^2$) | Load Max (N) | Max Deflection (mm) | rCF % Weight Savings (at equiv Load Max) | rCF % Decrease in Deflection (at equiv Load Max) |
|---|---|---|---|---|---|---|---|---|---|
| 10-10-29-300GF | core thickness: 10 mm | GF | 300 | 300 | 1577.8 | 138.16 | 36.73 | | |
| 10-10-29-450GF | cell size: 10 mm | GF | 450 | 450 | 2177.8 | 233.75 | 41.43 | | |
| 10-10-29-600GF | paper density: 142 gsm | GF | 600 | 600 | 2777.8 | 325.67 | 42.1 | | |
| 10-10-29-300GF_RCF Equ | cell wall thickness: 0.16 mm | rCF | 140 | 340 | 1337.8 | 137.3 | 23.51 | 15.2 | 36.0 |
| 10-10-29-450GF_RCF Equ | expanded core density: | rCF | 245 | 340 | 1547.8 | 233.41 | 23.08 | 28.9 | 44.3 |
| 10-10-29-600GF_RCF Equ | 377.8 gsm | rCF | 340 | 340 | 1737.8 | 328.15 | 25.19 | 37.4 | 40.2 |
| 10-8-29-300GF | core thickness: 10 mm | GF | 300 | 300 | 1755.6 | 162.54 | 40.19 | | |
| 10-8-29-450GF | cell size: 8 mm | GF | 450 | 450 | 2355.6 | 245.12 | 41.55 | | |
| 10-8-29-600GF | paper density: 142 gsm | GF | 600 | 600 | 2955.6 | 347.16 | 44.89 | | |
| 10-8-29-300GF_RCF Equ | cell wall thickness: 0.16 mm | rCF | 150 | 340 | 1535.6 | 158.94 | 22.65 | 12.5 | 43.6 |
| 10-8-29-450GF_RCF Equ | expanded core density: | rCF | 220 | 340 | 1675.6 | 249.05 | 27.32 | 28.9 | 34.2 |
| 10-8-29-600GF_RCF Equ | 555.6 gsm | rCF | 315 | 340 | 1865.6 | 349.16 | 28.56 | 36.9 | 36.4 |

The performance advantage of using rCF versus glass fiber is clearly demonstrated in the above tables, where for a given Load Max value, there is an observed weight savings in the rCF construct compared to the glass fiber construct. With the specific constructions noted, the percent weight savings in the rCF construction ranges from about 11% to about 37%. Also noteworthy is the improved deflection performance, where at a given the Load Max value, there is a decreased deflection in the rCF construction compared to the glass fiber construct. With the specific constructions noted, the percent decrease in deflection in the rCF construction ranges from about 26% to about 44%.

Edge Trim

Figure 5:
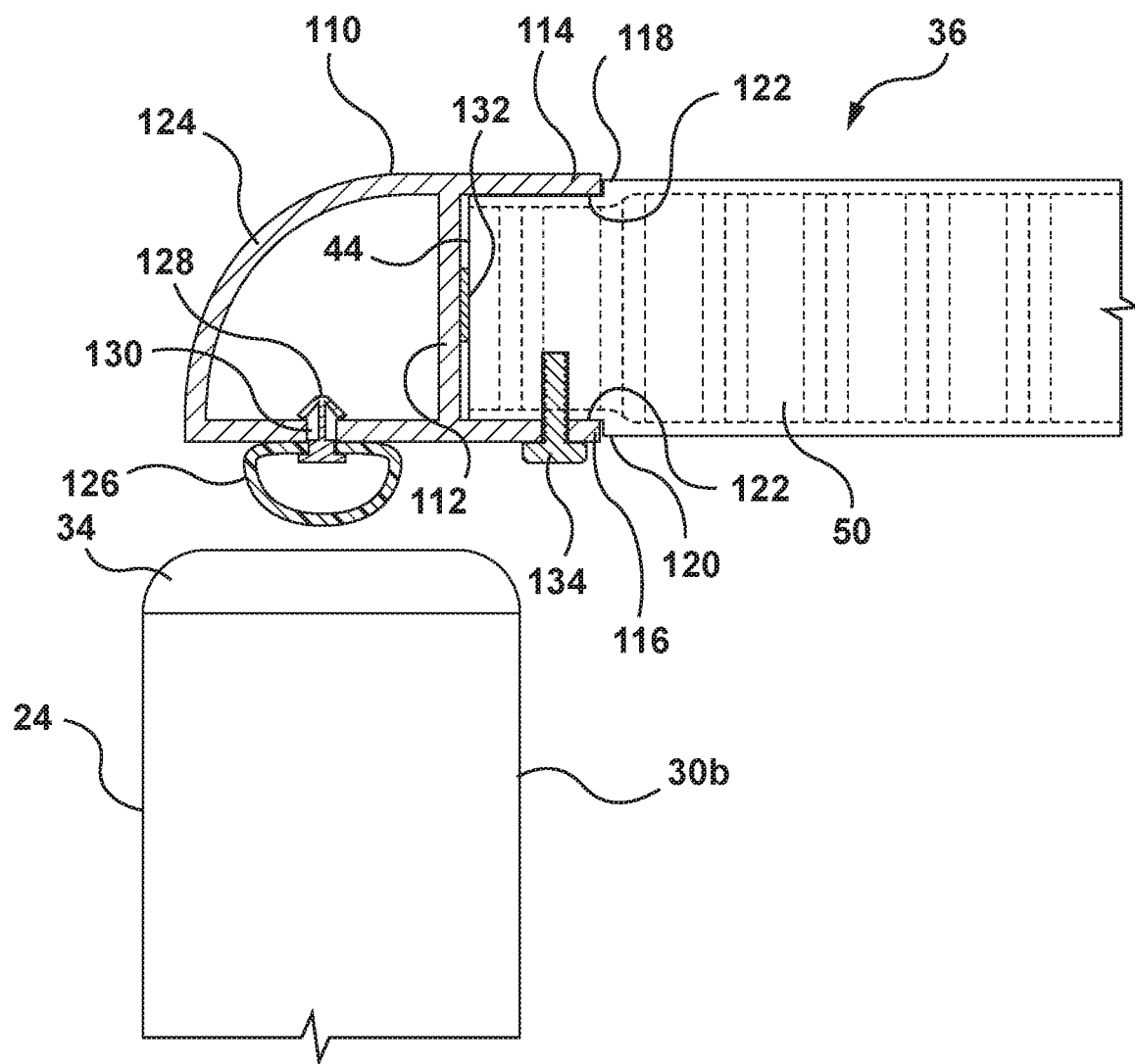
FIG. 5 is a sectional view of a first embodiment of an edge trim, used for finishing the edges of the sandwich panel of FIG. 3.

Referring now to FIG. 5, the tonneau cover 36 includes an edge trim 110 to cover at least a portion of the outer periphery 44. The edge trim 110 may be configured in a variety of ways, and may provide a variety of attributes, including but not limited to structural attributes, functional attributes, aesthetic attributes, or combinations of these. The edge trim 110 protects the honeycomb core 50 from external moisture and debris, and further protects the outer periphery 44 from damage (i.e. due to impact). The edge trim 110 may also form the interface between the tonneau cover 36 and the bed rail 34 of the cargo bed 24, and additionally may include functional features for closure/locking the tonneau cover 36 in the closed position. Accordingly, the edge trim 110 may be configured in a variety of ways, depending on a range of factors, and the cargo bed 24 upon which the tonneau cover 36 is installed.

With reference to FIG. 5, the edge trim 110 includes a C-shaped channel 112 having an upper flange 114 and a lower flange 116. The upper and lower flanges 114, 116 fit upon respective upper and lower margins 118, 120 of the tonneau cover 36, adjacent the outer periphery 44. At least one of the upper and lower margins 118, 120 may optionally provide a cutout 122 to at least partially recess the upper and lower flanges 114, 116 into the sandwich panel 48 of the tonneau cover 36, to provide a generally planar appearance at the point of attachment. In an embodiment, the cutout 122 is tapered for ease of installation of the extrusion. The edge trim 110 additionally includes a curved portion 124 that extends outwardly and arcs downwardly over the bed rail 34 of the pickup truck cargo bed 24.

The edge trim 110 supports a rail seal 126. The rail seal 126 is configured to position between the edge trim 110 and the bed rail 34 around the periphery of the tonneau cover 36, to prevent the ingress of water and debris into the cargo bed 24. The rail seal 126 is attached to the edge trim 110 using suitable fasteners. The rail seal 126 is shown being attached to the edge trim 110 using one or more Christmas tree-type fasteners 128, as typically used in the automotive industry. The fasteners 128 are received in apertures 130, provided in the edge trim 110. The rail seal 126 is formed of a rubber or similar material having the required pliability to form a sufficient seal against the bed rail 34. While the rail seal 126 is shown in the form of a bulb seal, it will be appreciated that seals having other cross-sectionals profiles may be implemented.

In some embodiments, an additional foam seal 132 may be added between the edge trim 110 and the outer periphery 44 of the of the sandwich panel 48 forming the tonneau cover 36. The foam seal 132 is used for added protection and/or resistance to possible wicking of moisture by the paper core at the pinch point, that is the region along the outer periphery 44 where each of the upper and lower layers (i.e. the reinforcement layer and the coating layer) meet.

The attachment between the edge trim 110 and the sandwich panel 48 is achieved through the use of a suitable adhesive, including but not limited to two-component polyurethane (2K-PU) adhesives or a pressure-sensitive adhesive (PSA) tape. In addition to bonding the edge trim 110 to the outer periphery 44, the adhesive may also serve as a sealant to prevent water and/or debris from contaminating the pinch point. As an alternative or in addition to adhesive, the attachment between the edge trim 110 and the sandwich panel 48 may be further secured through the use of fasteners. In the embodiment shown, a threaded fastener 134 is used to secure the edge trim 110 to the sandwich panel 48. In will be appreciated that the manner by which the edge trim is fixedly attached to the sandwich panel will take on a variety of forms. In some embodiments, the attachment between the edge trim and the sandwich panel may be achieved solely through the use of adhesive or solely through the use of threaded fasteners, or a combination of adhesive and threaded fasteners.

Figure 6:
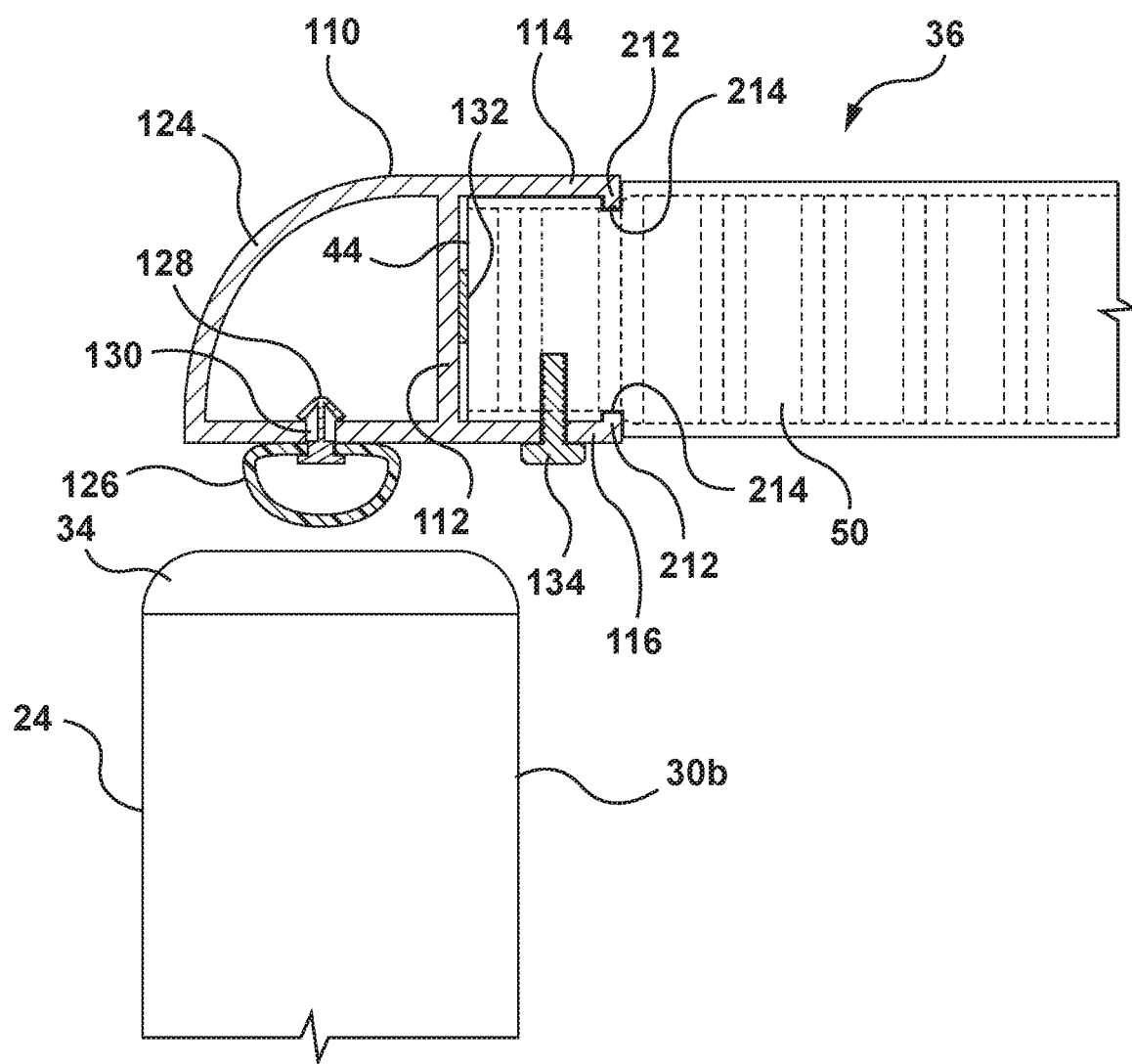
FIG. 6 is a sectional view of a second embodiment of an edge trim, used for finishing the edges of the sandwich panel of FIG. 3.

With reference to FIG. 6, an alternative edge trim 210 is shown. This embodiment is similar to the embodiment shown in FIG. 5, with the exception that the upper and lower flanges 114, 116 include a tab 212 that cooperates with a corresponding groove 214 on the respective upper and lower margins 118, 120. The tab 212 and groove 214 arrangement provides a mechanical attachment of the edge trim 110 to the outer periphery 44, in addition to the use of adhesives and/or fasteners. Further, when the edge trim 210 is formed from a thermoplastic material, the tab 212 will flex during installation.

While any thermoplastic which is extrudable and/or moldable may be used for the edge trim 110, the selected thermoplastic must have the characteristics to be acceptable in the range of heat and cold that might be expected of a tonneau cover which is left outside on a winter night, or subject to direct sun, heat loading in the summer. An exemplary material for this application would be ABS polymer or co-polymers thereof. In another embodiment, the edge trim 110 is aluminum and formed via extrusion or bonded to the sandwich panel 48 via an adhesive.

While the outer periphery of the sandwich panel has been shown to include an edge trim 110, in some embodiments the construction of the sandwich panel may not necessitate the use of an edge trim as shown. For example, in some embodiments the outer periphery may be finished with a side rail, for example one constructed of aluminum. The aluminum side rail could be fixedly attached to the outer periphery using a suitable adhesive (i.e. 2K PU), suitable fasteners (i.e. threaded fasteners), or a combination thereof.

Insert Molded Anchor Insert

Figure 7:
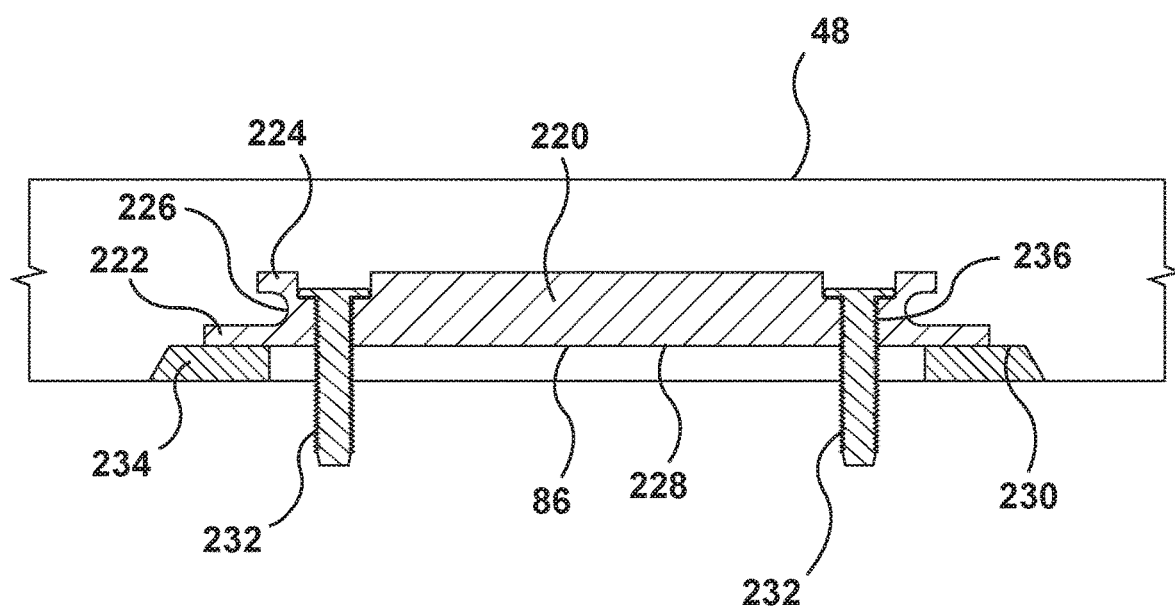
FIG. 7 is a partial sectional view of the sandwich panel of FIG. 3, showing an anchor insert intended to provide a secure attachment point for functional hardware.

To facilitate the attachment of fixtures, for example latching hardware, a separately formed anchor insert is provided in the sandwich panel, the anchor insert being configured to include and/or receive one or more fasteners for attaching the fixture thereto. With reference to FIG. 7, shown is an anchor insert 86. The anchor insert 86 is configured to be insert molded into the sandwich panel 48. The anchor insert 86 includes a primary body 220 having a first flange 222 and a second flange 224 separated by a circumferential groove 226. In the embodiment shown, the primary body 220, in particular the first and second flanges 222, 224 are generally rectangular with rounded corners, with the first flange 222 being dimensionally larger in both width and length compared to the second flange 224. The first flange 222 includes an exterior-side surface 228 which aligns generally flush to a surface 230 of the sandwich panel 48. The second flange 224 is regarded as the interior flange, as it positions within the sandwich panel 48 upon being insertion molded. The circumferential groove 226 provides a recess to receive resin during the molding operation, to thereby mechanically lock the anchor insert 86 in position within the sandwich panel 48. In the embodiment shown, the anchor insert 86 includes two threaded fasteners 232 that extend outwardly and beyond the surface 230 of the sandwich panel 48, to permit for attachment of fixtures. In some embodiments, the anchor insert 86 may be located within a recess 234 of the sandwich panel 48.

The anchor insert 86 is injection molded and may be formed from a range of materials including, but not limited to, polypropylene, thermoplastic polyolefins (TPO), acrylonitrile-butadiene-styrene (ABS), polycarbonate (PC), polybutadiene terephthalate (PBT), polyethylene terephthalate (PET), nylon, polyvinyl chloride (PVC), polystyrene (PS), polyethylene (PPE), and blends of the above materials with other suitable materials (e.g. fillers including, but not limited to glass fibres, talc, etc.). In one particular embodiment, the anchor insert 86 is constructed using ABS.

The anchor insert 86 may also be formed of metallic or non-metallic materials. Suitable metallic materials may include metal alloys, while non-metallic materials may include polymers and polymer-based composites (with or without material additives such as glass-fiber, carbon fiber, etc.), as well as glass-filled component technologies.

Continuing with FIG. 7, the threaded fasteners 232 are inserted through apertures 236 provided on the primary body 220 of the anchor insert 86. The threaded fasteners 232 are either separately bonded to the primary body 220, or through the insert-molding operation, the threaded fasteners 232 are fixed and locked in the position shown. The threaded fasteners are of metallic construction (i.e. steel, stainless steel, specialty metals, etc.) and include a thread that cooperates with a mating female fastener (not shown) to secure the fixture in place. It will be appreciated that while the anchor insert is shown as having male threaded fasteners, in some embodiments the anchor insert may be configured to have female threaded fasteners.

While the anchor insert 86 is shown as a generally rectangular elongate structure with rounded corners, the anchor insert may be shaped in a variety of configurations, depending on the intended installation and mechanical requirements for the insert. For example, in an alternative embodiment, the primary body of the anchor insert may be formed in a generally squared configuration. In still further alternative embodiments, the anchor insert may be formed in a generally round configuration.

Tonneau Cover Alternatives—Tri-Fold Tonneau Cover

Figure 8A:
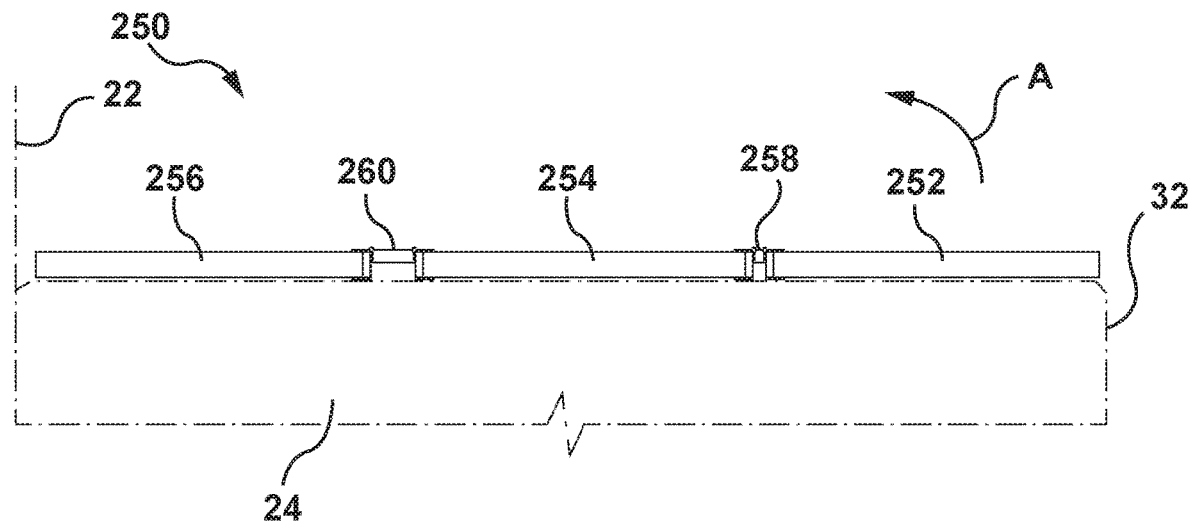
FIG. 8a shows an alternative embodiment of a tonneau cover incorporating three sections that can be roll-folded to permit user access to a cargo bed.
Figure 8B:
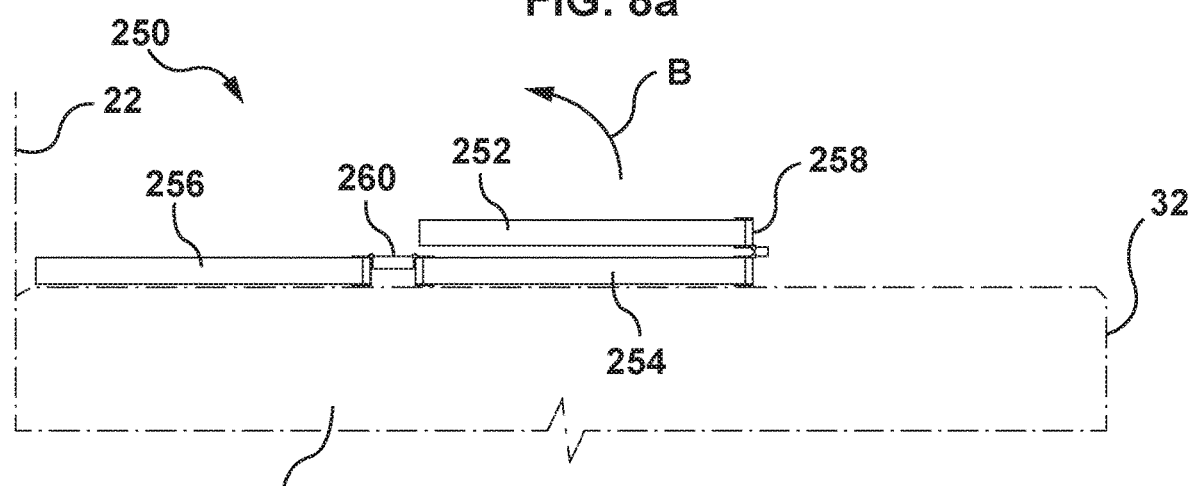
Figure 8C:
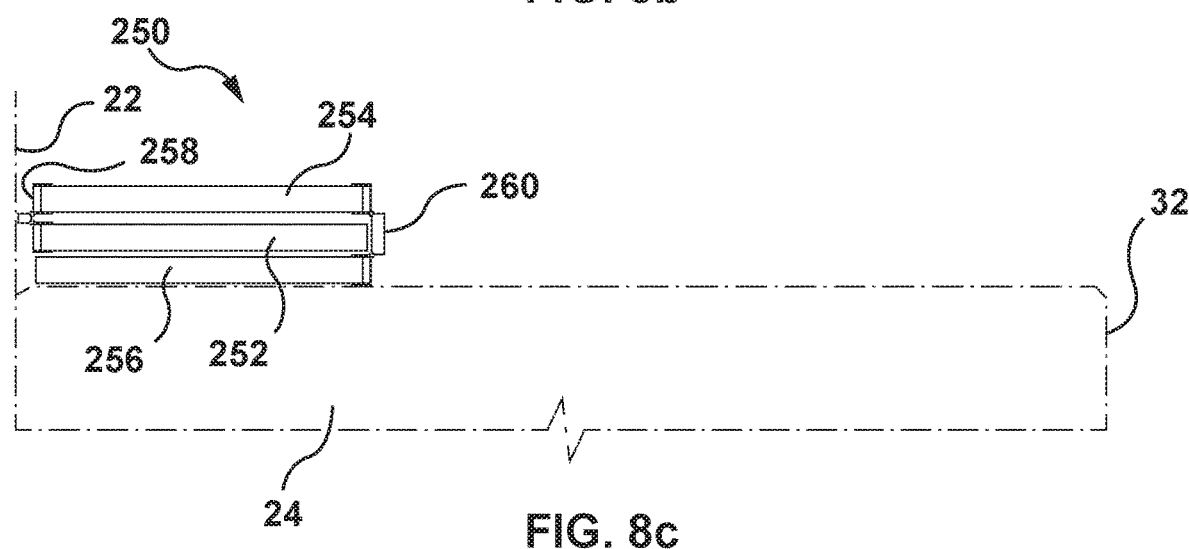

The sandwich panel construction, in particular the sandwich panel 48 based on the honeycomb core 50 and recycled carbon fiber has been discussed above with respect to a tonneau cover having a single panel configuration. The mechanical advantages with respect to strength and durability achievable with this type of sandwich panel construction may be applied to other tonneau cover systems, including those having 2, 3 or more operably connected panels. For example, as shown in FIGS. 8a to 8c, the sandwich panel 48 may be incorporated into a tonneau cover 250 having three panels, namely a rear panel 252, an intermediate panel 254, and a forward panel 256. When installed on the cargo bed 24 of a pickup truck, the rear panel 252 positions closest to the tailgate 32; the forward panel 256 positions closest to the cab 22, and the intermediate panel 254 positions between the rear and forward panels 252, 256 as shown.

In this configuration, the tonneau cover 250 is foldable, to permit a user access to the cargo bed 24 as required. While a variety of folding configurations are known in the art, the tonneau cover 250 as presented in FIGS. 8a-8c is configured to be 'roll' folded from the closed position (as shown in FIG. 8a), to an intermediate partially open position (as shown in FIG. 8b), and finally to an open position (as shown in FIG. 8c). The 'roll' folding action of the tonneau cover 250, denoted by arrows A and B in FIGS. 8a and 8b rotates the rear panel 252 and the combined rear and intermediate panels 252, 254 of the tonneau cover 250 forwardly towards the cab 22, therein enabling access to the rear area of the cargo bed 24.

To permit the tonneau cover 250 to be 'roll' folded as shown, a first hinge assembly 258 is provided between the rear and intermediate panels 252, 254, and a second hinge assembly 260 is provided between the intermediate and forward panels 254, 256. A variety of hinge assemblies may be used to achieve a 'roll' folding action, including but not limited to bendable/compliant hinges (i.e. living hinges formed as an integral part of the panels) and double acting hinges.

Tri-Fold Tonneau Cover—Second Embodiment

Figure 9A:
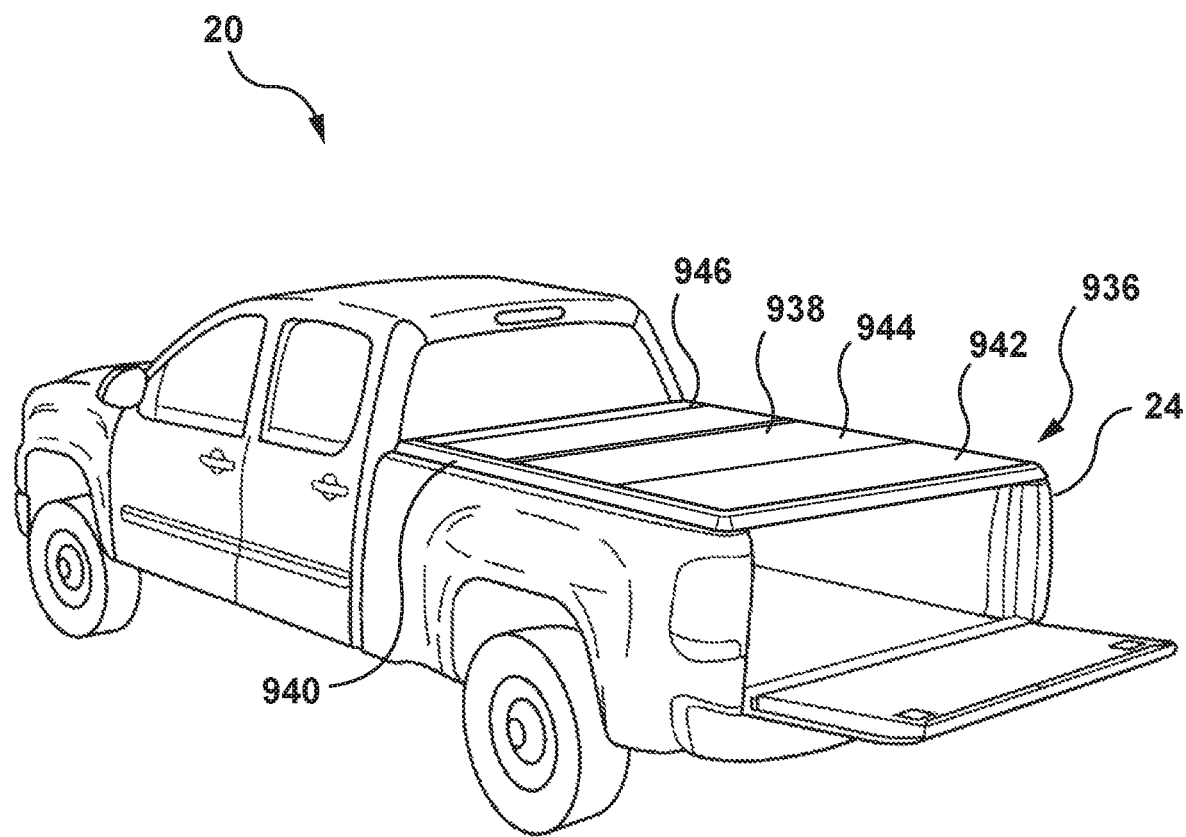
FIG. 9a is a rear perspective view of the pickup truck according to FIG. 1, showing a second embodiment of a tonneau cover assembly installed on the cargo bed, the tonneau cover shown as a tri-fold tonneau cover in a closed position.

Another embodiment of a tri-fold tonneau cover will now be described with respect to FIGS. 9a-30. Referring now to FIG. 9a, shown is the vehicle or pickup truck 20 having a tonneau cover assembly 936 mounted upon the cargo bed 24. The tonneau cover assembly 936 includes a tri-fold tonneau cover 938 and a surrounding rail system 940. The tri-fold tonneau cover 938 includes a first panel 942, a second panel 944, and a third panel 946. Each of the panels are generally planar structures and may be constructed in a variety of ways. A preferred construction will be described in greater detail below.

Figure 9B:
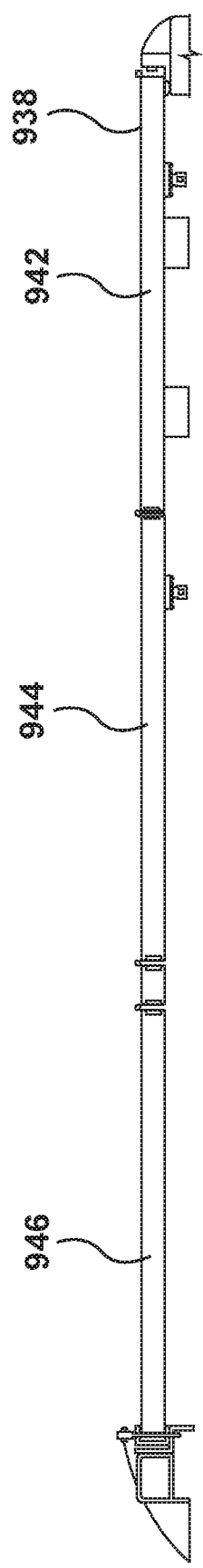
FIG. 9b is a side view of the tonneau cover assembly according to FIG. 9a, showing the tonneau cover in the closed position.
Figure 10A:
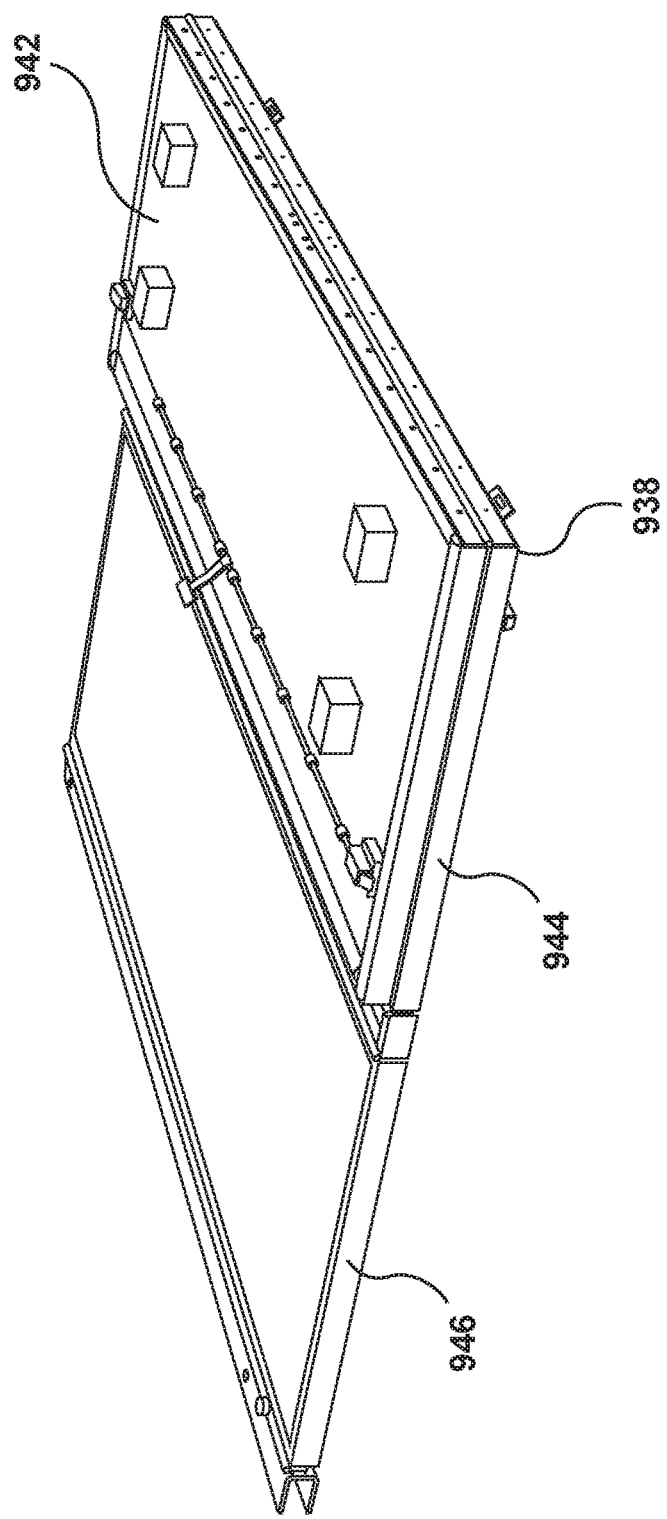
FIG. 10a is a perspective view of the tonneau cover assembly according to FIG. 9a, showing the tonneau cover in a first opened position.
Figure 10B:
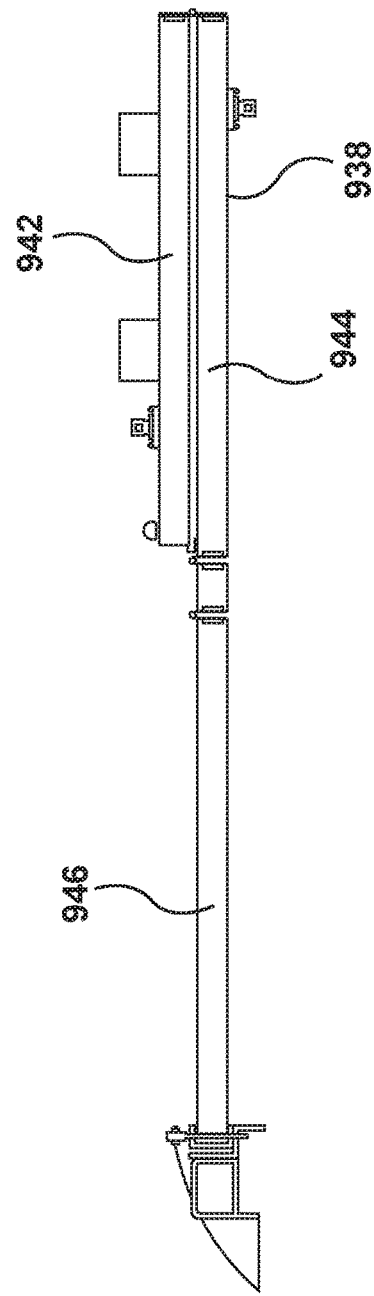
FIG. 10b is a side view of the tonneau cover assembly according to FIG. 9a, showing the tonneau cover in the first opened position.
Figure 11A:
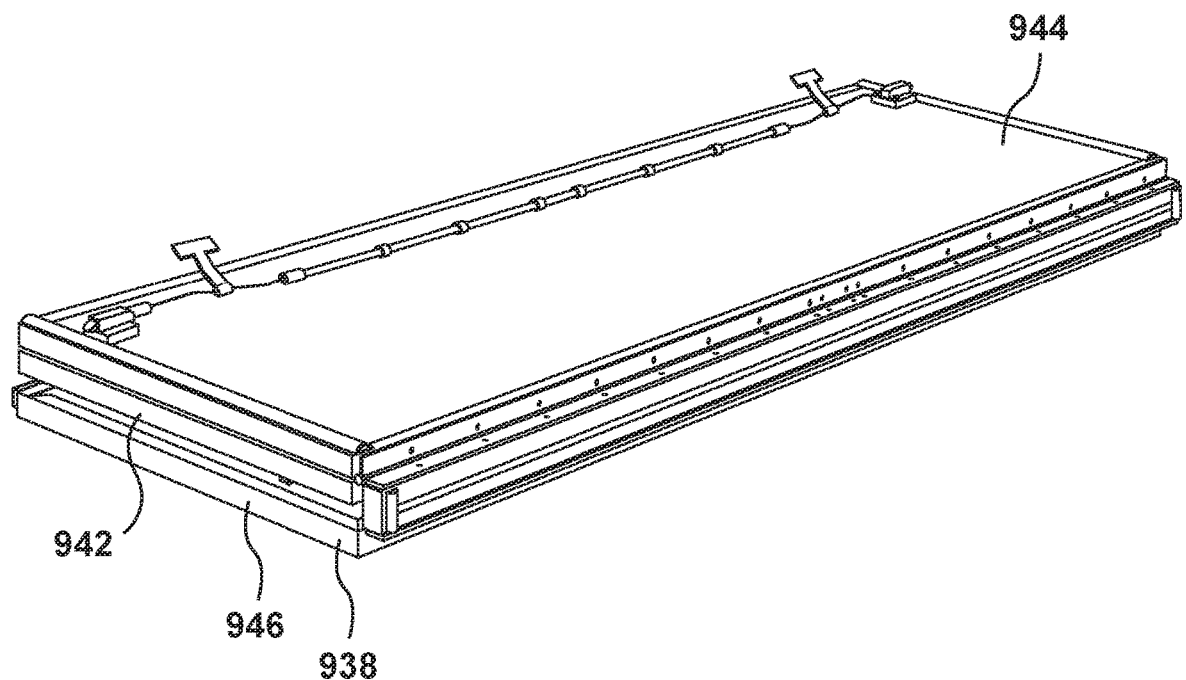
FIG. 11a is a perspective view of the tonneau cover assembly according to FIG. 9a, showing the tonneau cover in a second opened position.
Figure 11B:
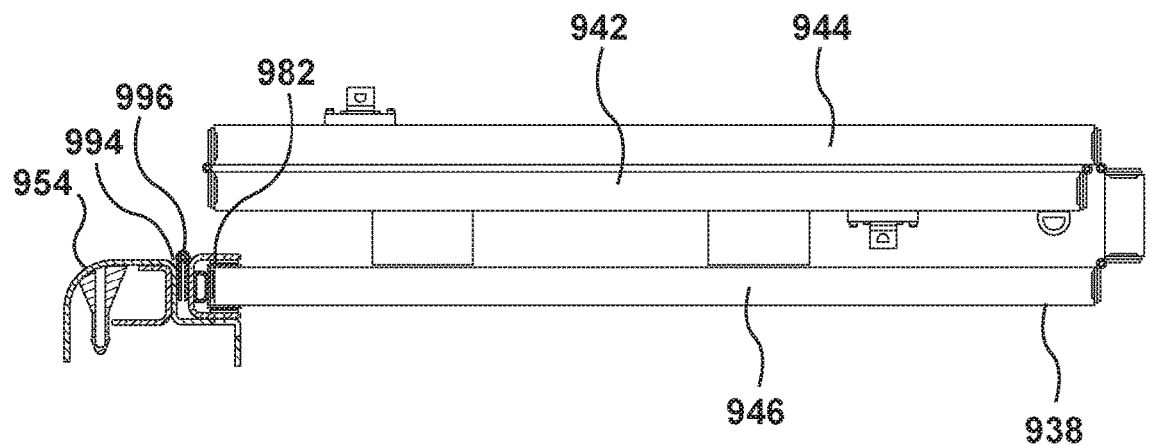
FIG. 11b is a side view of the tonneau cover assembly according to FIG. 9a, showing the tonneau cover in the second opened position.
Figure 12B:
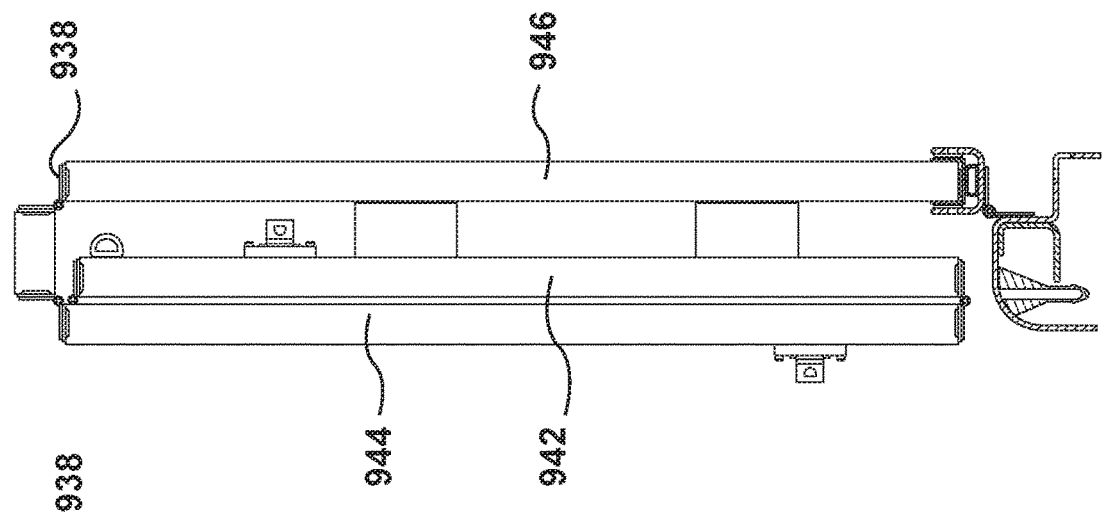
FIG. 12b is a side view of the tonneau cover assembly according to FIG. 9a, showing the tonneau cover in the third opened position.
Figure 12A:
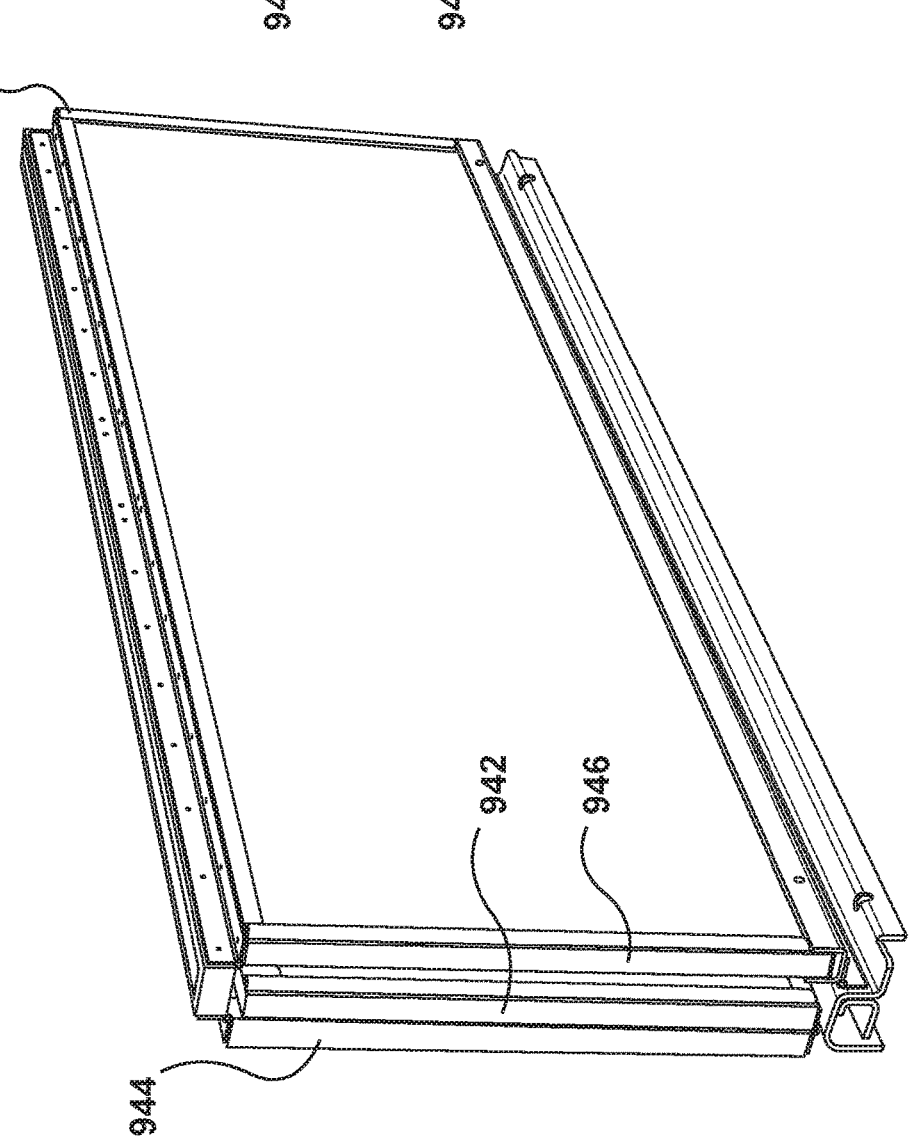
FIG. 12a is a perspective view of the tonneau cover assembly according to FIG. 9a, showing the tonneau cover in a third opened position.

In the closed configuration (as shown in FIGS. 9a and 9b), the first panel 942 is arranged to be situated towards the rear of the cargo bed 24, and the third panel 946 is arranged to be situated towards the front of the cargo bed 24. The second panel 944 is an intermediate panel, arranged between the first and third panels 942, 946. The tri-fold arrangement for the tonneau cover 938 permits for ease of operation (i.e. opening/closing) of the tonneau cover 938 when access/closure to the cargo bed 24 is necessary. In general, a first step in opening the tri-fold tonneau cover 938 is to rotate the first panel 942 from a closed position (as shown in FIGS. 9a and 9b), to a first opened position (as shown in FIGS. 10a and 10b). A second step in opening the tri-fold tonneau cover 938 is to rotate the collected arrangement of the first and second panels 942, 944 from the first opened position (as shown in FIGS. 10a and 10b), to a second opened position (as shown in FIGS. 11a and 11b). The tri-fold tonneau cover 938 may be further opened during a third step where the collected arrangement of the first, second and third panels 942, 944, 946 are rotated from the second opened position (as shown in FIGS. 11a and 11b) to a third opened position (as shown in FIGS. 12a and 12b). Additional details on the mechanisms permitting the operation of the tonneau cover 938 will be described in greater detail below.

Figure 13A:
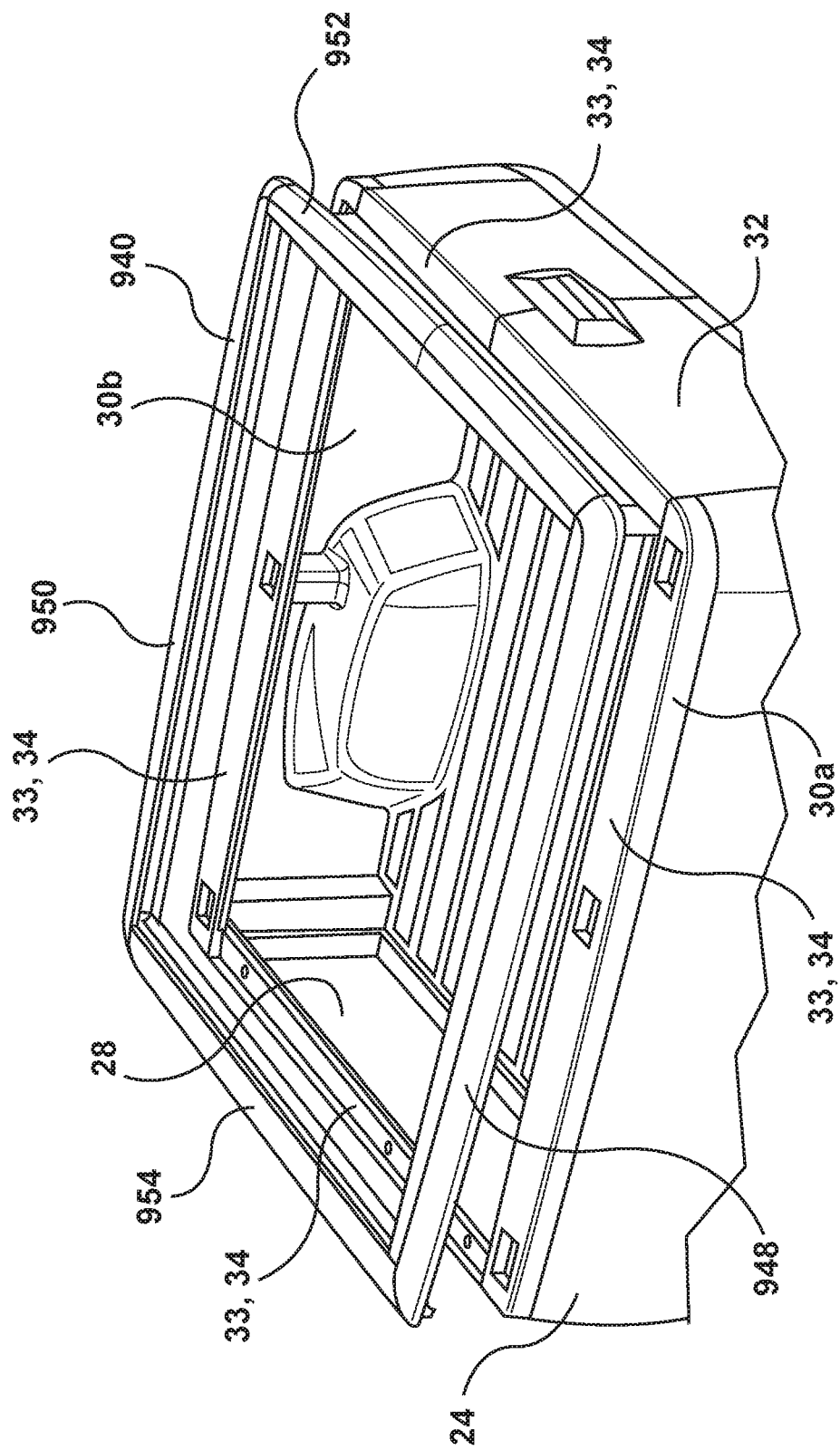
FIG. 13a is a perspective view of the tonneau cover assembly according to FIG. 9a, showing a rail system for mounting the tonneau cover to the cargo bed of the pickup truck.
Figure 13B:
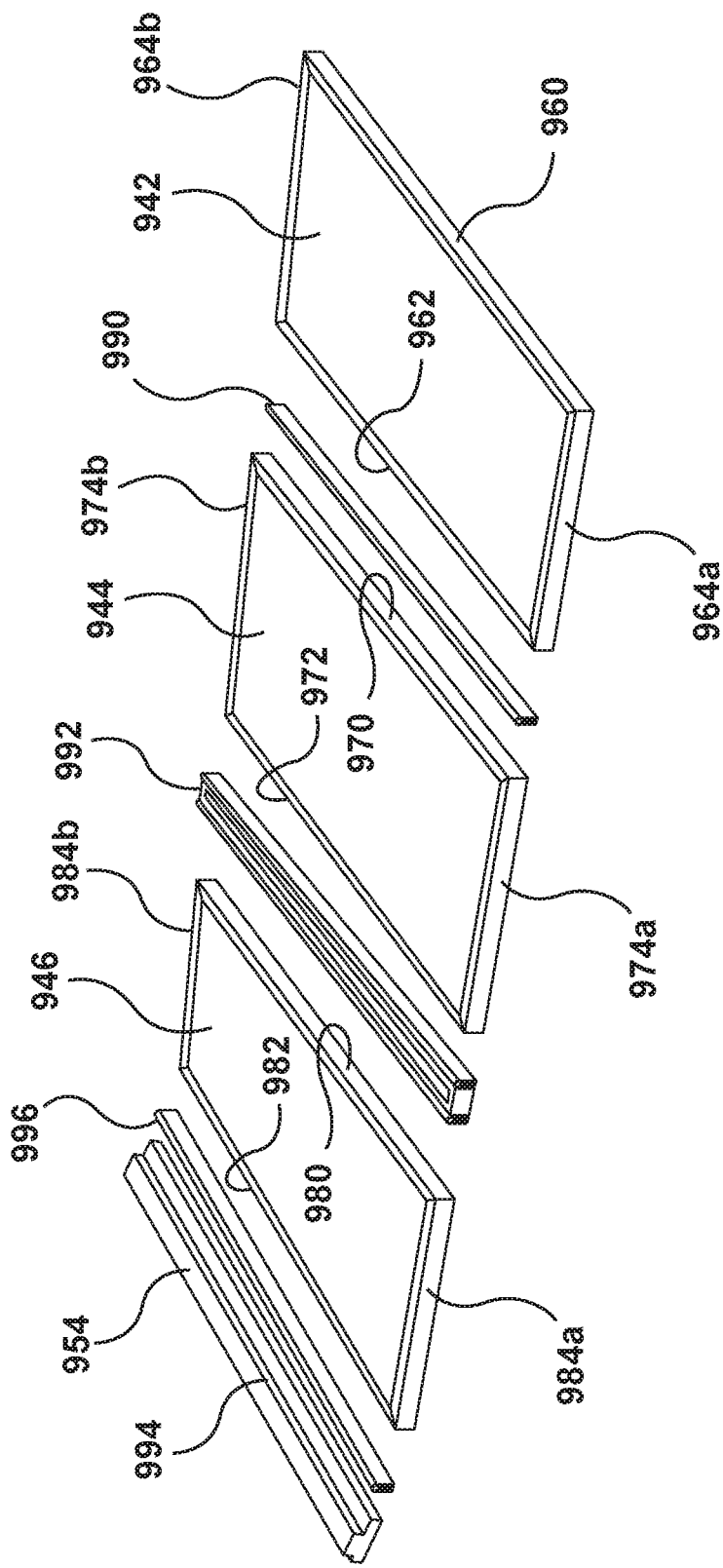
FIG. 13b is an exploded perspective view of the tonneau cover assembly according to FIG. 9a, showing panels forming the tri-fold tonneau cover.

The rail system 940, as shown in FIG. 13a, serves to facilitate the mounting of the tonneau cover 938 to the cargo bed 24. The rail system 940 includes a first side rail 948, a second side rail 950, a tailgate rail 952, and a mount rail 954. Collectively the rail system 940 is mounted upon an upper wall surface 33 of the cargo bed 24 (i.e. the bed rail 34). Specifically, the first side rail 948 is mounted upon the bed rail 34 of a first of the side-wall sections (i.e. side wall section 30a), the second side rail 950 is mounted upon the bed rail 34 of a second of the side-wall sections (i.e. side wall section 30b), the tailgate rail 952 is mounted upon the bed rail 34 of the tailgate 32, and the mount rail 954 is mounted upon the bed rail 34 of the forward wall 28. As will be described in greater detail below, in addition to facilitating the mounting of the tonneau cover 938 to the cargo bed 24, the rail system 940 cooperates with the tonneau cover 938 in a manner that serves to prevent the ingress of water and debris into the cargo bed 24.

Returning to the tonneau cover 938, each of the first panel 942, the second panel 944, and the third panel 946 can be defined as having a rearward edge, a forward edge, and a pair of opposing side edges. Accordingly, with reference to FIG. 13b, the first panel (p1) 942 includes a p1 rearward edge 960, a p1 forward edge 962 and opposing p1 side edges 964a, 964b; the second panel (p2) 944 includes a p2 rearward edge 970, a p2 forward edge 972 and opposing p2 side edges 974a, 974b; the third panel (p3) 946 includes a p3 rearward edge 980, a p3 forward edge 982 and opposing p3 side edges 984a, 984b. The first panel 942 and the second panel 944 are hingedly connected, where the p1 forward edge 962 of the first panel 942 and the p2 rearward edge 970 of the second panel 944 are operably connected by a first hinge assembly 990. Accordingly, in the process of opening the tonneau cover 938, the first panel 942 is permitted to pivot relative to the second panel 944, to the first opened position (as shown in FIGS. 10a and 10b). Similarly, the second panel 944 and the third panel 946 are hingedly connected, where the p2 forward edge 972 of the second panel 944 and the p3 rearward edge 980 of the third panel 946 are operably connected by a second hinge assembly 992. Accordingly, in the process of opening the tonneau cover 938, the previously folded first and second panels 942, 944 are collectively permitted to pivot relative to the third panel 946, to the second opened position (as shown in FIGS. 11a and 11b). Similarly, the third panel 946 and the mount rail 954 are hingedly connected, where the p3 forward edge 982 of the third panel 946 and a p4 rearward edge 994 of the mount rail 954 are operably connected by a third hinge assembly 996 (as best seen in FIG. 11b). Accordingly, in the process of opening the tonneau cover 938, the previously folded first, second, and third panels 942, 944, 946 are collectively permitted to pivot relative to the mount rail 954, to the third opened position (as shown in FIGS. 12a and 12b). Specifics on the arrangement of the third hinge assembly 996 and the mount rail 954 will be described in greater detail below.

First Hinge Assembly

Figure 14:
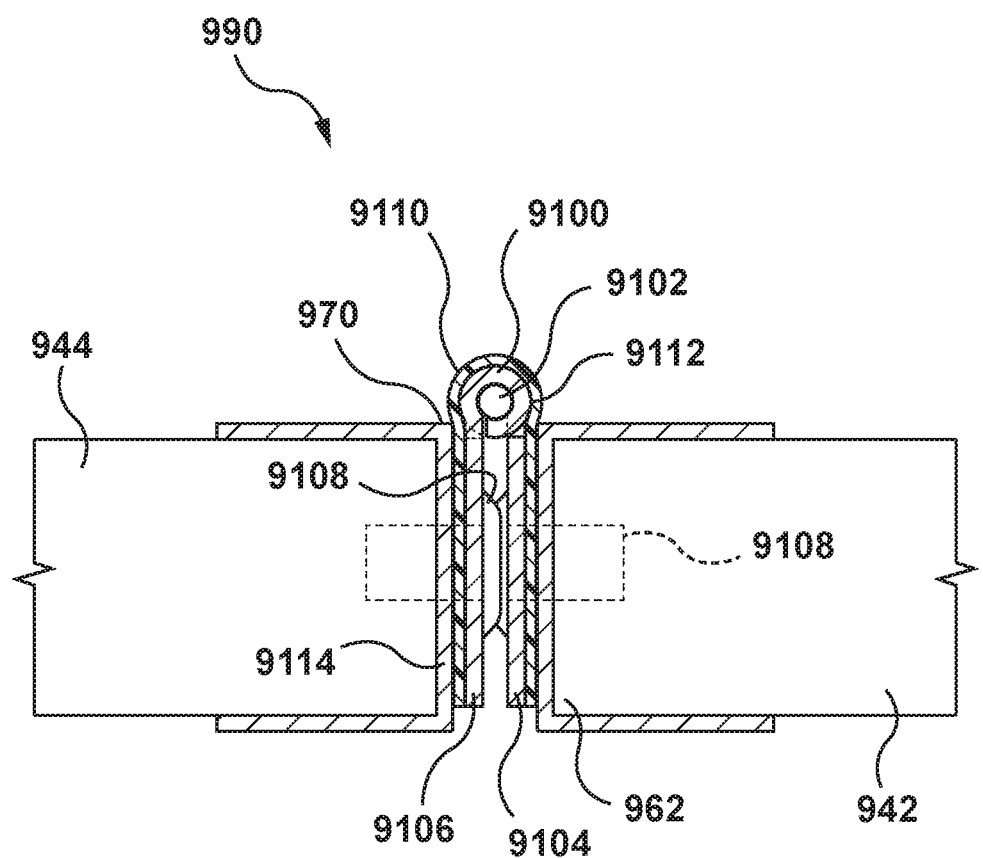
FIG. 14 is a partial sectional view of the tonneau cover assembly according to FIG. 9a, showing in greater detail a first hinge assembly.

As stated earlier, the first hinge assembly (h1) 990 serves to hingedly connect the first and second panels 942, 944. With reference to FIG. 14, the first hinge assembly 990 includes an h1 hinge 9100, which generally may be in the form of a piano hinge, although other hinge arrangements may be suitably implemented to achieve the desired rotational movement.

As shown, the h1 hinge 9100 includes an h1 central pin 9102 about which the leaves of the h1 hinge 9100 pivot. As shown, an h1 first leaf 9104 is fastened to the p1 forward edge 962 of the first panel 942, while the h1 second leaf 9106 is fastened to the p2 rearward edge 970 of the second panel 944. The h1 first and second leaves 9104, 9106 of the h1 hinge 9100 are fastened to the respective panels using an h1 fastener 9108. As shown, the h1 fastener 9108 is a threaded fastener, although it will be appreciated that other fastening means may be possible, including but not limited to the use of rivets. In the embodiment shown, the first hinge assembly 990 additionally includes an h1 seal member 9110 positioned between the leaves of the hinge and each respective edge of the adjacent first and second panels 942, 944. The h1 seal member 9110 spans the external surface of the h1 hinge barrel interface 9112 interconnecting the h1 first and second leaves 9104, 9106, and is retained in position by virtue of the h1 fasteners 9108 used to attach the h1 hinge 9100 to the respective first and second panels 942, 944. The h1 seal member 9110 is generally formed of a flexible rubber or polymeric material. As the exemplary panel construction for the tonneau cover 938 includes an edge frame 9114 affixed to the respective panels, the attachment of the h1 first and second leaves 9104, 9106 to each respective first and second panel 942, 944 additionally captures the edge frame 9114 therebetween.

Second Hinge Assembly

Figure 15:
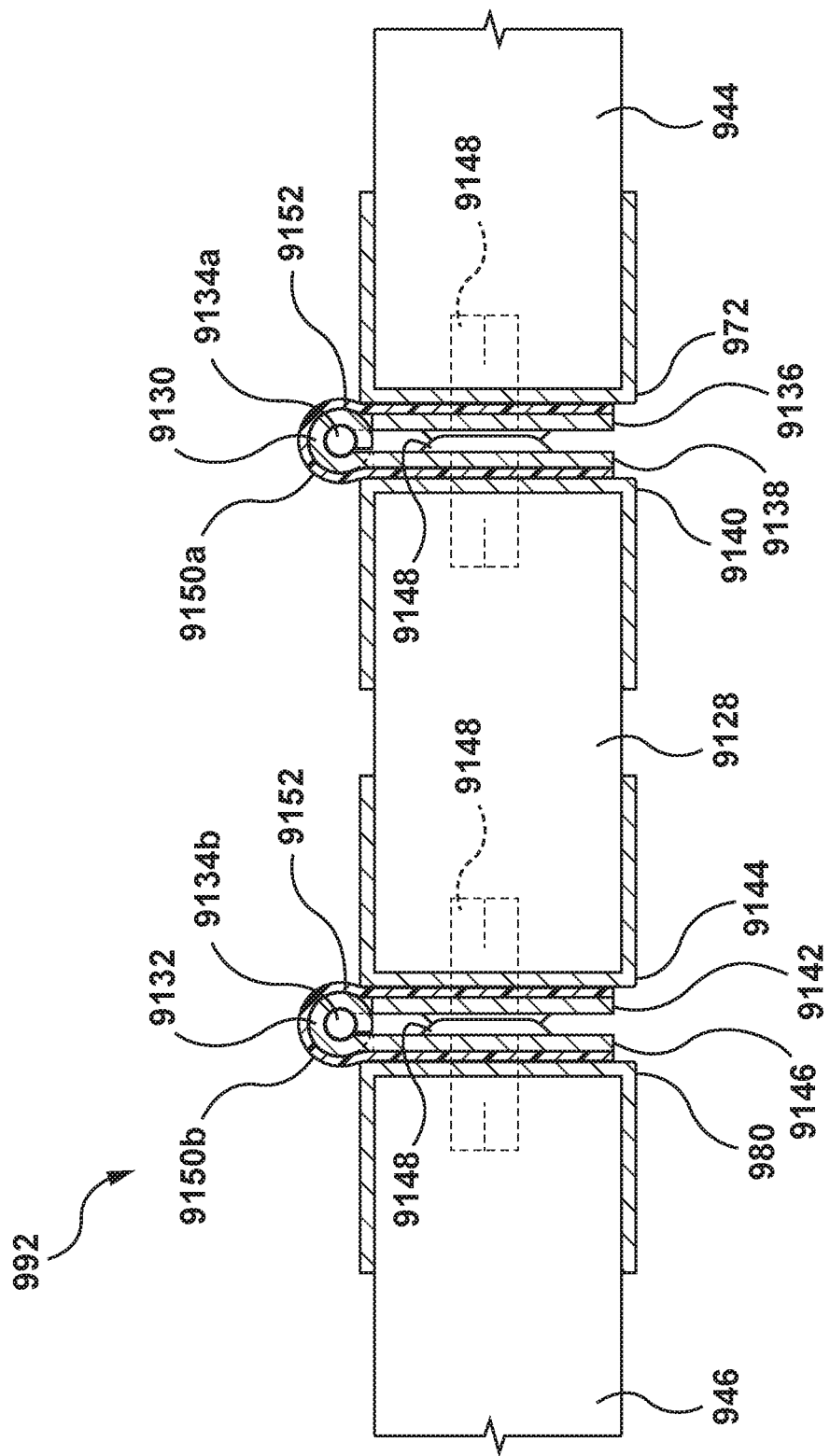
FIG. 15 is a partial sectional view of the tonneau cover assembly according to FIG. 9a, showing in greater detail a second hinge assembly.

The second hinge assembly (h2) 992 serves to hingedly connect the second and third panels 944, 946. With reference to FIG. 15, the second hinge assembly 992 is similar in construction to the first hinge assembly 990, with the exception that it is configured as a double action hinge, with a spacer panel 9128 positioned between a first h2 hinge 9130 and a second h2 hinge 9132. The spacer panel 9128 provides a spacing to enable the tri-fold tonneau cover 938 to be roll-folded, that is where the spacing between the second and third panels 944, 946 is sufficient to accommodate the first panel 942 in the second opened position, as shown in FIGS. 11a and 11b.

Each of the first and second h2 hinges 9130, 9132 are generally in the form of a piano hinge, although other hinge arrangements may be suitably implemented to achieve the desired rotational movement. Each of the first and second h2 hinges 9130, 9132 includes a respective h2 central pin 9134a, 9134b about which the leaves of the respective hinge pivot. With respect to the first h2 hinge 9130, a first $h2_1$ leaf 1936 is fastened to the p2 forward edge 972 of the second panel 944, while the second $h2_1$ leaf 1938 is fastened to a s1 rearward edge 9140 of the spacer panel 9128. With respect to the second h2 hinge 9132, a first h22 leaf 9142 is fastened to a s1 forward edge 9144 of the spacer panel 9128, while the second h22 leaf 9146 is fastened to the p3 rearward edge 980 of the third panel 946. The first and second leaves of each of the first and second h2 hinges 9130, 9132 are fastened to the respective panels using an h2 fastener 9148. As shown, the h2 fastener 9148 is a threaded fastener, although it will be appreciated that other fastening means may be possible, including but not limited to the use of rivets.

The second hinge assembly 992 additionally includes an h2 seal member 9150 positioned at each of the first and second h2 hinges 9130, 9132. For each h2 hinge, the h2 seal member 9150 is captured between the leaves of the hinge and each respective edge of the adjacent panels. Specifically, with respect to the h2 seal member 9150a at the first h2 hinge 9130, the h2 seal member 9150a is captured between the leaves of the h2 hinge 9130 and each respective edge of the adjacent second and spacer panels 944, 9128. For the h2 seal member 9150b at the second h2 hinge 9132, the h2 seal member 9150b is captured between the leaves of the h2 hinge 9132 and each respective edge of the adjacent spacer and third panels 9128, 946. Each h2 seal member 9150 spans the external surface of the h2 hinge barrel interface 9152 interconnecting the hinge leaves and is retained in position by virtue of the fasteners used to attach the h2 hinges 9130, 9132 to the respective adjacent panels. As stated earlier, as the exemplary panel construction for the tonneau cover 938 includes the edge frame 9114 affixed to the respective panel, the attachment of the hinge leaves to each respective panel additionally captures the edge frame 9114 therebetween.

The spacer panel 9128 may be constructed in a similar manner as the panels, and therein includes a similar edge frame to that previously described. Alternatively, the spacer panel may be extruded from a suitable plastic or metal, and the edge frame feature may be integrally formed therewith.

Rail System—First and Second Side Rails

Figure 16A:
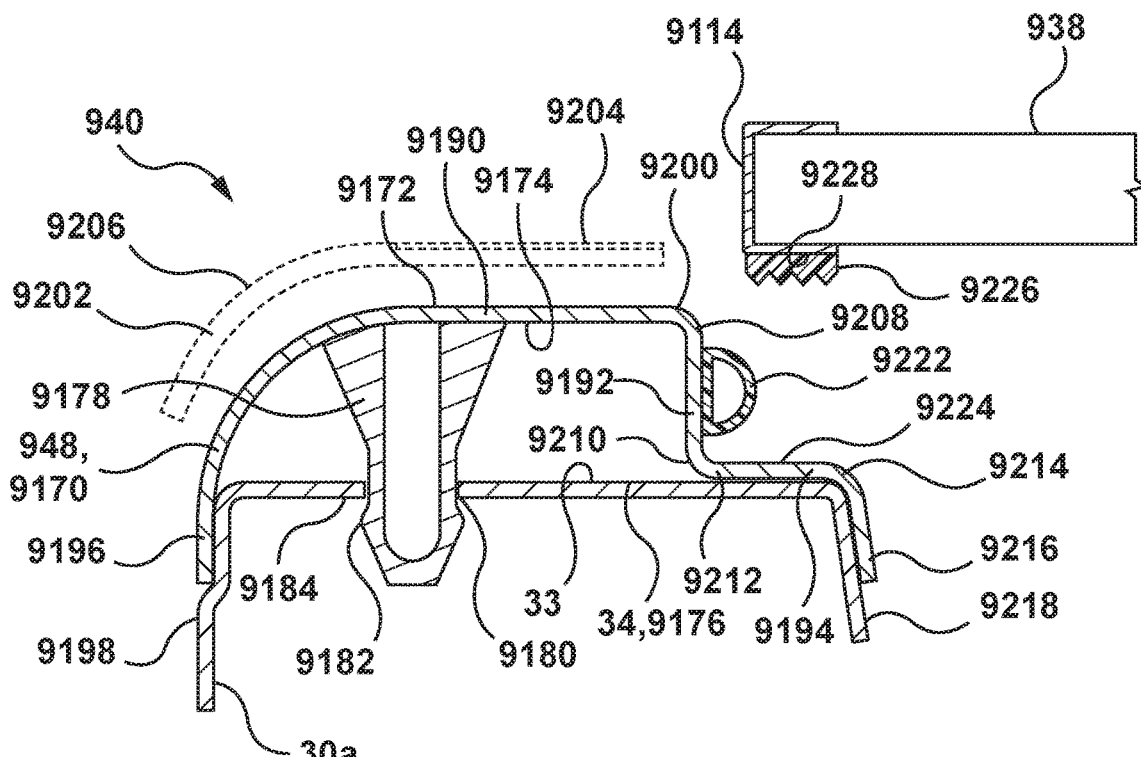
FIG. 16a is a partial sectional view of the tonneau cover assembly according to FIG. 9a, showing in greater detail a profile through a side rail of the rail system.
Figure 16B:
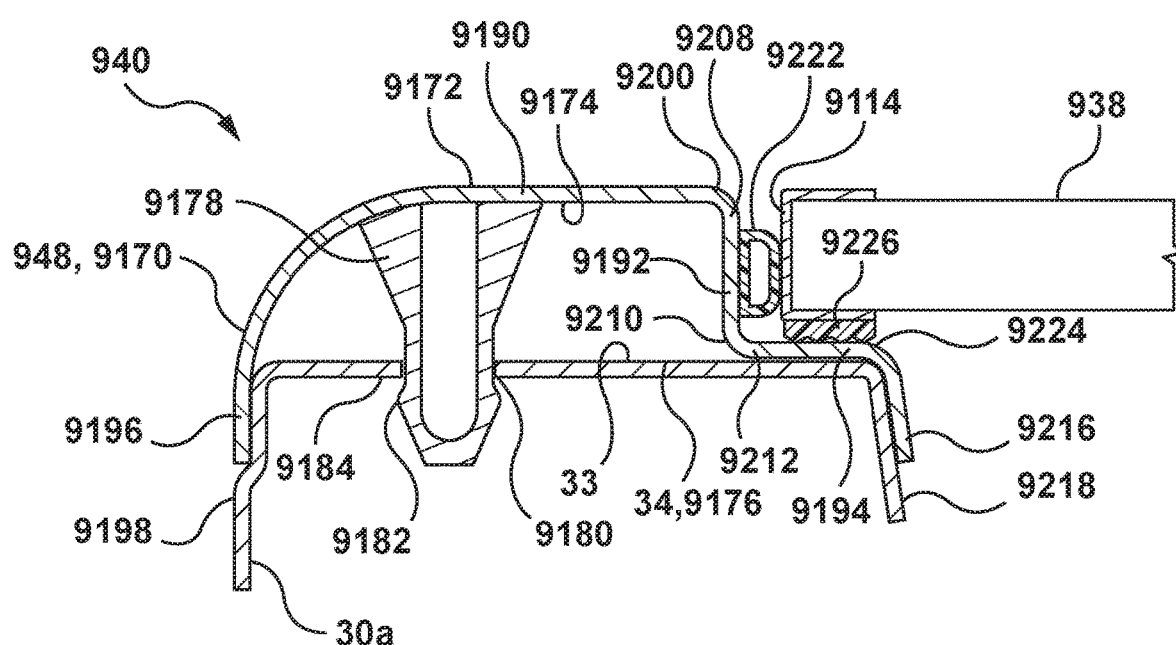
FIG. 16b is another partial sectional view of the tonneau cover assembly according to FIG. 9a, showing in greater detail a profile through a side rail of the rail system.

Turning now to FIGS. 16a and 16b, shown is a sectional profile through the side rail of the rail system 940. As both the first and second side rails 948, 950 are configured and dimensioned in the same manner, only the first side rail 948 will be discussed in detail below.

The side rail 948 is an injection molded structure that is mounted upon the upper surface 33 of the bed rail 34 of the respective side wall section 30a. The side rail 948 is formed as an elongate rail body 9170 with an exposed exterior rail surface 9172 and a generally hidden interior rail surface 9174.

The rail system 940 foregoes the traditional prior art clamping methodology to retain the rail system in position. Instead, the side rail 948 incorporates a fastening system that includes one or more fastening elements configured to engage the upper surface 33 and/or upper wall structure 9176 of the bed rail 34 of the cargo bed 24. Of particular note is that the fastening system designed for use with the tonneau cover assembly 936 is configured to minimize obstruction of the cargo bed opening, in particular the area between the opposing side-wall sections 30*a*, 30*b*. The fastening system may be configured in a number of ways. For example, in the embodiment shown in FIGS. 16*a* and 16*b*, the fastening system is configured to include the one or more fastening elements in the form of a retaining clip 9178 that cooperates with a complementary fastener aperture 9180 formed through the upper surface 33 and upper wall structure 9176 of the bed rail 34. The retaining clip 9178 extends through the fastener aperture 9180 and includes at least one retaining barb 9182 arranged to engage a rail underside 9184 of the bed rail 34 upon installation. To enable serviceability of the rail system 940 and/or the cargo bed 24, it is preferable that the retaining clip 9178 exhibit enough flexibility to be selectively detached from the fastener aperture 9180 when necessary. The retaining clip 9178 as shown is integrally formed upon the interior rail surface 9174 of the rail body 9170. In general, the interior rail surface 9174 of the rail body 9170 will include a plurality of retaining clips 9178 along the length of the rail body 9170.

Although a singular type of fastening element may be implemented, in some embodiments the fastening system may include two or more different types of fastening elements. For example, the fastening system may include one or more of the above-described retaining clips used in cooperation with one or more alternate fastening elements, including but not limited to threaded fasteners and adhesive-based fasteners. In one embodiment, the interior rail surface of the rail body may be provided with one or more retaining clips and one or more insert-molded threaded fasteners (not shown) configured to extend through a complementary threaded fastener aperture formed through the upper surface and upper wall structure of the bed rail. Use of this type of fastener element would be suitable where there is access to the rail underside of the bed rail, to facilitate the placement of a complementary nut or similar fastener during installation of the rail system. The aforementioned adhesive-based fasteners may also be considered for certain implementations. This may be achieved by providing the interior rail surface of the rail body with one or more adhesive pad surfaces (not shown) dimensioned to engage the upper surface of the bed rail upon installation. A suitable adhesive (i.e. adhesive tape) may be applied to the adhesive pad surface, to adhesively bond the side rail to the upper surface of the bed rail. A still further alternative fastening element that may be suitably implemented are those generally referred to as Christmas tree fasteners (not shown), which include a plurality of barbs to engage the receiving structure. As Christmas free fasteners are generally a separately formed structure, they may be suitably implemented by providing suitable Christmas Tree mounts on the interior rail surface of the rail body. Another option for the fastening element is to provide the interior rail surface of the rail body with one or more fastening bosses, which during installation are engaged by complementary threaded fasteners inserted from the underside of the bed rail. In some instances, the retaining clips 9178 may be configured to be non-removable from the receiving fastening aperture, to provide greater theft protection.

The elongate rail body 9170 as shown includes a profile wall 9190, a first seat wall (w1) 9192 and a second seat wall (w2) 9194. The profile wall 9190 defines the principal shape and aesthetic character of the rail body 9170, while the first and second seat walls 9192, 9194 collectively provide a seat to receive and sealingly engage the tonneau cover 938. The profile wall 9170 includes a first profile end 9196 positioned upon or in the vicinity of an outboard surface 9198 of the respective side-wall section 30*a*, and a second profile end 9200 generally where the profile wall 9190 transitions to the first seat wall 9192. The profile wall 9190 also provides a shape-defining region 9202 between the first and second profile ends 9196, 9200. In the embodiment shown, the shape-defining region 9202 provides a planar segment 9204 and a radiused segment 9206. The first seat wall 9192 is positioned in a substantially vertical orientation, while the second seat wall 9194 is positioned in a substantially horizontal orientation. The first seat wall 9192 is attached at a first w1 end 9208 to the second profile end 9200 of the profile wall 9190 and is attached at a second w1 end 9210 to a first w2 end 9212 of the second seat wall 9194. Positioned at a second w2 end 9214 of the second seat wall 9194 is a w2 wall extension 9216 that seats against an inboard surface 9218 of the side-wall section 30*a*.

The first seat wall 9192 supports a first edge seal 9222 configured to engage the edge frame 9114 of the tonneau cover 938 on closure, in particular along the side edges of the edge frame 9114 of each tonneau cover panel. The first edge seal 9222 may be configured as a bulb seal (as shown) and is generally a continuous seal along the length of the rail body. The first edge seal 9222 is affixed to the first seat wall 9192 using a variety of fasteners, including but not limited to adhesives (i.e. glue, tapes, etc.), clips and integrally molded tabs.

The second seat wall 9194 provides a w2 seal surface 9224 configured to be engaged by a second edge seal 9226 provided around the periphery of the tonneau cover, generally affixed to a frame underside surface 9228 of the edge frame 9114 of each tonneau cover panel. Placing the second edge seal 9226 on the frame underside surface 9228 of the tonneau cover 938 serves to protect the second edge seal 9226 during loading/unloading of payload, and further simplifies the act of cleaning off the w2 seal surface 9224, which can easily be performed using a cleaning brush or similar instrument.

The arrangement of the second seat wall 9194, the first profile end 9196 of the profile wall 9190, and the w2 wall extension 9216 are selected to closely match the receiving surface of the respective bed rail 34. The action of the fastening system serves to engage the aforementioned rail body elements to the respective receiving surface in a secure manner. To additionally ensure a secure fit, the rail body 9170 may be dimensioned such that upon installation, there is an interference fit between engaging surfaces.

Rail System—Tailgate Rail

Figure 17A:
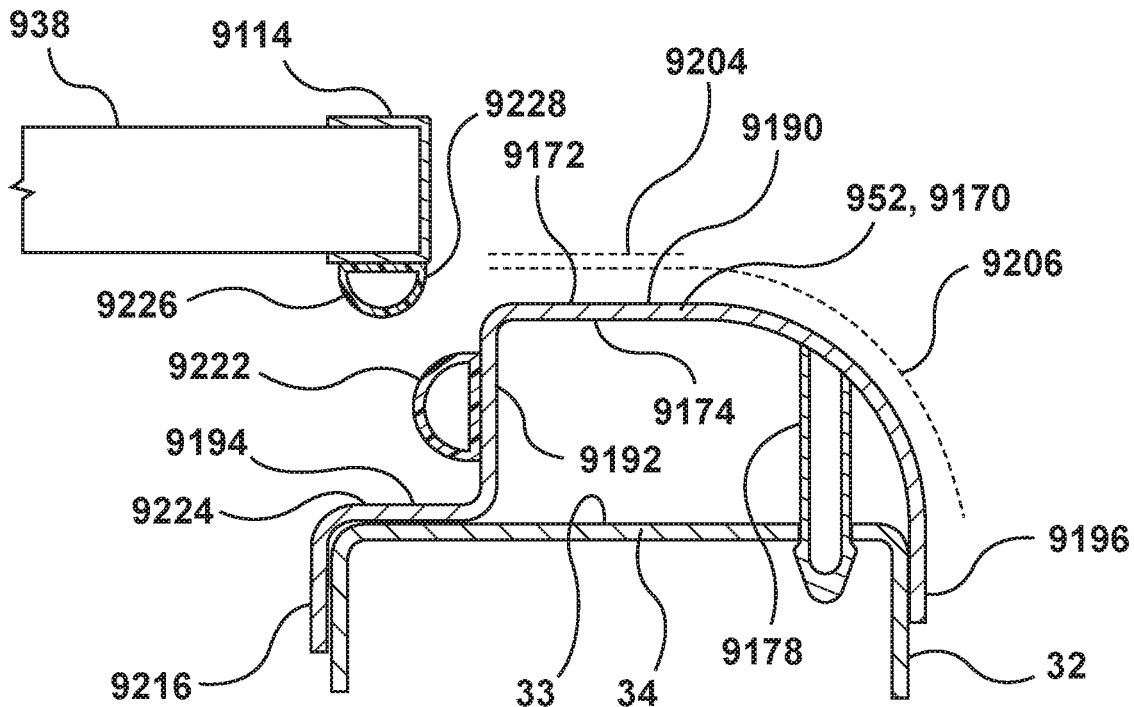
FIG. 17a is a partial sectional view of the tonneau cover assembly according to FIG. 9a, showing in greater detail a profile through a tailgate rail of the rail system.
Figure 17B:
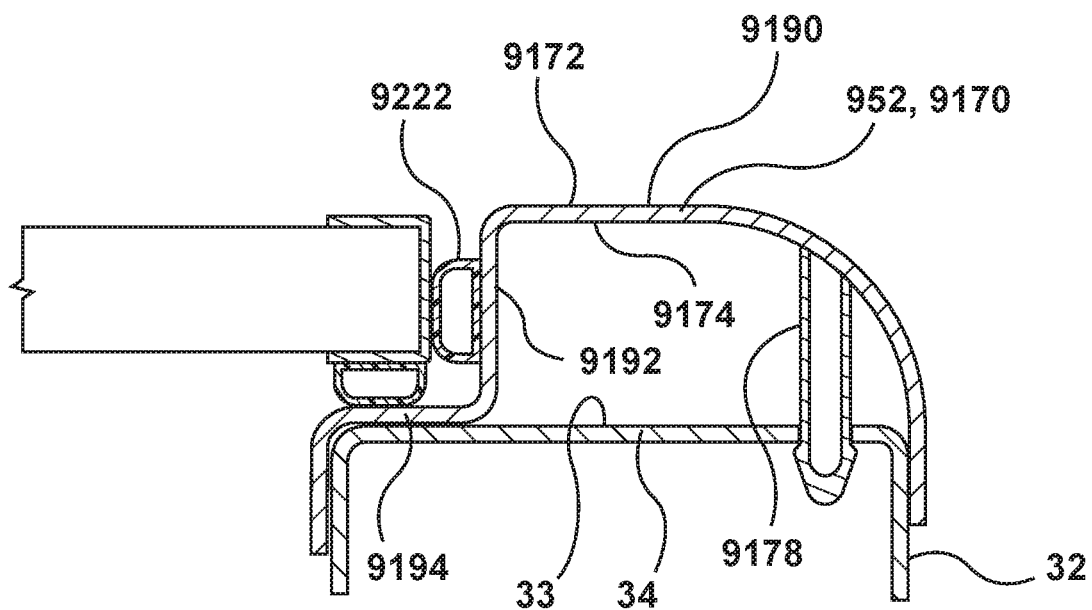
FIG. 17b is another partial sectional view of the tonneau cover assembly according to FIG. 9a, showing in greater detail a profile through a tailgate rail of the rail system.

Turning now to FIGS. 17*a* and 17*b*, shown is a sectional profile through the tailgate rail 952 of the rail system 940. As the tailgate rail 952 is substantially the same as the side rail 948, only the differences will be discussed. Where appropriate, like number will be used to denote parts/elements on the tailgate rail 952 that correspond to parts/elements previously introduced and described with reference to the side rail 948.

The tailgate rail 952 is an injection molded structure that is mounted upon the upper surface 33 of the bed rail 34 of the tailgate 32. The tailgate rail 952 is formed as an elongate rail body 9170 having an exposed exterior rail surface 9172 and a generally hidden interior rail surface 9174.

The tailgate rail 952 includes a similar fastening system as that described above for the side rail 948. As shown, the fastening system includes a plurality of fastening elements having the form of a retaining clip 9178. The retaining clips 9178 are integrally formed upon the interior rail surface 9174 of the rail body 9170. Similar to the side rail 948, the fastening system used for the tailgate rail 952 may include a singular type of fastening element or may include two or more different types of fastening elements. The various types of fastening elements that may find application are the same as those described above with reference to the side rail 948.

The elongate rail body 9170 of the tailgate rail 952 includes a profile wall 9190, a first seat wall 9192 and a second seat wall 9194. The seat formed by the first and second seat walls 9192, 9194 operate in the same way as the seat formed on the side rails 48. The first seat wall 9192 supports a first edge seal 9222, while the second seat wall 9194 provides a w2 seal surface 9224 configured to be engaged by a second edge seal 9226 provided around the periphery of the tonneau cover, generally affixed to the frame underside surface 9228 of the edge frame 9114. As shown, in this embodiment, the second edge seal 9226 is provided in the form of a bulb seal, although other types of seals may be suitably implemented. With respect to the profile wall 9190, it will be appreciated that the dimensions defining the radiused segment 9206, the planar segment 9204, as well as the dimensional spacing between the first profile end 9196 and the extension wall 9216 of the tailgate rail 952 are selected to match that of the tailgate 32 upon which it is mounted.

In some embodiments, the extension wall 9216 may be configured to cover substantially the entire inside (i.e. cargo bed facing) surface of the tailgate, to avoid the formation of an edge that could potentially cause a catch point when maneuvering cargo in/out of the cargo bed. In another embodiment, the inside (cargo bed facing) surface of the tailgate may be configured with a recess that receives the extension wall 9216. In this way, the exposed side of the extension wall 9216 has a flush interface with the inside (cargo bed facing) surface.

Rail System—Mount Rail

Figure 18A:
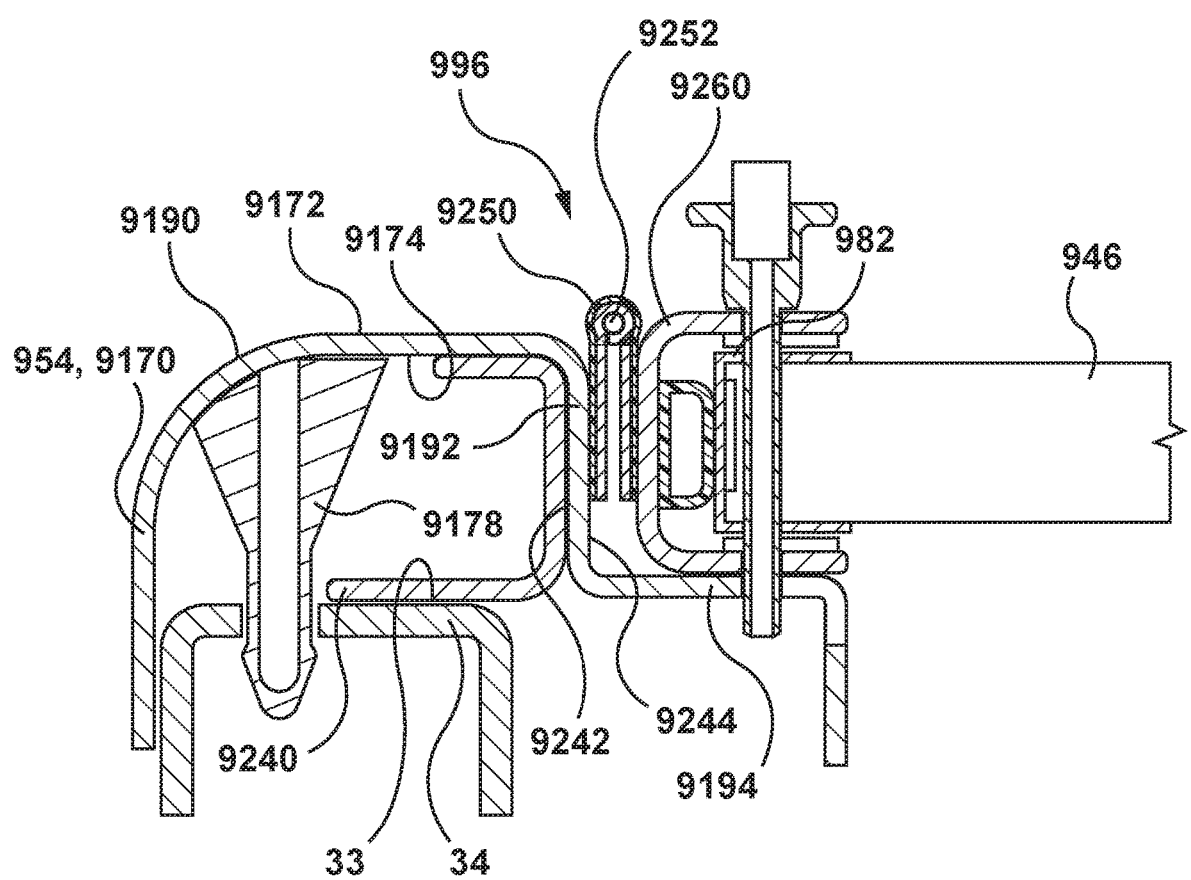
FIG. 18a is a partial sectional view of the tonneau cover assembly according to FIG. 9a, showing in greater detail a profile through a mount rail of the rail system.
Figure 18B:
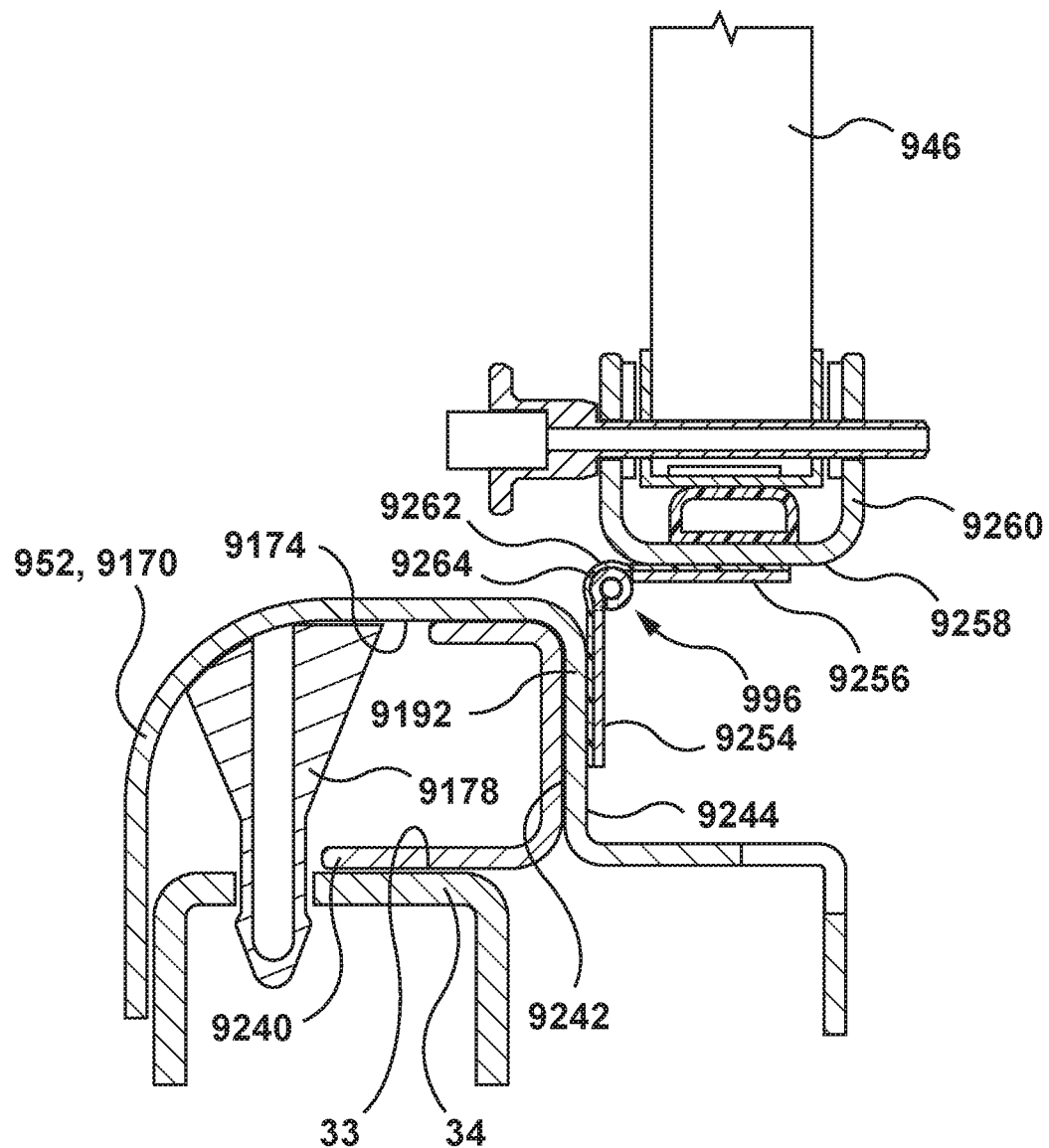
FIG. 18b is another partial sectional view of the tonneau cover assembly according to FIG. 9a, showing in greater detail a profile through a mount rail of the rail system.

Turning now to FIGS. 18a and 18b, shown is a sectional profile through the mount rail 954 of the rail system 940. Like the tailgate rail 952, it will be noted that the mount rail 954 has structural similarities to the side rail 948. For this reason, only the differences will be discussed in detail. Where appropriate, like number will be used to denote parts/elements of the mount rail 954 that correspond to parts/elements previously introduced and described with reference to the side rail 948.

The mount rail 954 is an injection molded structure that is mounted upon the upper surface 33 of the bed rail 34 of the forward wall 28. The mount rail 954 is formed as an elongate rail body 9170 having an exposed exterior rail surface 9172 and a generally hidden interior rail surface 9174.

The mount rail 954 includes a similar fastening system as that described above for the side rail 948. As shown, the fastening system includes a plurality of fastening elements having the form of a retaining clip 9178. The retaining clips 9178 are integrally formed upon the interior rail surface 9174 of the rail body 9170. Similar to the side rails 948, the fastening system used for the mount rail 954 may include a singular type of fastening element or may include two or more different types of fastening elements. The various types of fastening elements that may find application are the same as those described above with reference to the side rail 948.

The elongate rail body 9170 of the mount rail 954 includes a profile wall 9190, a first seat wall 9192 and a second seat wall 9194. The mount rail 954 additionally includes a reinforcement member 9240 positioned on the interior surface of the elongate rail body 9170. The reinforcement member 9240 extends along the length of the elongate rail body 9170 of the mount rail 954 and is affixed to an inside seat surface 9242 of the first seat wall 9192 using a suitable fastener (not shown). Suitable fasteners will include, but are not limited to threaded fasteners, rivets, as well as adhesives (i.e. glue, tape, etc.). At each end of the elongate rail body 9170, the reinforcement member 9240 additionally extends to rest upon the upper wall surface 33 of each side wall section 30a, 30b. In this way, the reinforcement member 9240 provides additional support, and serves to prevent rotation of the mount rail 954 when all the panels are being folded against the cab.

On the opposing side of the first seat wall 9192, that is on the opposing outside seat surface 9244, the mount rail 954 supports the third hinge assembly (h3) 996. As stated earlier, the third hinge assembly 996 serves to hingedly connect the third panel 946 to the mount rail 954. The third hinge assembly 996 is shown to include an h3 hinge 9250, generally having the form of a piano hinge, although other hinge arrangements may be suitably implemented to achieve the desired rotational movement.

As shown, the h3 hinge 9250 includes an h3 central pin 9252 about which the leaves of the h3 hinge 9250 pivot. As shown, a first h3 leaf 9254 is fastened to the outside seat surface 9244 of the first seat wall 9192 of the mount rail 954, while the second h3 leaf 9256 is fastened to a forward edge 9258 of a coupling member 9260. The coupling member 9260 is used to removably receive the p3 forward edge 982 of the third panel 946 of the tonneau cover 938, as will be described in greater detail below.

The first and second leaves of the h3 hinge 9250 are fastened to the respective surfaces using a suitable fastener (not shown). Suitable fasteners will include but are not limited to threaded fasteners and rivets. In the embodiment shown, the third hinge assembly 996 additionally includes an h3 seal member 9262 positioned between the leaves of the hinge and each respective receiving surface of the adjacent mount rail 954 and the coupling member 9260. The h3 seal member 9262 spans the external surface of the h3 hinge barrel interface 9264 interconnecting the first and second leaves and is retained in position by virtue of the fasteners used to attach the h3 hinge 9250 to the respective mount rail 954 and coupling member 9260.

Rail System—Seat for Recessed Appearance

Figure 19:
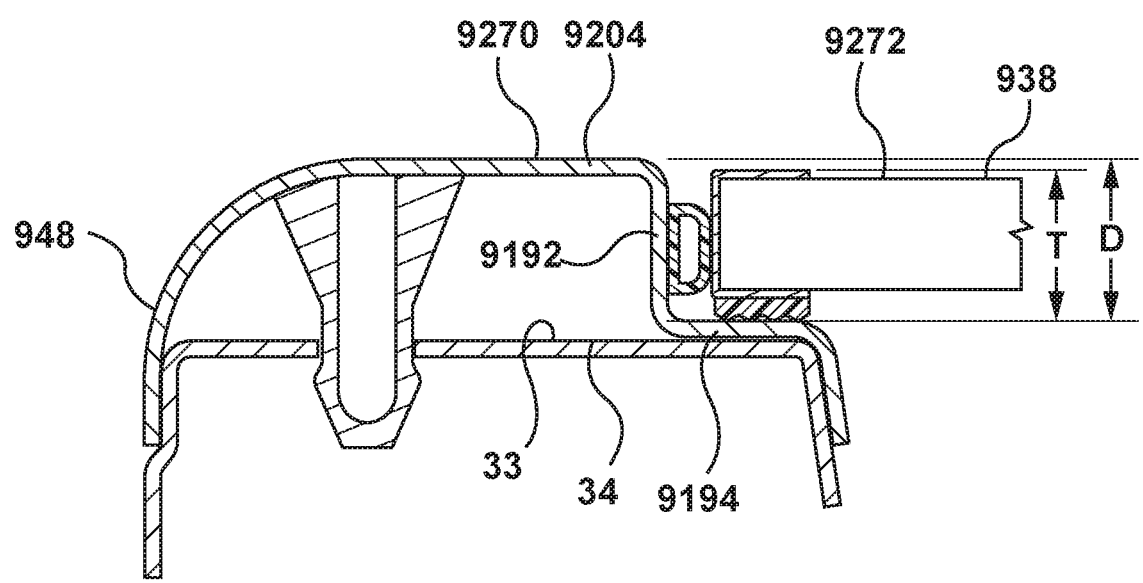
FIG. 19 is a partial sectional view of the tonneau cover assembly according to FIG. 9a, showing in greater detail a seating of the tonneau cover relative to the rail system.

The rail system 940 is dimensioned to receive the tonneau cover 938 in a manner that has the appearance of a flush-mounted system. It will be noted that the tonneau cover 938 partially overlaps the bed rail 34 of at least the first side rail 948, the second side rail 950, and the tailgate rail 952. To avoid the appearance of a top-mounted tonneau cover, and therein achieve the desired flush-mounted appearance, the edges of the tonneau cover 938 aligning to the first side rail 948, the second side rail 950, the tailgate rail 952 and the mount rail 954 are received in the seat of the respective rail body. Accordingly, the first seat wall 9192 for each respective rail 948, 950, 952, 954 is dimensioned to establish a seat depth D that approximately matches the thickness T of the tonneau cover 938 around the periphery thereof, including a seal or any similar pliant sealing structure (as shown in FIG. 19 having regard to side rail 948). The second seat wall 9194 for each respective rail 948, 950, 952 provides the base of the seat, and is positioned directly upon and is provided support by the upper surface 33 of the respective bed rail 34. With this arrangement, the outside surface 9270 of the planar segment 9204 of each of the first and second side rails 948, 950, the tailgate rail 952, and the mount rail 954 appear generally flush with the topside planar surface 9272 of the tonneau cover 938.

Figure 19A:
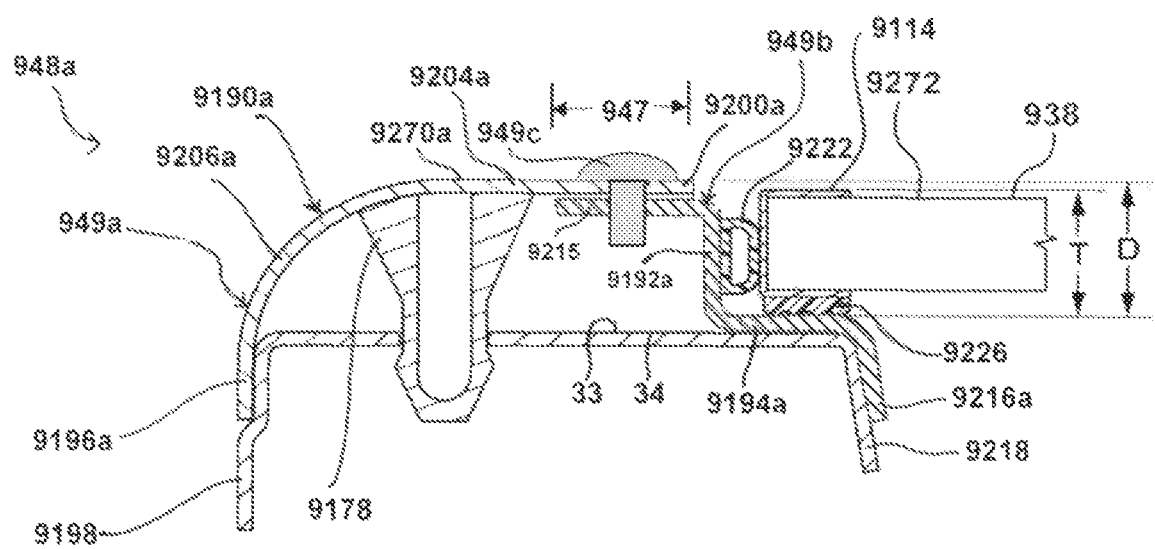
FIG. 19a is a partial sectional view of a tonneau cover assembly according to another embodiment hereof, wherein side rails of a rail system include a two-part construction.

In another embodiment hereof illustrated in FIG. 19a, a side rail 948a may be constructed in two parts to provide adjustability thereto. Tonneau covers are often installed as an after-market add on, and the size and configuration of a bed rail 34 of a cargo bed 24 may vary. By providing the side rail 948a in an outer component 949a and an inner component 949b, the relative positioning of the outer and inner components 949a, 949b to each other can be adjusted to accommodate bed rails having a range of widths. Although only the side rail 948a is shown in FIG. 19a, i.e., a first side rail, it will be understood by one of ordinary skill in the art that a second side rail, such as a second side rail 950, may also include the two-part construction. However, as both the first and second side rails are configured and dimensioned in the same manner, only the side rail 948a will be discussed in detail below.

The outer component 949a is formed as an elongate body and is an injection molded structure that is configured to be mounted upon an upper surface 33 of the bed rail 34 of a respective side wall section 30a. The outer component 949a incorporates a fastening system that includes one or more fastening elements such as a retaining clip 9178, as described above, to engage the upper surface 33 of the bed rail 34 of the cargo bed 24. The outer component 949a includes a profile wall 9190a that has a generally curved configuration that defines the principal shape and aesthetic character of the side rail 948a. The outer component 949a includes a first end 9196a positioned upon or in the vicinity of an outboard surface 9198 of the respective side-wall section 30a, and a second end 9200a. The profile wall 9190a includes a planar segment 9204a and a radiused segment 9206a.

The inner component 949b is formed as an elongate body and is an injection molded structure that is configured to be disposed upon the upper surface 33 of the bed rail 34 of the respective side wall section 30a, and attached to the outer component 949a via a fastener 949c. The inner component 949b includes a first seat wall 9192a and a second seat wall 9194a that collectively provide a seat to receive and sealingly engage the tonneau cover 938. The first seat wall 9192a is positioned in a substantially vertical orientation relative to the cargo bed 24, while the second seat wall 9194a is positioned in a substantially horizontal orientation relative to the cargo bed 24. The inner component 949b also includes a first wall extension 9215 that seats against the planar segment 9204a of the outer component 949a, and a second wall extension 9216a that is configured to seat against an inboard surface 9218 of the side-wall section 30a. The first wall extension 9215 is positioned in a substantially horizontal orientation and extends from the first seat wall 9192a, such that the first seat wall 9192a extends between the first wall extension 9215 and the second seat wall 9194a. The second wall extension 9216a is positioned in a substantially vertical orientation and extends from the second seat wall 9194a, such that the second seat wall 9194a extends between the first seat wall 9192a and the second wall extension 9216a. The first seat wall 9192a supports and is attached to a first edge seal 9222, which is configured to engage an edge frame 9114 of the tonneau cover 938 on closure, in particular along the side edges of the edge frame 9114 of each tonneau cover panel. The second seat wall 9194a is configured to engage a second edge seal 9226 provided around the periphery of the tonneau cover, generally affixed to a frame underside surface of the edge frame 9114 of each tonneau cover panel.

To assemble the outer and inner components 949a, 949b into the side rail 948a, the planar segment 9204a of the outer component 949a is positioned or disposed over the first wall extension 9215 of the inner component 949b. The planar segment 9204a of the outer component 949a and the first wall extension 9215 of the inner component 949b seat or abut against each other as shown in FIG. 19a. However, a length of overlap 947 between the planar segment 9204a of the outer component 949a and the first wall extension 9215 of the inner component 949b depends upon the width of the bed rail 34 of the cargo bed 24. Narrower bed rails will result in a longer length of overlap between the planar segment 9204a of the outer component 949a and the first wall extension 9215 of the inner component 949b, while wider bed rails will result in a shorter length of overlap between the planar segment 9204a of the outer component 949a and the first wall extension 9215 of the inner component 949b. Since the inner component 949b may be moved relative to the outer component 949a, a width of the side rail 948a is adjustable to accommodate bed rails having a range of widths.

After the outer and inner components 949a, 949b are disposed onto the bed rail 34, the inner component 949b is secured to the outer component 949a via the fastener 949c. In an embodiment, the fastener 949c may be a threaded fastener system having a screw boss and captured nut although other fastener systems may be used. For example, the fastener 949c may have a lead screw style and be hidden under the first edge seal 9222.

The two-part side rail 948a also achieves the desired flush-mounted appearance described above with respect to the side rail 948, such that the edges of the tonneau cover 938 aligning to the rail system are received in the seat of the respective rail body. Accordingly, the first seat wall 9192a is dimensioned to establish a seat depth D that approximately matches the thickness T of the tonneau cover 938 around the periphery thereof, including a seal or any similar pliant sealing structure (as shown in FIG. 19a having regard to side rail 948a). The second seat wall 9194a provides the base of the seat and is configured to be positioned directly upon and is provided support by the upper surface 33 of the respective bed rail 34. With this arrangement, an outside surface 9270a of the planar segment 9204a of the outer component 949a of the side rail 948a appears generally flush with a topside planar surface 9272 of the tonneau cover 938.

Coupling Member Retainer Pin

Figure 20:
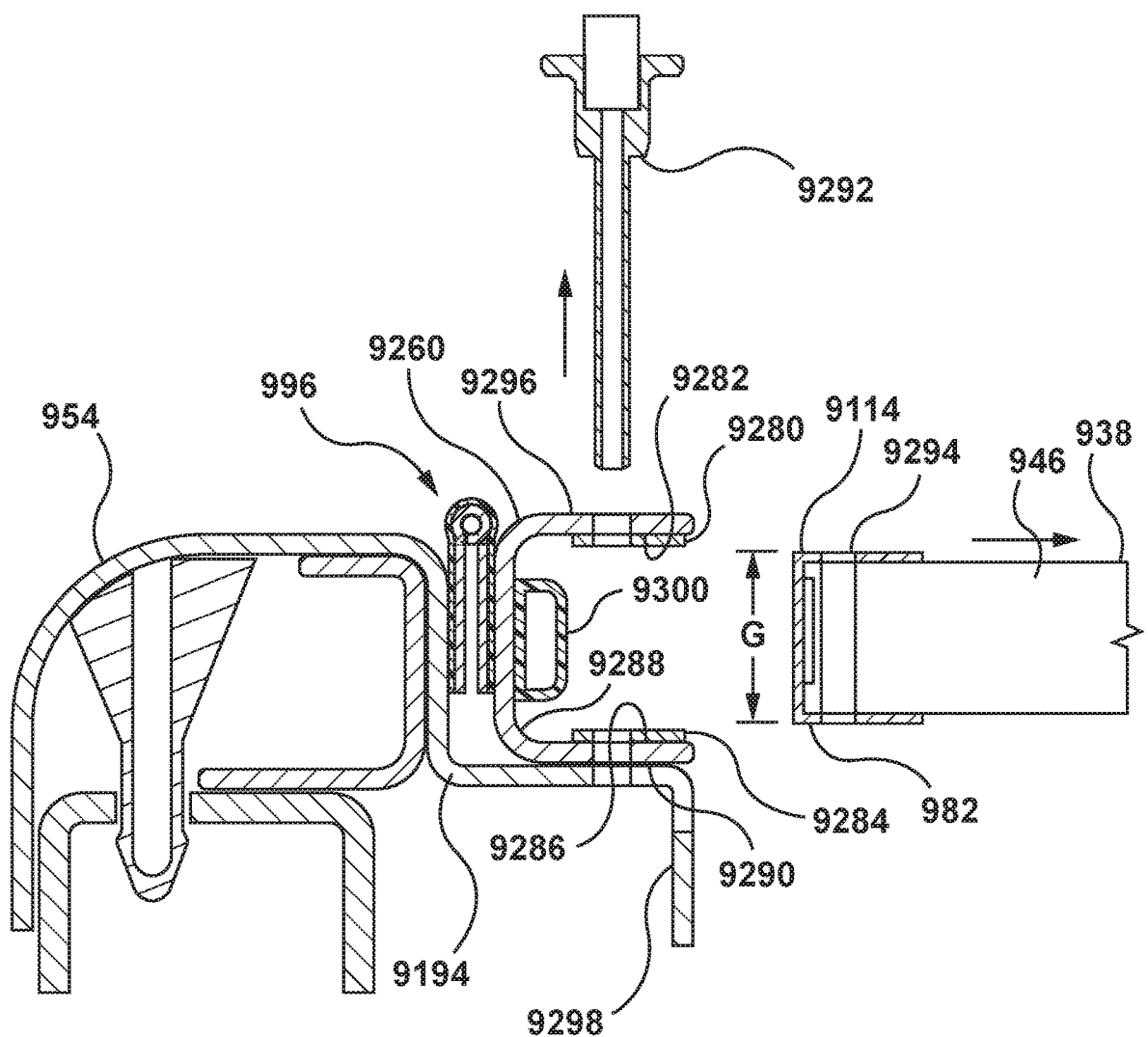
FIG. 20 is a partial sectional view of the tonneau cover assembly according to FIG. 9a, showing in greater detail a coupling member and a retainer pin for attaching the tonneau cover to the mount rail.

As previously mentioned, the mount rail 954 supports the hingedly connected coupling member 9260. As shown in FIG. 20, the coupling member 9260 is configured in the form of a C-shaped channel and includes a first slip surface 9280 on a top face 9282 and a second slip surface 9284 on a bottom face 9286 of the coupling interior surface 9288. The first and second slip surfaces 9280, 9284 are configured to slidingly engage the edge frame 9114 of the tonneau cover 938 in the region of the p3 forward edge 982 of the third panel 946. The coupling member 9260 also includes a stop surface 9290 that engages the second seat wall 9194 on closure of the tonneau cover 938. The coupling member 9260 facilitates the attachment and detachment of the tonneau cover 938 from the rail system 940. The coupling member 9260, in particular the gap spacing G between the opposing first and second slip surfaces 9280, 9284 is dimensioned to receive the tonneau cover 938. In the embodiment shown, the gap spacing G is sized to receive the edge frame 9114 of the tonneau cover 938. The first and second slip surfaces 9280, 9284 serve to improve the sliding relationship between the tonneau cover 938 and the coupling member 9260.

To maintain the tonneau, cover 938 attached to the coupling member 9260, a retainer pin 9292 is used. Across the length of the coupling member, there may be a plurality of retainer pins 9292. In a preferred embodiment, two retainer pins 9292 are provided. On insertion of the tonneau cover 938 in the coupling member 9260, a tonneau cover retainer aperture 9294 aligns to a corresponding coupler retainer aperture 9296. The aligned apertures 9294, 9296 receive the retainer pin 9292 (as shown in FIG. 18a), therein preventing the tonneau cover 938 from being slidingly removed from the coupling member 9260. To permit the retainer pin 9292 to rotate about the third hinge assembly 996 when the tonneau cover 938 is being opened to the third opened position, a slot 9298 is provided in the second seat wall 9194. In the embodiment shown in FIG. 20, the coupling interior surface 9288 also supports a coupler seal 9300 that engages the edge frame 9114 of the tonneau cover 938.

Figure 21:
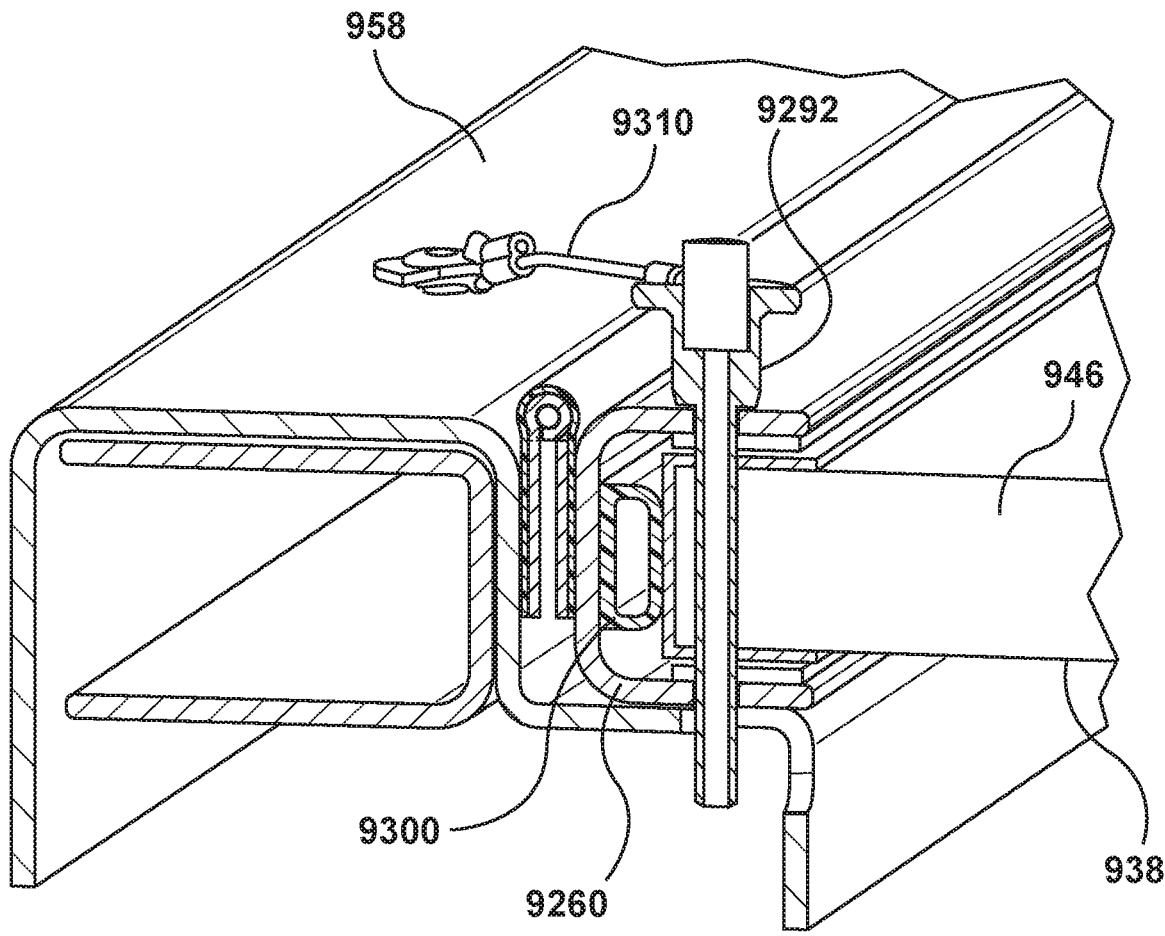
FIG. 21 is another partial sectional view of the tonneau cover assembly according to FIG. 9a, showing in greater detail a coupling member and a retainer pin for attaching the tonneau cover to the mount rail.

While the retainer pin 9292 may be configured to be slidingly inserted into the aligned retainer apertures, it may also be configured with a threaded portion that engages a corresponding threaded region in the coupling member 9260. In this way, the retainer pin 9292 must be rotated for insertion/removal, lessening inadvertent dislodgement and potential loss and/or damage to the tonneau cover 938. The retainer pin 9292 may also include a tether 9310 that attaches the retainer pin to the mount rail 954, as seen in FIG. 21.

Lock Feature

Figure 22A:
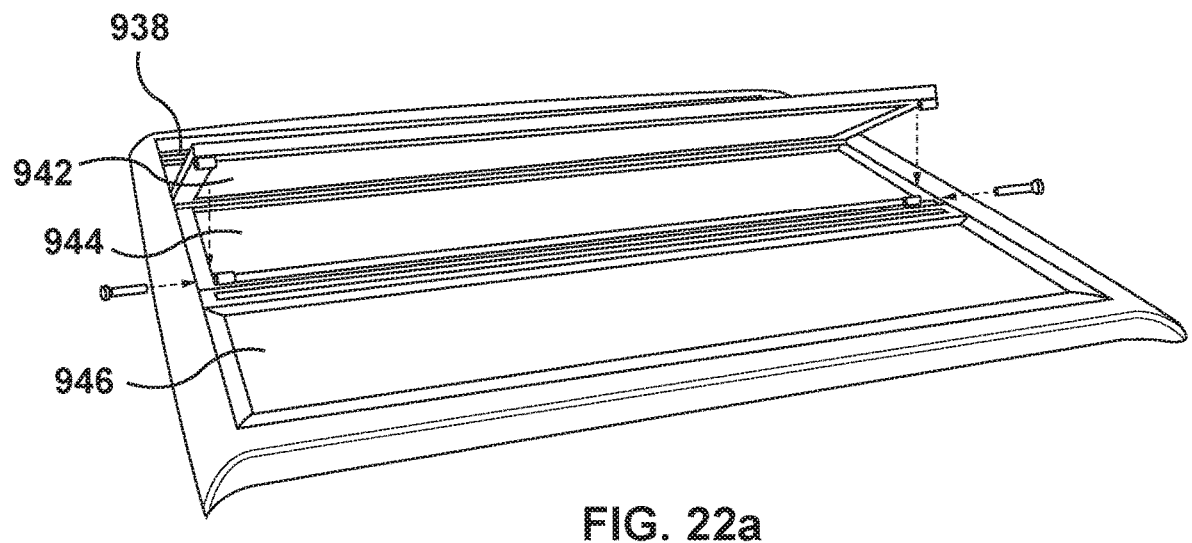
FIG. 22a is a perspective view of the tonneau cover assembly according to FIG. 9a, showing aspects of a lock feature for retaining the tonneau cover in the first opened position.
Figure 22B:
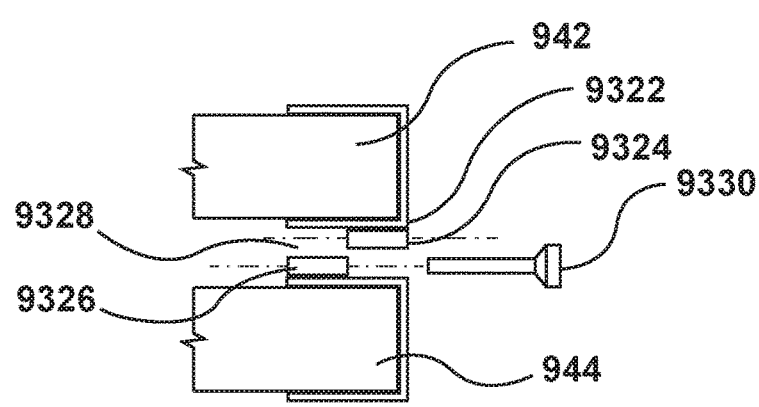
Figure 22C:
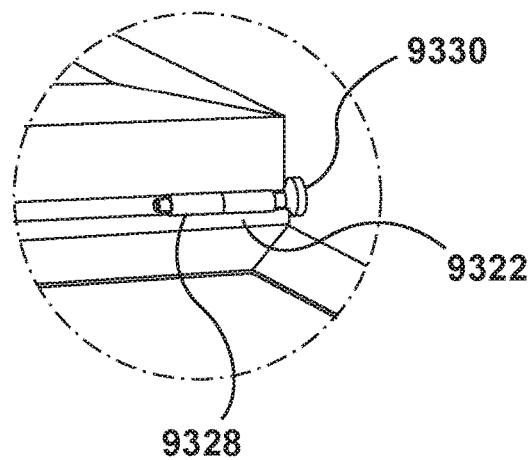

With reference now to FIGS. 22a and 22b, shown is the tonneau cover 938 wherein the first panel 942 is folded upon the second panel 944. To secure the first panel 942 against the second panel 944, that is to releasably lock the first and second panels together, a lock feature is provided. The lock feature 9320 includes at least one first barrel member 9322 located on the upper surface of the p1 rearward edge 960 of the edge frame 9114 of the first panel 942. As shown, two first barrel members 9322 are provided, towards each side of the tonneau cover 938. Each barrel member 9322 provided on the first panel 942 includes a first pin aperture 9324. On folding the first panel 942 upon the second panel 944, the first pin aperture 9324 of the first barrel member 9322 aligns with a cooperating second pin aperture 9326 provided on a respective corresponding second barrel member 9328. On alignment of the first and second pin apertures 9324, 9326, a lock pin 9330 can be inserted therethrough to maintain the first panel 942 in the folded position relative to the second panel 944, as shown in FIG. 22c. The lock pin 9330 may be provided as a separate component that is inserted and threaded into the locked position. The lock pin may also be retained on one of the barrel members, and through a suitable mechanism, is positionable between a locked an unlocked position. The mechanism may include a spring to bias the lock pin to the locked position.

Latch System

Figure 23:
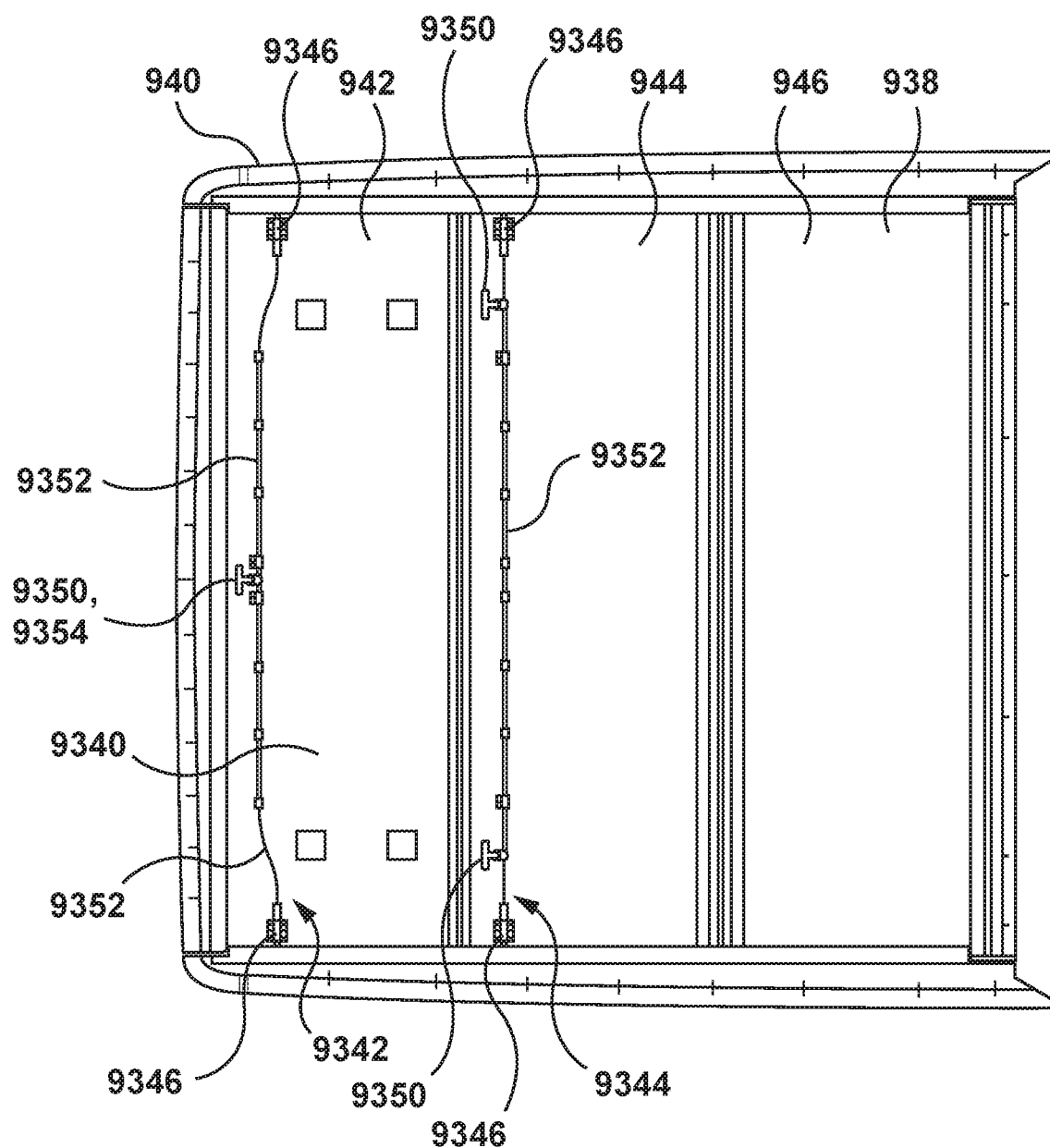
FIG. 23 is a bottom view of the tonneau cover assembly according to FIG. 9a, showing aspects of a latch system.

The tonneau cover 938 includes hardware to enable a secure and lockable closure of the tonneau cover 938 upon the rail system 940. With reference to FIG. 23, shown is an underside 9340 of the tonneau cover 938, where a latch system is provided. The latch system includes a first latch assembly 9342 operably associated with the first panel 942, and a second latch assembly 9344 operably associated with the second panel 944.

Figure 24A:
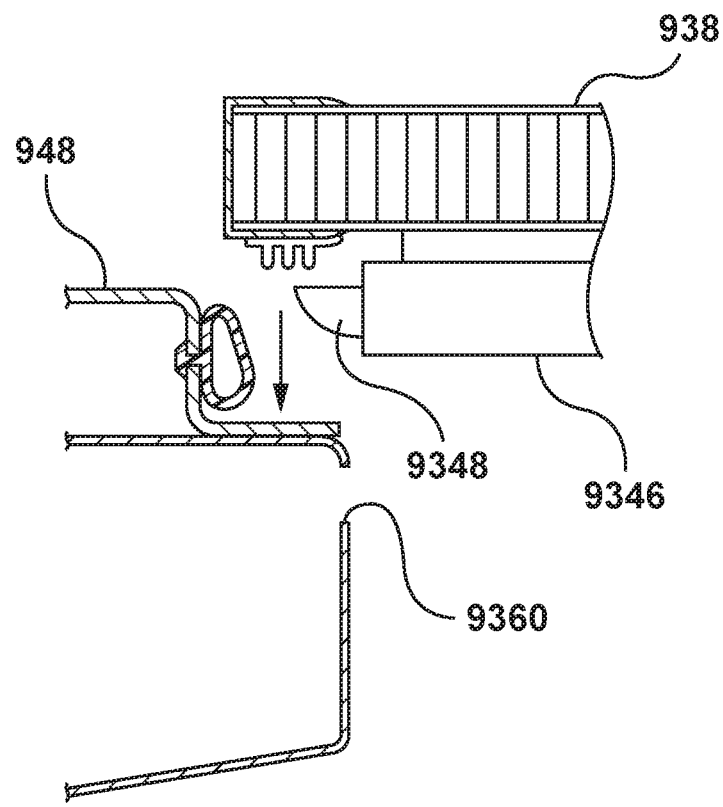
FIG. 24a is a partial sectional view of the tonneau cover assembly according to FIG. 9a, showing aspects of various embodiments for the latch system.

The first latch assembly 9342 includes two latch units 9346, one on each side of the first panel 942. Each latch unit 9346 is configured as a slam latch, with a moveable latch member 9348 (as shown in FIG. 24a) being positionable to operably engage a closure feature provided on the respective side-wall section 30a, 30b. The pair of latch units 9346 of the first latch assembly 9342 are operably connected to a suitable release mechanism. In the embodiment shown, the pair of latch units 9346 are operably connected to a release member 9350 by way of a respective actuation cable 9352. The release member 9350 and associated actuation cables 9352 serve to disengage the latch units 9346 when necessary. The release members 9350 are provided in the form of rotatable handles 9354, although other release mechanisms may be suitably implemented. The latch units 9346, and the operably associated actuation cables 9352 and release member 9350 may be configured with springs or other biasing members so as to be biased towards the locking position. The release members 9350 may include a locking feature, so enable the user to lock the tonneau cover 938 in the closed position. A suitable locking feature may include one that is lockable using a key, accessible from either the inside or topside of the tonneau cover assembly.

The second latch assembly 9344 is configured similarly to that described above with respect to the first latch assembly 9342. Where the first latch assembly 9342 provides a single release member 9350 positioned toward the center of the first panel 942, that is between the first and second side wall sections 30a, 30b, the second latch assembly 9344 provides a pair of release members 9350, one located near each of the first and second side wall sections 30a, 30b.

In some embodiments, a third latch assembly may be provided (not shown). The third latch assembly would be operably associated with the third panel 946, and would be configured similarly to that described above with respect to the second latch assembly 9344.

Figure 24B:
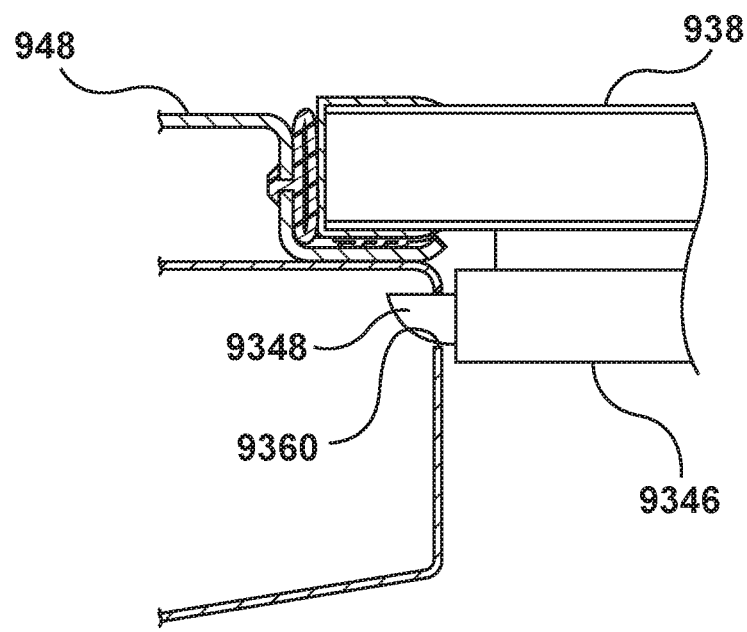
FIG. 24b is another partial sectional view of the tonneau cover assembly according to FIG. 9a, showing aspects of various embodiments for the latch system.
Figure 25:
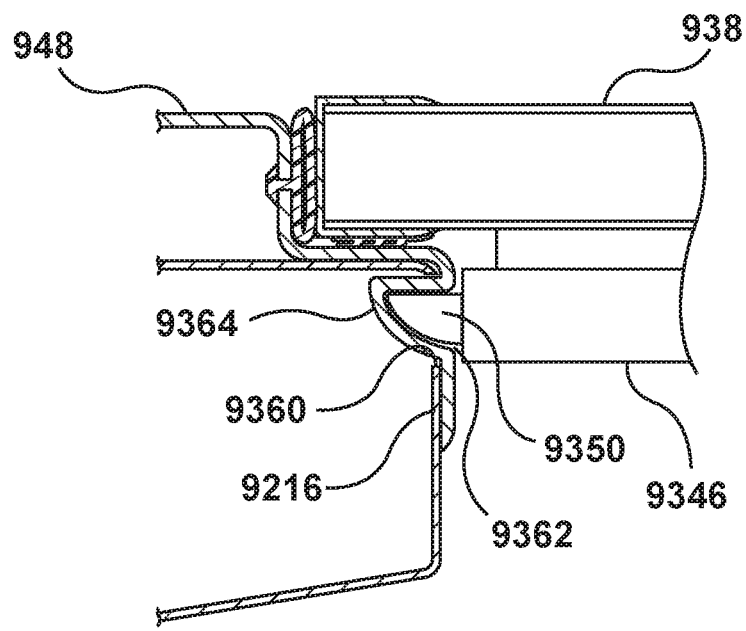
FIG. 25 is another partial sectional view of the tonneau cover assembly according to FIG. 9a, showing aspects of various embodiments for the latch system.
Figure 26:
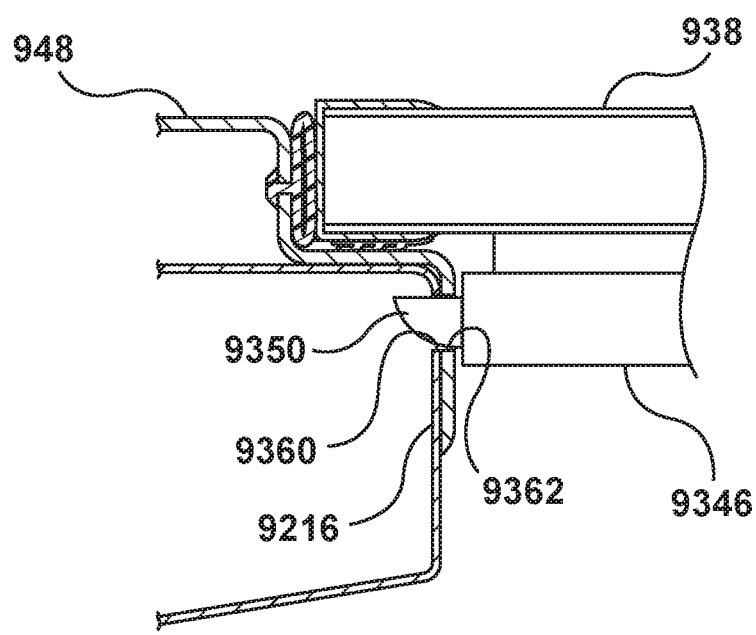
FIG. 26 is another partial sectional view of the tonneau cover assembly according to FIG. 9a, showing aspects of various embodiments for the latch system.
Figure 27:
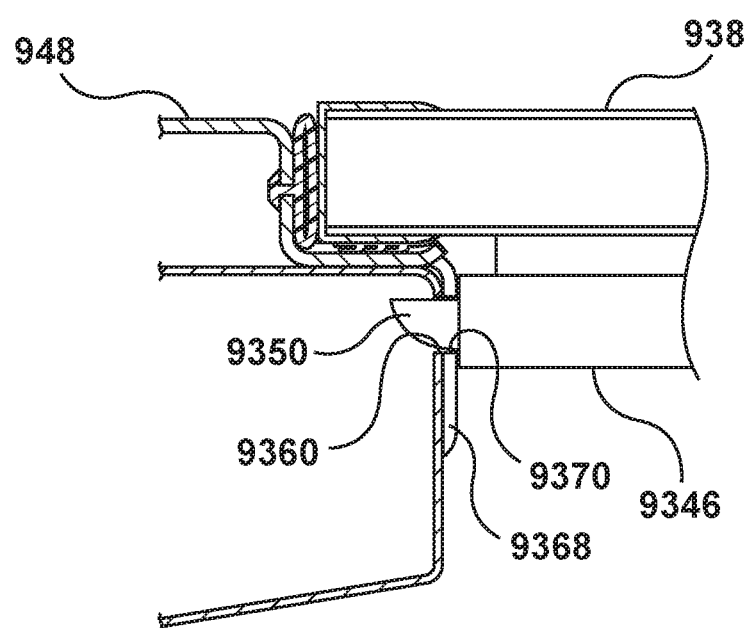
FIG. 27 is another partial sectional view of the tonneau cover assembly according to FIG. 9a, showing aspects of various embodiments for the latch system.

The closure feature provided on each of the first and second side wall sections 30a, 30b is engaged by the respective latch unit 9346, therein preventing the tonneau cover panel from being opened until purposely released. The closure feature generally includes a closure aperture 9360 provided in the respective side-wall section (shown relative to side-wall section 30a and side rail 948), configured to receive the latch member. This arrangement is represented in FIGS. 24a and 24b. The closure feature may also be configured in a variety of other ways. For example, FIG. 25 depicts a closure feature where in addition to the closure aperture 9360, the side rail 948 includes a second closure aperture 9362 and an integral close-out 9364 provided on the extension wall 9216. In the embodiment shown in FIG. 26, the closure feature is similar to that shown in FIG. 25, with the closure aperture 9360 provided in the side wall section 30a, and the second closure aperture 9364 provided in the side rail 948, but without the integral close-out. In yet another embodiment (see FIG. 27), a strike plate 9368 with plate aperture 9370 is provided over the closure aperture 9360 provided in the side wall section 30a.

Stake-Pocket Access Ports

Figure 28:
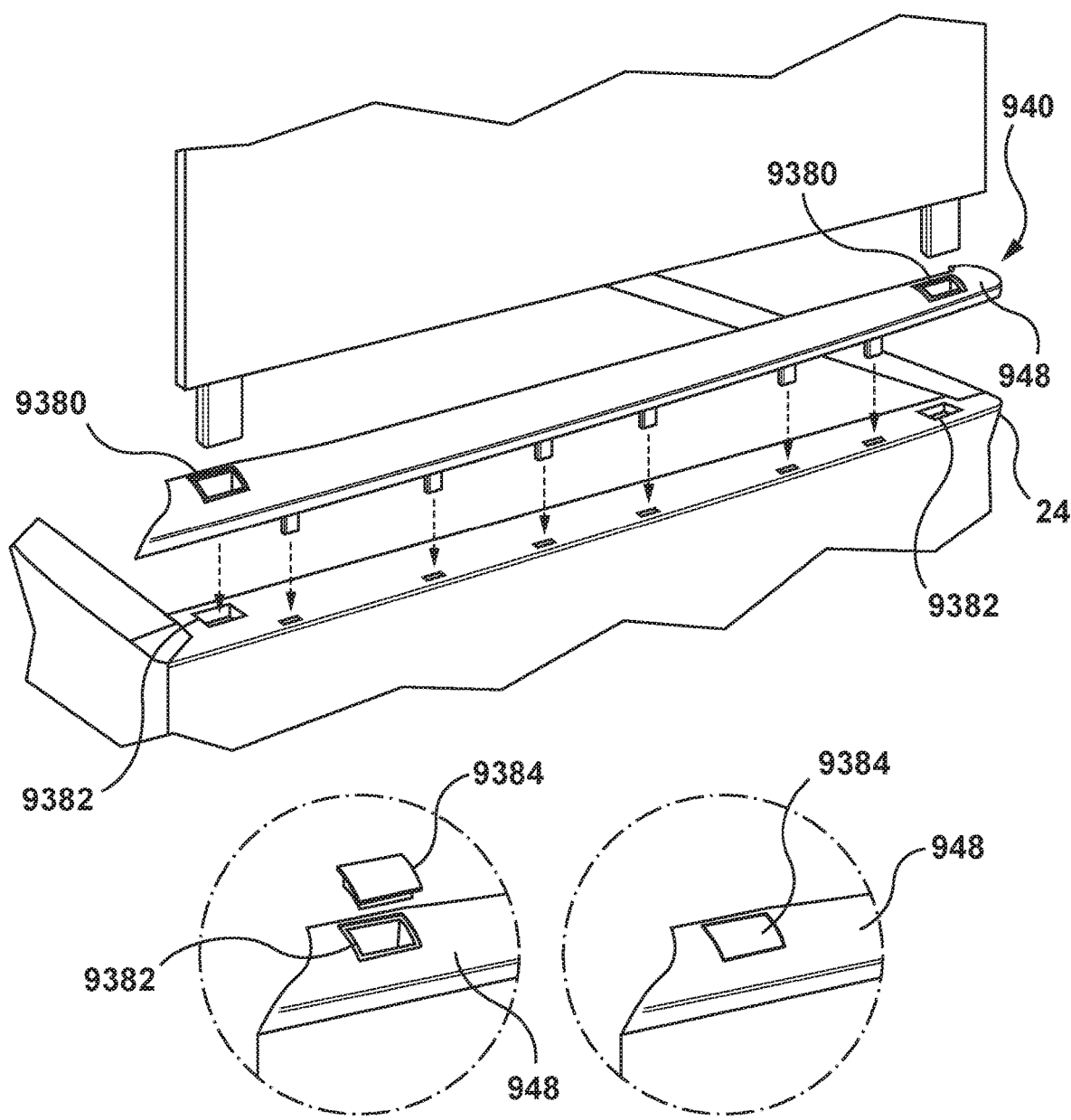
FIG. 28 is a partial view of the tonneau cover assembly according to FIG. 9a, showing aspects of the rail system that permit for access to stake pockets on the cargo bed.

In some embodiments of the rail system 940, the first and second side rails 948, 950 may be configured with ports that permit access to the stake pockets provided as part of the cargo bed structure. With reference to FIG. 28, shown is the first side rail 948 wherein a pair of pocket ports 9380 are provided. The pocket ports 9380 are positioned to align with the stake pockets 9382 provided on the cargo bed 24. Each pocket port 9380 may be provided with a removable access door 9384. The access door 9384 may be hinged or configured to be completely removed when access to the stake pocket is required.

Other Features

The various seals described herein may be selected from a variety of materials, and there is no intention to be restricted to a particular type of material. The materials selected for the various seals will be dependent upon the desired sealing performance. In general, seals will be formed of a suitable rubber or flexible polymeric material. The shapes and/or dimensions shown are merely exemplary, and it will be appreciated that additional shapes/dimensions may be selected, depending on the desired sealing performance. In some instances, multiple seals arranged in close proximity may be combined into a single sealing arrangement. In some instances, additional seals may be added to enhance sealing performance.

The edge frame 9114 referenced above is generally used to seal the panel structure. The edge frame may be a metal (i.e. aluminum) extrusion but may also be formed of plastic or other resin materials. There is no intention to limit the type of material suitable for use in forming the edge frame 9114 described herein.

The various rails making up the rail system 940 are generally formed of a suitable plastic material. A non-limiting example of a suitable material includes a talc and/or glass-fiber filled polypropylene. It will be appreciated that a wide range of other materials may be suitably implemented for constructing the rail system 940, and there is no intention to limit the type of material to those strictly described herein. The rail system 940 may additionally comprise a metal cap or other covering to provide additional protection to the rail system components. The rail system, in particular the interior rail surface 9174 may additionally comprise features that impart additional performance characteristics. For instance, the rails making up the rail system may additionally include a system of ribs, one or both of lateral and longitudinal ribs that impart additional stiffening characteristics to the rail system. The ribs may be continuous, or discontinuous, depending on the application. Structural enhancements may also be achieved through a range of other features molded onto the interior rail surface.

A specific arrangement for the first, second, and third hinge assemblies has been shown herein. As stated, other hinge configurations are possible, and may be suitably implemented as substitutes. For instance, in some embodiment, the hinge assemblies maybe based on a flexible hinge member that is fixedly attached to the edges of the adjacently positioned tonneau cover panels. The flexible hinge members may provide both a hinging action, as well as sealing functionality.

Alternative Rail System

Figure 29:
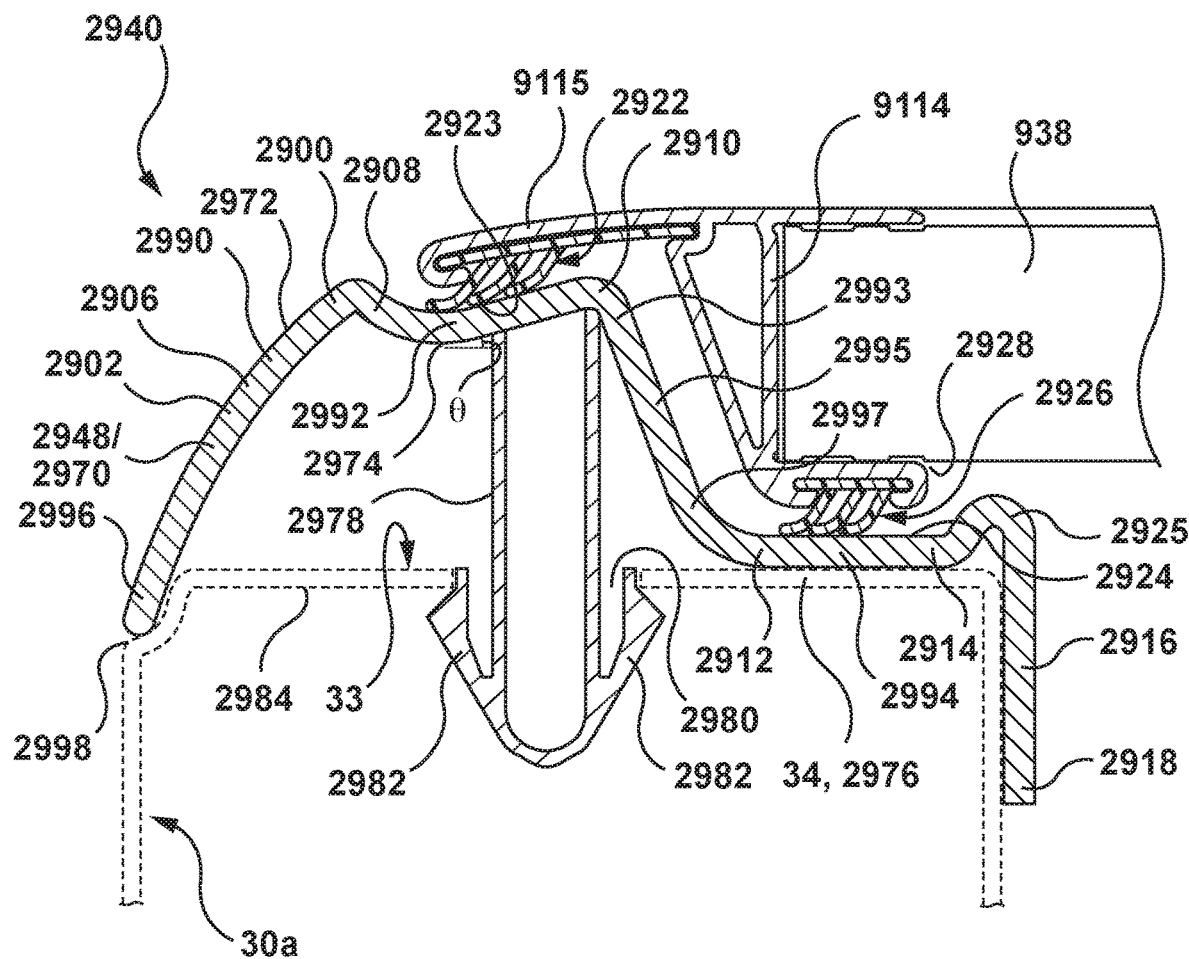
FIG. 29 and FIG. 30 illustrate another embodiment of FIG. 29 is a partial sectional view of a rail system that serves to facilitate the mounting of a tonneau cover to a cargo bed, showing a profile through a side rail of the rail system.
Figure 30:
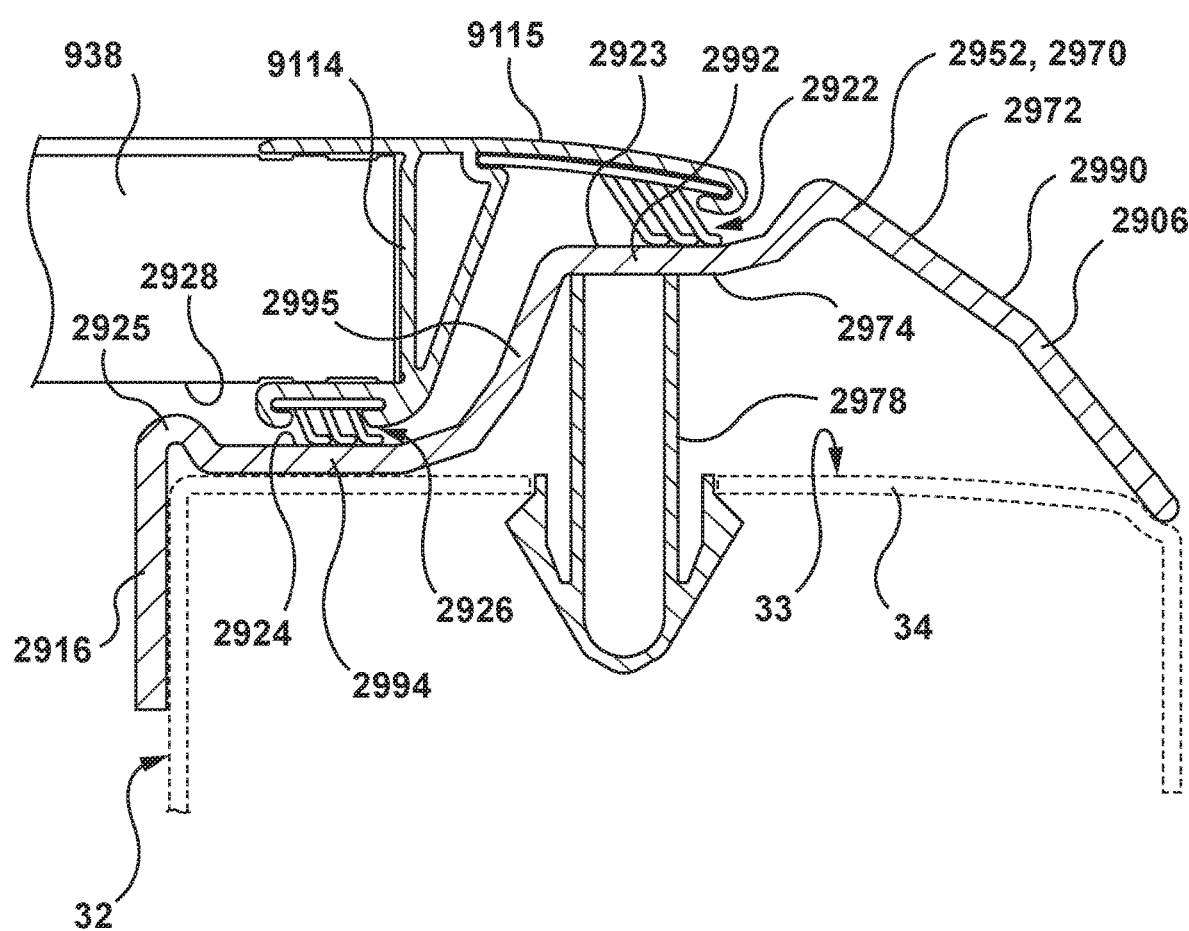

FIG. 29 and FIG. 30 illustrate another embodiment of a rail system 2940 that serves to facilitate the closure and sealing of the tonneau cover 938 to the cargo bed 24. Similar to the rail system 940, the rail system 2940 includes a first side rail, a second side rail, a tailgate rail, and a mount rail. Collectively the rail system 2940 is mounted upon the upper wall surface 33 of the cargo bed 24 (i.e. the bed rail 34) in the same manner as the rail system 940 described above. As will be described in greater detail below, in addition to facilitating the mounting of the tonneau cover 938 to the cargo bed 24, the rail system 2940 cooperates with the tonneau cover 938 in a manner that serves to prevent the ingress of water and debris into the cargo bed 24.

Turning now to FIG. 29, shown is a sectional profile through a first side rail 2948 of the rail system 2940. As both the first and second side rails are configured and dimensioned in the same manner, only the first side rail 2948 will be discussed in detail below.

The side rail 2948 is an injection molded structure mounted upon the upper surface 33 of the bed rail 34 of the side wall section 30a. The side rail 2948 is formed as an elongate rail body 2970 with an exposed exterior rail surface 2972 and a generally hidden interior rail surface 2974.

The rail system 2940 foregoes the traditional prior art clamping methodology to retain the rail system in position. Instead, the side rail 2948 incorporates a fastening system that includes one or more fastening elements configured to engage the upper surface 33 and/or upper wall structure 2976 of the bed rail 34 of the cargo bed 24. Of particular note is that the fastening system designed for use with the tonneau cover assembly is configured to minimize obstruction of the cargo bed opening, in particular the area between the opposing side-wall sections 30a, 30b. The fastening system may be configured in a number of ways. For example, fastening system is configured to include the one or more fastening elements in the form of a retaining clip 2978 that cooperates with a complementary fastener aperture 2980 formed through the upper surface 33 and upper wall structure 2976 of the bed rail 34. The retaining clip 2978 extends through the fastener aperture 2980 and includes at least one retaining barb 2982 arranged to engage a rail underside 2984 of the bed rail 34 upon installation. To enable serviceability of the rail system 2940 and/or the cargo bed 24, it is preferable that the retaining clip 2978 exhibit enough flexibility to be selectively detached from the fastener aperture 2980 when necessary. The retaining clip 2978 as shown is integrally formed upon the interior rail surface 2974 of the rail body 2970. In general, the interior rail surface 2974 of the rail body 2970 will include a plurality of retaining clips 2978 along the length of the rail body 2970. Although a singular type of fastening element may be implemented, in some embodiments the fastening system may include two or more different types of fastening elements as described above with respect to the rail system 940.

The elongate rail body 2970 as shown includes a profile wall 2990, a first seat wall 2992, a second seat wall 2994, and a third seat wall 2995 extending between the first seat wall 2992 and the second seat wall 2994. The profile wall 2990 defines the principal shape and aesthetic character of the rail body 2970, while the first, second, and third seat walls 2992, 2994, 2995 collectively provide a seat to receive and sealingly engage the tonneau cover 938. The profile wall 2970 includes a first profile end 2996 positioned upon or in the vicinity of an outboard surface 2998 of the respective side-wall section 30a, and a second profile end 2900 generally where the profile wall 2990 transitions to the first seat wall 2992. The profile wall 2990 also provides a shape-defining region 2902 between the first and second profile ends 2996, 2900. In the embodiment shown, the shape-defining region 2902 provides a radiused segment 2906. In an embodiment, the first seat wall 2992 is positioned at an angle θ between 5 and 30 degrees relative to the second side wall 2994. In another embodiment, the first seal wall 2992 may be positioned in a substantially horizontal orientation. The second seat wall 2994 is positioned in a substantially horizontal orientation. The third seat wall 2995 extends between the first and second seat walls 2992, 2994 at an angle between 120 and 150 degrees relative to the second side wall 2994. The first seat wall 2992 is attached at a first end 2908 to the second profile end 2900 of the profile wall 2990 and is attached at a second end 2910 to a first end 2993 of the third seat wall 2995. In an embodiment, the first end 2908 curves in an upward direction such that the first end 2908 and the second end 2910 are substantially level. The second seat wall 2994 is attached at a first end 2912 to a second end 2997 of the third seat wall 2995 and is attached at a second end 2914 to an extension wall 2916 that seats against an inboard surface 2918 of the side-wall section 30*a*.

The first seat wall 2992 provides a seal surface 2923 configured to be engaged by a first edge seal 2922 provided around the periphery of the tonneau cover, generally affixed to an underside surface of a flange 9115 of the edge frame 9114 of each tonneau cover panel. Placing the first edge seal 2922 on the underside surface of the flange 9115 of the edge frame 9114 serves to protect the first edge seal 2922 during loading/unloading of payload, and further simplifies the act of cleaning off the first edge seal 2922, which can easily be performed using a cleaning brush or similar instrument. The first edge seal 2922 may be configured as a plurality of flexible filaments (as shown) and is generally a continuous seal along the length of the rail body. Although shown as a plurality of filaments, other types of seal components may be utilized. For example, in another embodiment hereof, a bulb seal (not shown) may be affixed to the first seat wall 2992 using a variety of fasteners, including but not limited to adhesives (i.e. glue, tapes, etc.), clips and integrally molded tabs.

The second seat wall 2994 provides a seal surface 2924 configured to be engaged by a second edge seal 2926 provided around the periphery of the tonneau cover, generally affixed to a frame underside surface 2928 of the edge frame 9114 of each tonneau cover panel. Placing the second edge seal 2926 on the frame underside surface 2928 of the tonneau cover 938 serves to protect the second edge seal 2926 during loading/unloading of payload, and further simplifies the act of cleaning off the seal surface 2924, which can easily be performed using a cleaning brush or similar instrument. The second edge seal 2926 may be configured as a plurality of flexible filaments (as shown) and is generally a continuous seal along the length of the rail body. Although shown as a plurality of filaments, other types of seal components may be utilized. For example, in another embodiment hereof, a bulb seal (not shown) may be affixed to the frame underside surface 2928 of the edge frame 9114 using a variety of fasteners, including but not limited to adhesives (i.e. glue, tapes, etc.), clips and integrally molded tabs.

The seal surface 2924 is configured to facilitate water management in a manner that serves to prevent the ingress of water and debris into the cargo bed 24. More particularly, a ridge or hump 2925 is disposed at the transition area between the second end 2914 of the second seat wall 2994 and the extension wall 2916. If any water works its way past the first edge seal 2922 and the second edge seal 2926, the ridge 2925 causes the seal surface 2924 to effectively serve as a channel that diverts or directs any such water away from the cargo bed 24.

The arrangement of the second seat wall 2994, the first profile end 2996 of the profile wall 2990, and the extension wall 2916 are selected to closely match or mate with the receiving surface of the respective bed rail 34. The action of the fastening system serves to engage the aforementioned rail body elements to the respective receiving surface in a secure manner. To additionally ensure a secure fit, the rail body 2970 may be dimensioned such that upon installation, there is an interference fit between engaging surfaces.

Turning now to FIG. 30, shown is a sectional profile through the tailgate rail 2952 of the rail system 2940. As the tailgate rail 2952 is substantially the same as the side rail 2948, only the differences will be discussed. Where appropriate, like number will be used to denote parts/elements on the tailgate rail 2952 that correspond to parts/elements previously introduced and described with reference to the side rail 2948.

The tailgate rail 2952 is an injection molded structure mounted upon the upper surface 33 of the bed rail 34 of the tailgate 32. The tailgate rail 2952 is formed as an elongate rail body 2970 having an exposed exterior rail surface 2972 and a generally hidden interior rail surface 2974.

The tailgate rail 2952 includes a similar fastening system as that described above for the side rail 2948. As shown, the fastening system includes a plurality of fastening elements having the form of a retaining clip 2978. The retaining clips 2978 are integrally formed upon the interior rail surface 2974 of the rail body 2970. Similar to the side rail 2948, the fastening system used for the tailgate rail 2952 may include a singular type of fastening element or may include two or more different types of fastening elements. The various types of fastening elements that may find application are the same as those described above with reference to the side rail 2948.

The elongate rail body 2970 of the tailgate rail 2952 includes a profile wall 2990, a first seat wall 2992, a second seat wall 2994, and a third seat wall 2995 extending between the first seat wall 2992 and the second seat wall 2994. The profile wall 2990 defines the principal shape and aesthetic character of the rail body 2970, while the first, second, and third seat walls 2992, 2994, 2995 collectively provide a seat to receive and sealingly engage the tonneau cover 938. The seat formed by the first, second, and third seat walls 2992, 2994, 2995 operate in the same way as the seat formed on the side rails 2948. The first seat wall 2992 provides a seal surface 2923 configured to be engaged by a first edge seal 2922 provided around the periphery of the tonneau cover, generally affixed to an underside surface of a flange 9115 of the edge frame 9114 of each tonneau cover panel, while the second seat wall 2994 provides a seal surface 2924 configured to be engaged by a second edge seal 2926 provided around the periphery of the tonneau cover, generally affixed to a frame underside surface 2928 of the edge frame 9114 of each tonneau cover panel. As shown, in this embodiment, both the first edge seal 2922 and the second edge seal 2926 are provided in the form of a plurality of flexible filaments, although other types of seals may be suitably implemented. With respect to the profile wall 2990, it will be appreciated that the dimensions defining the radiused segment 2906, as well as the dimensional spacing between the first profile end 2996 and the extension wall 2916 of the tailgate rail 2952 are selected to match that of the tailgate 32 upon which it is mounted.

The seal surface 2924 is configured to facilitate water management in a manner that serves to prevent the ingress of water and debris into the cargo bed 24 via the ridge or hump 2925 that is disposed at the transition area between the second end 2914 of the second seat wall 2994 and the extension wall 2916. If any water works its way past the first edge seal 2922 and the second edge seal 2926, the ridge 2925 causes the seal surface 2924 to effectively serve as a channel that diverts or directs any such water away from the cargo bed 24.

In some embodiments, the extension wall 2916 may be configured to cover substantially the entire inside (i.e. cargo bed facing) surface of the tailgate, to avoid the formation of an edge that could potentially cause a catch point when maneuvering cargo in/out of the cargo bed. In another embodiment, the inside (cargo bed facing) surface of the tailgate may be configured with a recess that receives the extension wall 2916. In this way, the exposed side of the extension wall 2916 has a flush interface with the inside (cargo bed facing) surface.

The rail system 2940 is dimensioned to receive the tonneau cover 938 in a manner that has the appearance of a flush-mounted system. It will be noted that the tonneau cover 938 partially overlaps the bed rail 34 of at least the first side rail 2948, the second side rail (not shown), and the tailgate rail 2952. To avoid the appearance of a top-mounted tonneau cover, and therein achieve the desired flush-mounted appearance, the edges of the tonneau cover 938 aligning to the first side rail 2948, the second side rail, the tailgate rail 2952 and the mount rail (not shown) are received in the seat of the respective rail body. Accordingly, the third seat wall 2995 for each respective rail is dimensioned to establish a seat depth that approximately matches the thickness of the tonneau cover 938 around the periphery thereof, including a seal or any similar pliant sealing structure. The second seat wall 2994 establishes a first seat width and is configured to receive the frame underside surface 2928 (including the second edge seal 2926) of each tonneau cover panel, and the first seal wall 2992 establishes a second seat width and is configured to receive the flange 9115 (including the first edge seal 2922) of each tonneau cover panel. The second seat wall 2994 for each respective rail provides the base of the seat, and is positioned directly upon and is provided support by the upper surface 33 of the respective bed rail 34. With this arrangement, the outside surface of the shape-defining region 2902 of each respective rail appear generally flush with the topside planar surface of the tonneau cover 938.

As described above with respect to the rail system 940, the first and second side rails may be configured with ports that permit access to the stake pockets provided as part of the cargo bed structure. Further, the various rails making up the rail system 2940 are generally formed of the suitable plastic material described above with respect to the rail system 940. The rail system 2940 may additionally comprise a metal cap or other covering to provide additional protection to the rail system components. The rail system, in particular the interior rail surface 2974 may additionally comprise features that impart additional performance characteristics. For instance, the rails making up the rail system may additionally include a system of ribs, one or both of lateral and longitudinal ribs that impart additional stiffening characteristics to the rail system. The ribs may be continuous, or discontinuous, depending on the application. Structural enhancements may also be achieved through a range of other features molded onto the interior rail surface.

Tonneau Cover Panel Construction

The first, second and third panels 942, 944, 946 making up the tonneau cover 938 may be formed in a number of ways. For example, each of the panels maybe blow molded to achieve the desired panel configuration. The panels may also be formed using an injection molding or thermoforming process, wherein a pair of mating shells are formed and assembled into the desired panel configuration. In a preferred construction, each of the first, second and third panels 942, 944, 946 is formed as a composite layered panel or sandwich panel having the same construction as the sandwich panel 48 described above with respect to FIG. 3, in which the sandwich panel includes a structural core bounded on a core top surface by a first layered component and on a core bottom surface by a second layered component.

Tonneau Cover Components

It will be appreciated that the tonneau cover 36, 250, 938 will additionally include a variety of other functional components, for example mechanisms that permit for latching/locking of the tonneau cover in the closed position, as well as the associated disengagement mechanisms. Latching/locking mechanisms may include, but are not limited to rotary latches, and slam latches.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A system for covering an opening of a cargo bed of a pickup truck, the tonneau cover comprising:
   a tonneau cover for covering the opening of the cargo bed of the pickup truck; and
   a rail system for mounting the tonneau cover to the cargo bed of the pickup truck, wherein the rail system includes a first side rail, a second side rail, a tailgate rail, and a mount rail, and wherein each of the first side rail, the second side rail, the tailgate rail, and the mount rail include a profile wall with an outside surface and at least two seat walls that collectively define a seat configured to receive the tonneau cover such that the outside surface of the profile wall is flush with a topside planar surface of the tonneau cover,
   wherein the seat is defined by a first seat wall, a second seat wall configured to be positioned in a substantially horizontal orientation relative to the cargo bed, and a third seat wall extending between the first seat wall and the second seat wall at an angle between 120 and 150 degrees relative to the second side wall.

2. The system of claim 1, wherein each of the first side rail, the second side rail, the tailgate rail, and the mount rail further include a wall extension that is configured to seat against an inboard surface of a bed rail of the cargo bed and a first end of the profile wall is configured to be positioned up an outboard surface of a bed rail of the cargo bed.

3. The system of claim 1, wherein the first seat wall is configured to be positioned at an angle between 5 and 30 degrees relative to the cargo bed.

4. The system of claim 3, wherein a first edge seal is affixed to the first seat wall, the first edge seal being continuous along a length of each of the first side rail, the second side rail, the tailgate rail, and the mount rail and being configured to engage an edge frame of the tonneau cover.

5. The system of claim 4, wherein the first edge seal is a bulb seal.

6. The system of claim 4, wherein a second edge seal is coupled to a frame underside surface of the edge frame of the tonneau cover around a periphery of the tonneau cover, and the second seat wall is configured to engage with the second edge seal.

7. The system of claim 3, wherein a rail body includes the profile wall, the first seat wall, and the second seat wall and the rail body is formed as a unitary structure.

8. The system of claim 3, wherein the first seat wall is dimensioned to establish a seat depth of the seat that approximately matches a thickness of the tonneau cover and wherein the second seat wall defines a base of the seat that is configured to receive a frame underside surface of the tonneau cover.

9. The system of claim 1, wherein the first seat wall is positioned at an angle $\theta$ between 5 and 30 degrees relative to the second side wall.

10. The system of claim 1, wherein a first edge seal is coupled to a frame underside surface of an edge frame of the tonneau cover around a periphery of the tonneau cover, and the first seat wall is configured to engage with the first edge seal.

11. The system of claim 10, wherein a second edge seal is coupled to the frame underside surface of the edge frame of the tonneau cover around the periphery of the tonneau cover, and the second seat wall is configured to engage with the second edge seal.

12. The system of claim 11, wherein each of the first edge seal and the second edge seal is a plurality of flexible filaments.

13. The system of claim 1, wherein each of the first side rail, the second side rail, the tailgate rail, and the mount rail further include a wall extension that is configured to seat against an inboard surface of a bed rail of the cargo bed and wherein a hump is disposed at a transition area between the second seat wall and the wall extension, the hump being configured to divert any water disposed thereon away from the cargo bed.

14. The system of claim 1, wherein the third seat wall is dimensioned to establish a seat depth of the seat that approximately matches a thickness of the tonneau cover, the second seat wall defines a first seat width of the seat that is configured to receive a frame underside surface of the tonneau cover, and the first seat wall defines a second seat width that is configured to receive a flange of the tonneau cover.

15. The system of claim 1, wherein the tonneau cover includes at least one sandwich panel including
    a structural core having a top surface and a bottom surface, wherein the structural core is a honeycomb structure,
    a first layered section coupled to the top surface of the structural core, and
    a second layered section coupled to the bottom surface of the structural core,
    wherein each of the first layered section and the second layered section includes a reinforcement layer, and
    wherein at least one of the reinforcement layers of the first layered section and second layered section is a carbon fiber mat.

16. The system of claim 15, wherein the honeycomb structure is formed from aluminum.

17. The system of claim 1, wherein the tonneau cover has a first panel, a second panel, and a third panel and wherein the tonneau cover includes
    a closed configuration in which the first panel, the second panel, and the third panel are configured to fully cover the cargo bed of the pickup truck,
    a first open configuration in which the first panel is folded onto the second panel, and
    a second open configuration in which an assembly of the first and second panels is folded onto the third panel.

* * * * *